(12) United States Patent
Peterson et al.

(10) Patent No.: US 11,691,705 B2
(45) Date of Patent: Jul. 4, 2023

(54) AUTOMATED BOAT LIFT AND TROLLEY

(71) Applicants: Ronald E. Peterson, Marco Island, FL (US); Arnold E. Peterson, Somis, CA (US)

(72) Inventors: Ronald E. Peterson, Marco Island, FL (US); Arnold E. Peterson, Somis, CA (US)

(*) Notice: Subject to any disclaimer, the term of this patent is extended or adjusted under 35 U.S.C. 154(b) by 251 days.

(21) Appl. No.: 17/024,216

(22) Filed: Sep. 17, 2020

(65) Prior Publication Data

US 2021/0016861 A1  Jan. 21, 2021

Related U.S. Application Data

(63) Continuation-in-part of application No. 16/821,790, filed on Mar. 17, 2020, now abandoned.
(Continued)

(51) Int. Cl.
*B63C 3/06* (2006.01)
*B63C 3/02* (2006.01)
(Continued)

(52) U.S. Cl.
CPC .............. *B63C 3/06* (2013.01); *B63C 3/02* (2013.01); *B63C 3/08* (2013.01); *B63C 15/00* (2013.01); *E02C 5/00* (2013.01)

(58) Field of Classification Search
CPC .... B63C 3/02; B63C 3/06; B63C 3/08; B63C 3/12; B63C 15/00
(Continued)

(56) References Cited

U.S. PATENT DOCUMENTS 2,381,789 A  8/1945 Turnbull
2,411,382 A * 11/1946 Martin .................... B63B 35/52
                                                                114/230.23
(Continued)

FOREIGN PATENT DOCUMENTS

DE       836 609       4/1952
DE    3611742 A1      10/1987
(Continued)

OTHER PUBLICATIONS

Office Action dated Oct. 28, 2020, received in U.S. Appl. No. 16/821,790, 15 pages.
(Continued)

*Primary Examiner* — Sunil Singh
(74) *Attorney, Agent, or Firm* — Knobbe, Martens, Olson & Bear LLP

(57) ABSTRACT

An automated system is provided for moving a boat from a storage position in a boat garage to a deployed position in a dock channel. The system can include a boat trolley. The boat trolley can include a frame that couples to and rides on rails of a track that extends between the boat garage and the dock channel. The boat trolley can also include bunker supports for supporting the hull of the boat. A dock lift mechanism can lower the trolley frame into the water, from which the boat can be deployed. Once done using the boat, the user can navigate the boat onto the trolley frame, and the dock lift mechanism used to lift the trolley frame and boat out of the water, and the boat trolley operated to move the boat from the dock to the boat garage for storage.

19 Claims, 63 Drawing Sheets

Related U.S. Application Data

(60) Provisional application No. 62/820,418, filed on Mar. 19, 2019.

(51) Int. Cl.
  *B63C 3/08* (2006.01)
  *E02C 5/00* (2006.01)
  *B63C 15/00* (2006.01)

(58) Field of Classification Search
  USPC .................. 114/44, 45, 48, 263; 405/1–7
  See application file for complete search history.

(56) References Cited

U.S. PATENT DOCUMENTS

| | | | |
|---|---|---|---|
| 2,743,697 A * | 5/1956 | Gibbons | B64C 35/00 |
| | | | 405/2 |
| 4,797,055 A | 1/1989 | Tworoger | |
| 5,234,285 A | 8/1993 | Cameron | |
| 6,457,904 B2 | 10/2002 | Bishop | |
| 6,823,809 B2 | 11/2004 | Hey | |
| 9,957,025 B2 | 5/2018 | Peterson | |
| 2002/0176767 A1 | 11/2002 | Gisselberg | |
| 2009/0010742 A1 | 1/2009 | Stolzer | |
| 2009/0142135 A1 | 6/2009 | Bishop | |
| 2016/0288888 A1 | 10/2016 | Peterson et al. | |

FOREIGN PATENT DOCUMENTS

| | | |
|---|---|---|
| JP | 58-149889 A | 9/1983 |
| SU | 570513 A | 9/1977 |
| WO | WO 2008/153323 A2 | 12/2008 |
| WO | WO 2009/097342 A2 | 8/2009 |

OTHER PUBLICATIONS

International Search Report and Written Opinion dated Jul. 1, 2020, received in International Patent Application No. PCT/US2020/023210, 15 pages.

* cited by examiner

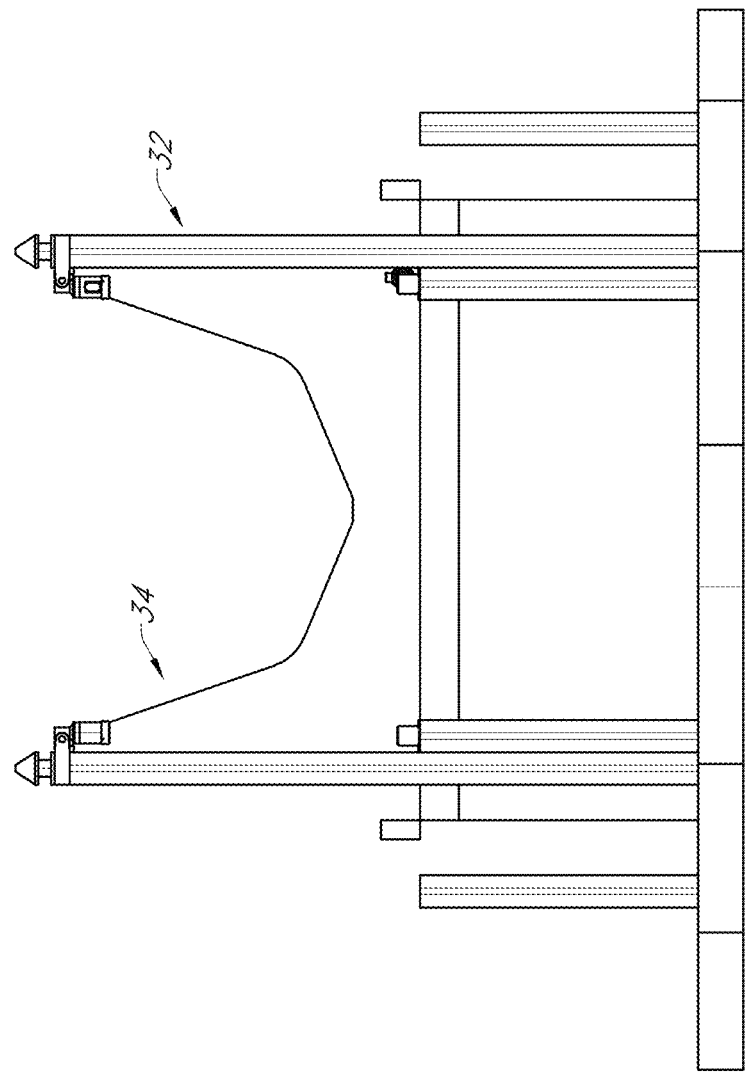

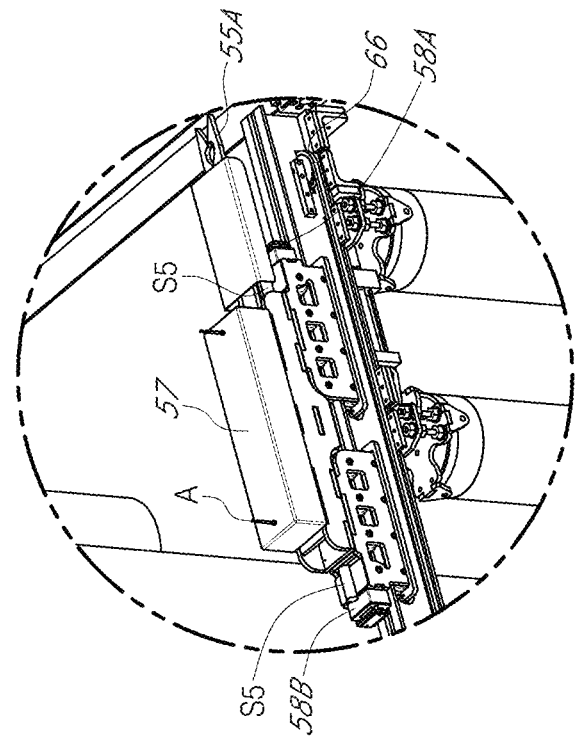
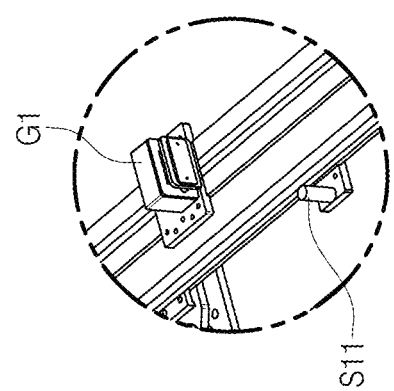
FIG. 25B
FIG. 25A

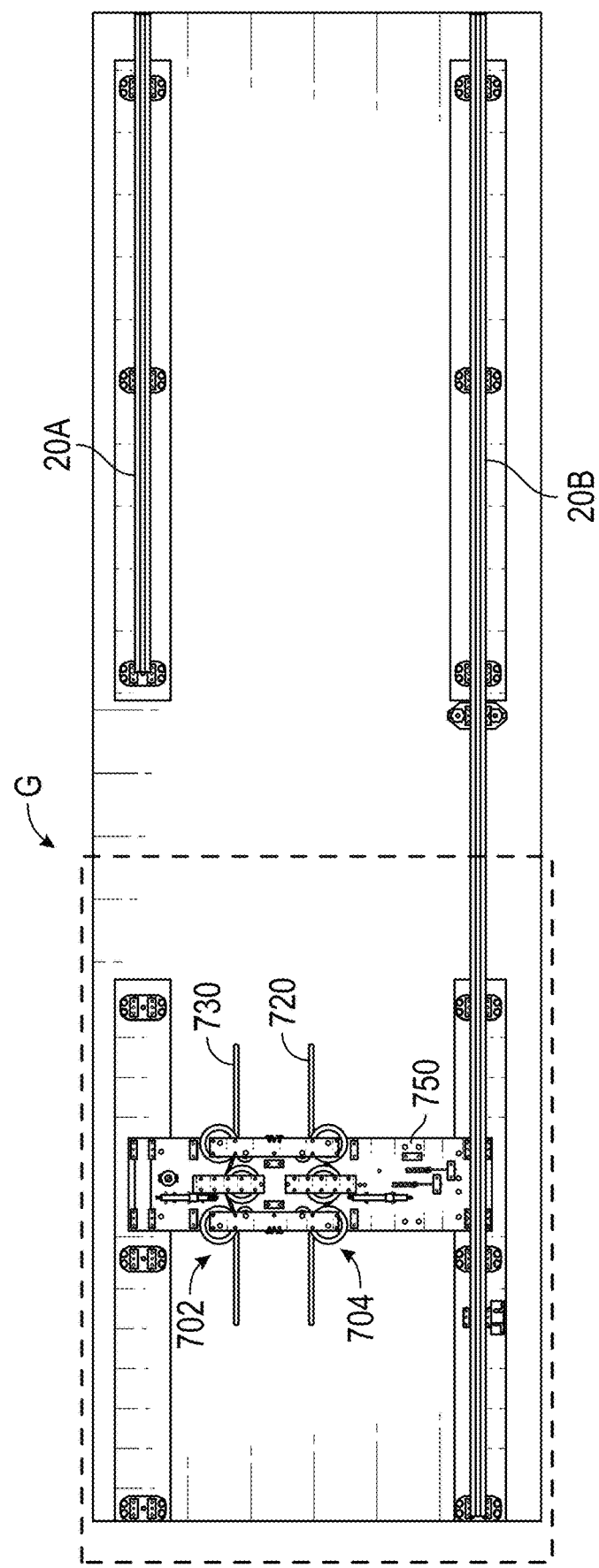

AUTOMATED BOAT LIFT AND TROLLEY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention is directed to a boat lift and trolley assembly, and more particularly to an automated boat lift and trolley assembly with integrated electronic control and sensor system for moving a boat between a boat garage and a dock channel.

Description of the Related Art

Boat lift assemblies exist. However, there is a need for an automated system and method for moving a boat between a boat garage for storage and a dock channel.

SUMMARY

In accordance with one aspect of the disclosure, an automated system is provided for moving a boat from a storage position in a boat garage to a deployed position in a dock channel.

In accordance with another aspect of the disclosure, a method for automated movement of a boat lift and trolley is provided for movement of a boat between a storage position in a boat garage to a deployed position in a dock channel.

In accordance with another aspect of the disclosure, an automated boat lift and trolley system for moving a boat from a boat garage and a dock is provided. The system comprises a track comprising a pair of rails, the track configured to run from a proximal end within a boat garage and a distal end at a dock, the pair of rails disposed beside a dock channel on the dock. The system also comprises a boat trolley configured to support a boat thereon, the boat trolley having a set of wheels that movably couple the trolley to the pair of rails of the track. The system also comprises a lift assembly disposed at the dock, the lift assembly operable to lift the boat off the trolley, and to lower the boat into water through the boat channel. The system also comprises one or more sensors configured to sense one or both of a position of at least a portion of the boat trolley and an operation position of the lift assembly. The system also comprises a controller configured to control operation of the boat trolley to move along the track, and to control the lift assembly to lower the boat into the water based at least in part on the sensed information communicated by the one or more sensors to the controller.

In accordance with another aspect of the disclosure, an automated boat trolley system for moving a boat from a boat garage and a dock is provided. The system comprises a lower frame having a set of wheels configured to movably couple the lower frame a track. The system also comprises an upper frame comprising at least two support bunkers configured to contact and support a hull of the boat thereon, the upper frame having one or more support beams removably coupleable to the lower frame and configured to be lifted off of the lower frame by a lift assembly at a dock. The lower frame comprises one or more Delrin guides configured to receive the support beams of the upper frame therein, the Delrin guides tapering outward to facilitate coupling of the upper frame to the lower frame, the outward taper configured to guide the beams of the upper frame into alignment with support beams of the lower frame.

In accordance with another aspect of the disclosure, an automated boat lift and trolley system for moving a boat between a boat garage and a dock is provided. The system comprises a track comprising a pair of track rails, the track configured to run from a proximal end within a boat garage and a distal end proximate a dock. The system also comprises a boat trolley configured to support a boat thereon, the boat trolley having a set of wheels that movably couple the trolley to the pair of track rails. The system also comprises a lift assembly disposed at the dock. The lift assembly comprises a platform spaced from the distal end of the track, the platform having a pair of platform rails onto which the boat trolley is moved from the track rails. The lift assembly is operable to lower the platform with the boat trolley and boat thereon to a lowered position to facilitate removal of the boat from the boat trolley for use. The lift assembly is operable to raise the platform with the boat trolley and boat thereon to a raised position, the pair of platform rails being substantially aligned with the pair of track rails when the platform is in the raised position to facilitate movement of the boat trolley between the platform and the track. The system also comprises a drive assembly as least partially disposed in the garage and configured to drive the movement of the boat trolley along the track and between the track and the platform. The system also comprises a controller at least partially disposed in the garage. The controller is configured to automatically control operation of the drive assembly to move the boat trolley along the track between the track and the platform, and to control the lift assembly to lower the boat trolley with the boat thereon to the lowered position based at least in part on the sensed information communicated by one or more sensors to the controller.

In accordance with another aspect of the disclosure, an automated boat lift and trolley system for moving a boat between a boat garage and a dock is provided. The system comprises a track comprising a pair of track rails, the track configured to run from a proximal end within a boat garage and a distal end proximate a dock. The system also comprises a boat trolley configured to support a boat thereon, the boat trolley having a set of wheels that movably couple the trolley to the pair of track rails. The system also comprises a drive assembly as least partially disposed in the garage and configured to drive the movement of the boat trolley along the track and between the track and a dock. The system also comprises a controller at least partially disposed in the garage, the controller configured to automatically control operation of the drive assembly to move the boat trolley along the track between the track and the dock.

In accordance with another aspect of the disclosure, an automated boat lift and trolley system for moving a boat between a boat garage and a dock is provided. The system comprises a track comprising a pair of track rails, the track configured to run from a proximal end within a boat garage and a distal end proximate a dock. The system comprises a boat trolley configured to support a boat thereon, the boat trolley having a set of wheels that movably couple the trolley to the pair of track rails. The system comprises a lift assembly disposed at the dock, the lift assembly comprising a platform spaced from the distal end of the track, the platform having a pair of platform rails onto which the boat trolley is moved from the track rails. The lift assembly is operable to lower the platform with the boat trolley and boat thereon to a lowered position to facilitate removal of the boat from the boat trolley for use, and the lift assembly is operable to raise the platform with the boat trolley and boat thereon to a raised position, the pair of platform rails being substantially aligned with the pair of track rails when the platform is in the raised position to facilitate movement of the boat trolley between the platform and the track. The system comprises a drive assembly as least partially disposed in the garage and configured to drive the movement of the boat trolley along the track and between the track and the platform. The system comprises a controller at least partially disposed in the garage, the controller configured to automatically control operation of the drive assembly to move the boat trolley along the track between the track and the platform, and to control the lift assembly to lower the boat trolley with the boat thereon to the lowered position based at least in part on the sensed information communicated by one or more sensors to the controller.

In accordance with another aspect of the disclosure, an automated boat lift and trolley system for moving a boat between a boat garage and a dock is provided. The system comprises a track comprising a pair of track rails, the track configured to run from a proximal end within a boat garage and a distal end proximate a dock. The system comprises a boat trolley configured to support a boat thereon, the boat trolley having a set of wheels that movably couple the trolley to the pair of track rails. The system comprises a drive assembly as least partially disposed in the garage and configured to drive the movement of the boat trolley along the track and between the track and a dock. The system comprises a controller at least partially disposed in the garage, the controller configured to automatically control operation of the drive assembly to move the boat trolley along the track between the track and the dock.

BRIEF DESCRIPTION OF THE DRAWINGS

FIG. 4A is a front view of the boat lift and trolley assembly of FIG. 2A, without the boat;

FIG. 25A is a schematic perspective partial view of a portion of the electronics system of the automated boat lift and trolley system;

FIG. 25B is a schematic perspective partial view of another portion of the electronics system of the automated boat lift and trolley system;

FIG. 33 is a schematic top view of the pulley and dual tensioner system relative to track of the automated boat lift and trolley of FIG. 31.

DETAILED DESCRIPTION

Figure 1:
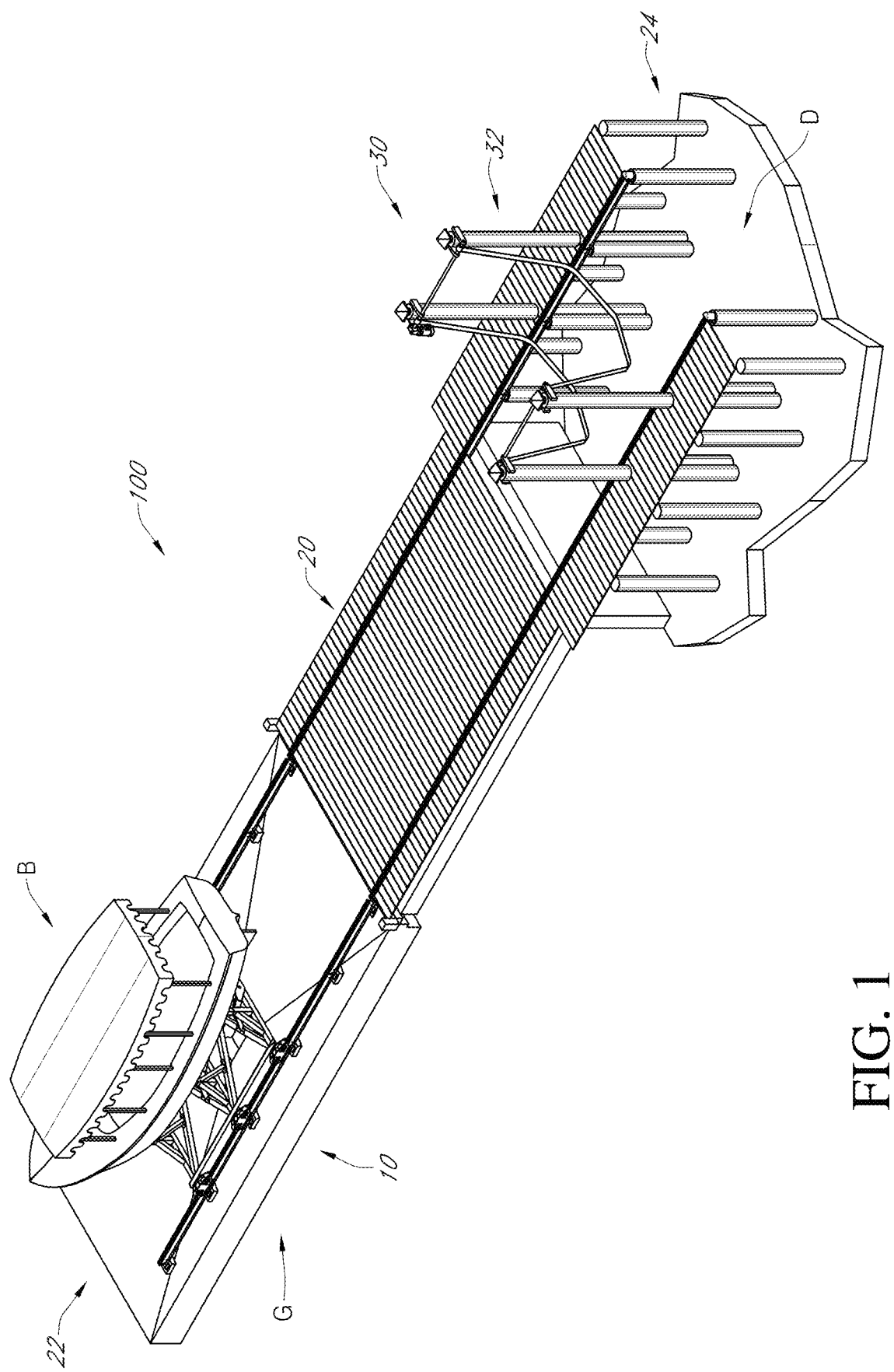
FIG. 1 is a perspective view of an embodiment of an automated boat lift and trolley assembly.

FIGS. 1-5 show an embodiment of a boat lift and trolley system 100 (hereafter "the system"). The system 100 includes a trolley 10 having a plurality of wheels and a frame on which a boat B can be removably supported. In one embodiment, the trolley 10 frame can be welded and made of aluminum, though other suitable metals or other suitable materials can be used. The trolley 10 frame can have a plurality of adjustable support pads 16 (see FIG. 9) to support a variety of different boat B hull profiles.

The trolley can travel along a track 20 that extends between a first end 22 and a second end 24 so that the track 20 extends between a boat garage G and a dock channel D. The track 20 can have a width W1. The dock channel D can have an opening with a width W2 that is at least as wide as width W1. The boat garage G can have a length L1 that is longer than a length of the boat B. The dock channel D can have a length L2 that is at least as long as the boat B. A height H of the track 20 from a top of the sea wall can be between about 4 inches and about 12 inches, for example about 6 inches. In one embodiment, the length L1 can be between about 30 feet and about 60 feet, for example about 40 feet and the length L2 can be between about 20 feet and about 50 feet, for example about 25 feet. The width W1 can be between about 15 feet and about 30 feet, for example about 19 feet. However, other suitable dimensions for the length L1, length L2 and width W1 can be used.

In the illustrated embodiment, the track 20 extends linearly between the first end 22 and the second end 24. The trolley 10 can travel along a length L3 from the boat garage G to the dock channel D. In another embodiment, at least a portion of the track 20 can have a curved portion (e.g., where needed to accommodate the spatial relationship between the boat garage G and the dock channel D).

A sling assembly 30 can include a plurality of posts 32. In the illustrated embodiment, two pairs of posts 32 are on opposites sides of the opening of the dock channel D. However, the sling assembly 30 can include additional pairs of posts 32. The sling assembly 30 can include a sling that extends between each pair of posts 32 and across the opening of the dock channel D.

Figure 2:
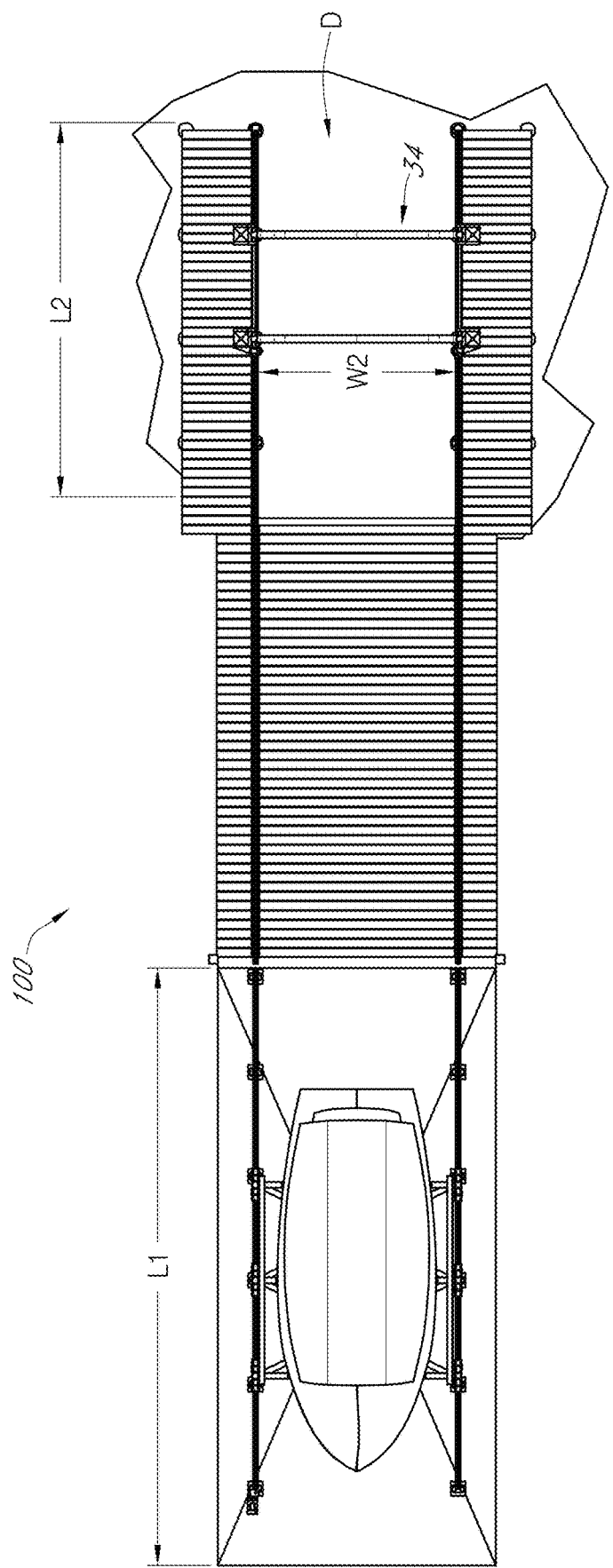
FIG. 2 is a top view of the boat lift and trolley assembly of FIG. 1.
Figure 2A:
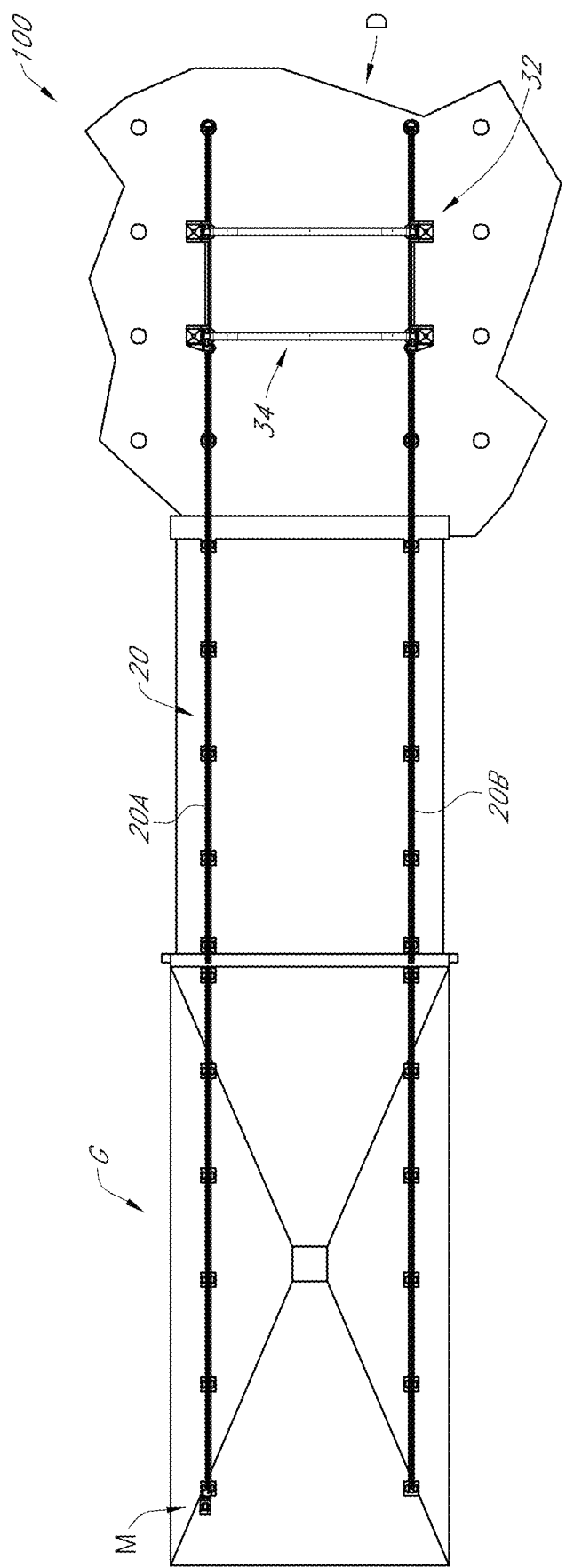
FIG. 2A is another top view of the boat lift and trolley assembly of FIG. 1, without the boat.

The system 100 further comprises a drive assembly, including a motor M see FIG. 2A) (e.g., electric motor, such as a single point robust motor drive) that drives movement of the trolley 10 along the track 20 between the proximal end 22 and the distal end 24. In one embodiment, the motor M can operate a chain drive, such as a stainless steel chain drive, that is attached to the trolley 10 (e.g., to one or more wheels of the trolley 10). In one embodiment, the track drive can be located in the boat garage G. In one implementation, the motor M is mounted to the track 20. In another implementation, the motor M is mounted adjacent the track 20. In one implementation, the motor M can be an electric motor. In another implementation, the motor can be a hydraulic motor.

Figure 2B:
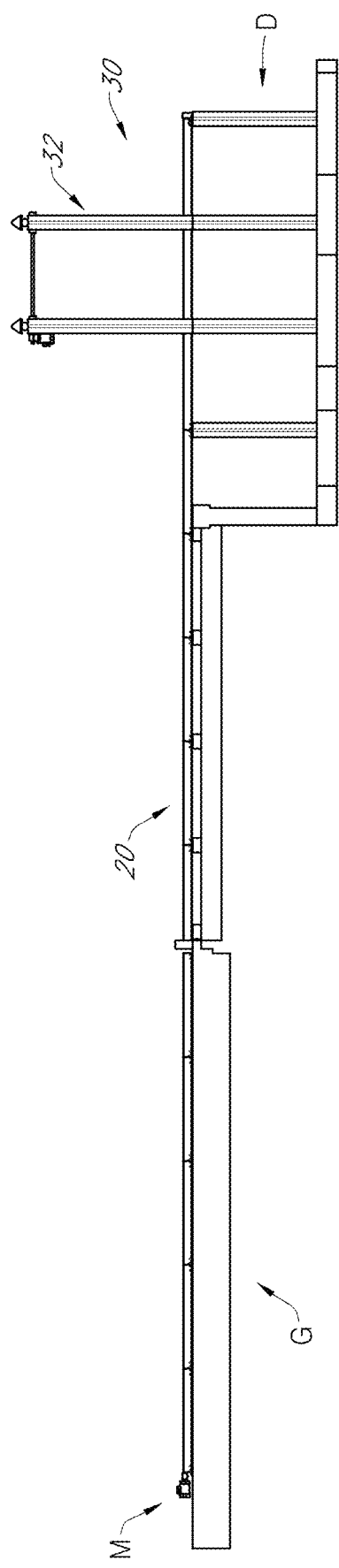
FIG. 2B is a side view of the boat lift and trolley assembly of FIG. 2A.
Figure 3:
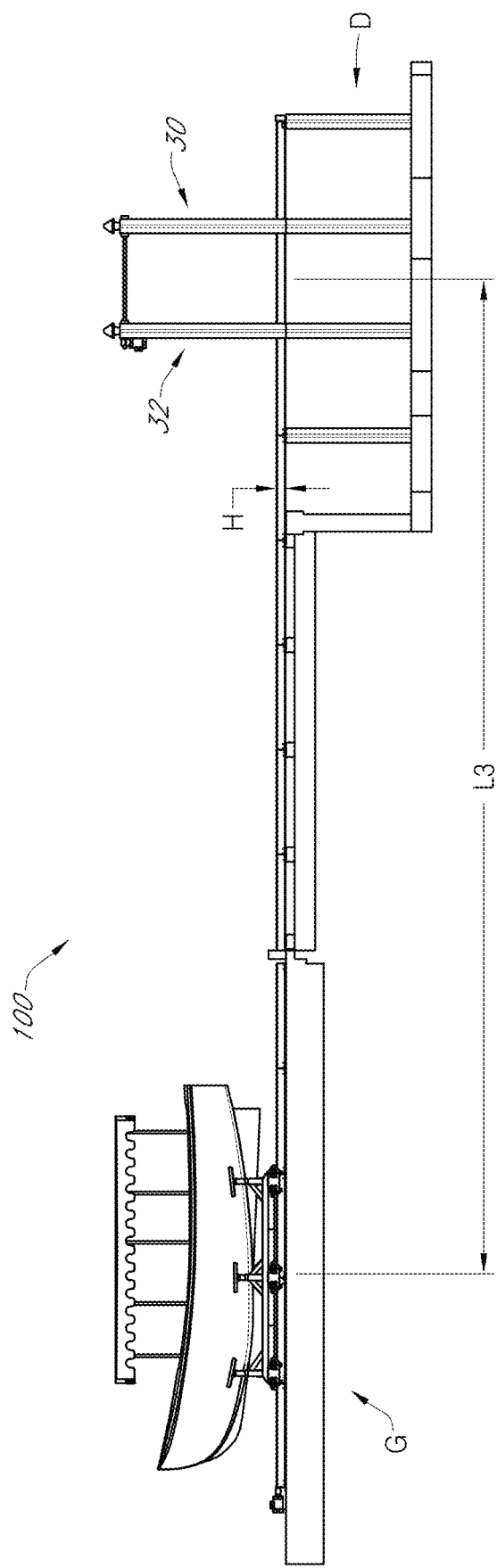
FIG. 3 is a side view of boat lift and trolley assembly of FIG. 1.
Figure 4B:
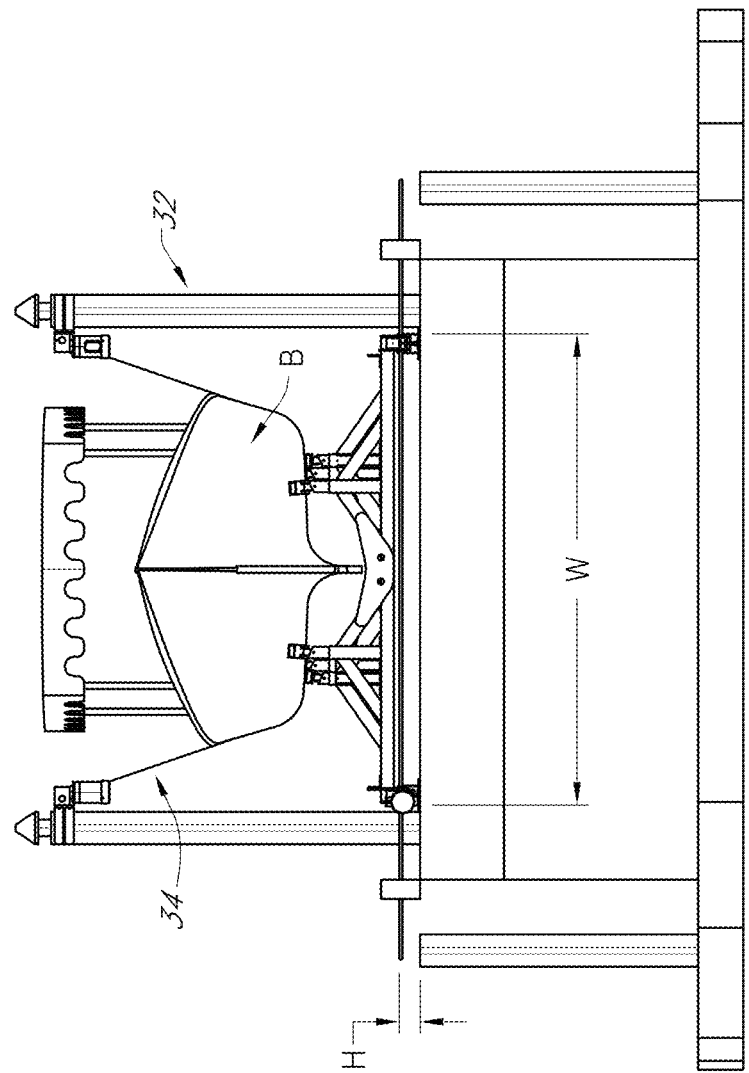
FIG. 4B is a front view of the boat lift and trolley assembly of FIG. 1.
Figure 5:
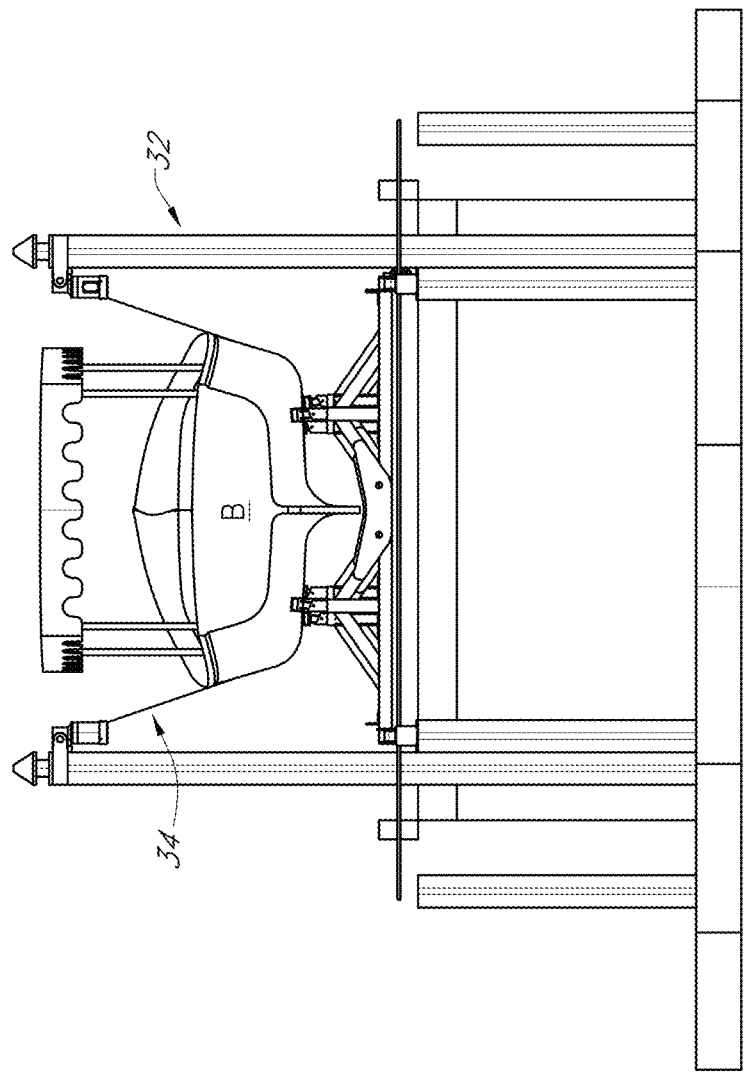
FIG. 5 is a rear view of the boat lift and trolley assembly of FIG. 1.

Though FIGS. 2A-2B and 4A show various dimensions for various components of the assembly 100, one of skill in the art will recognize that the various components of the assembly 100 can have other suitable dimensions.

Figure 6:
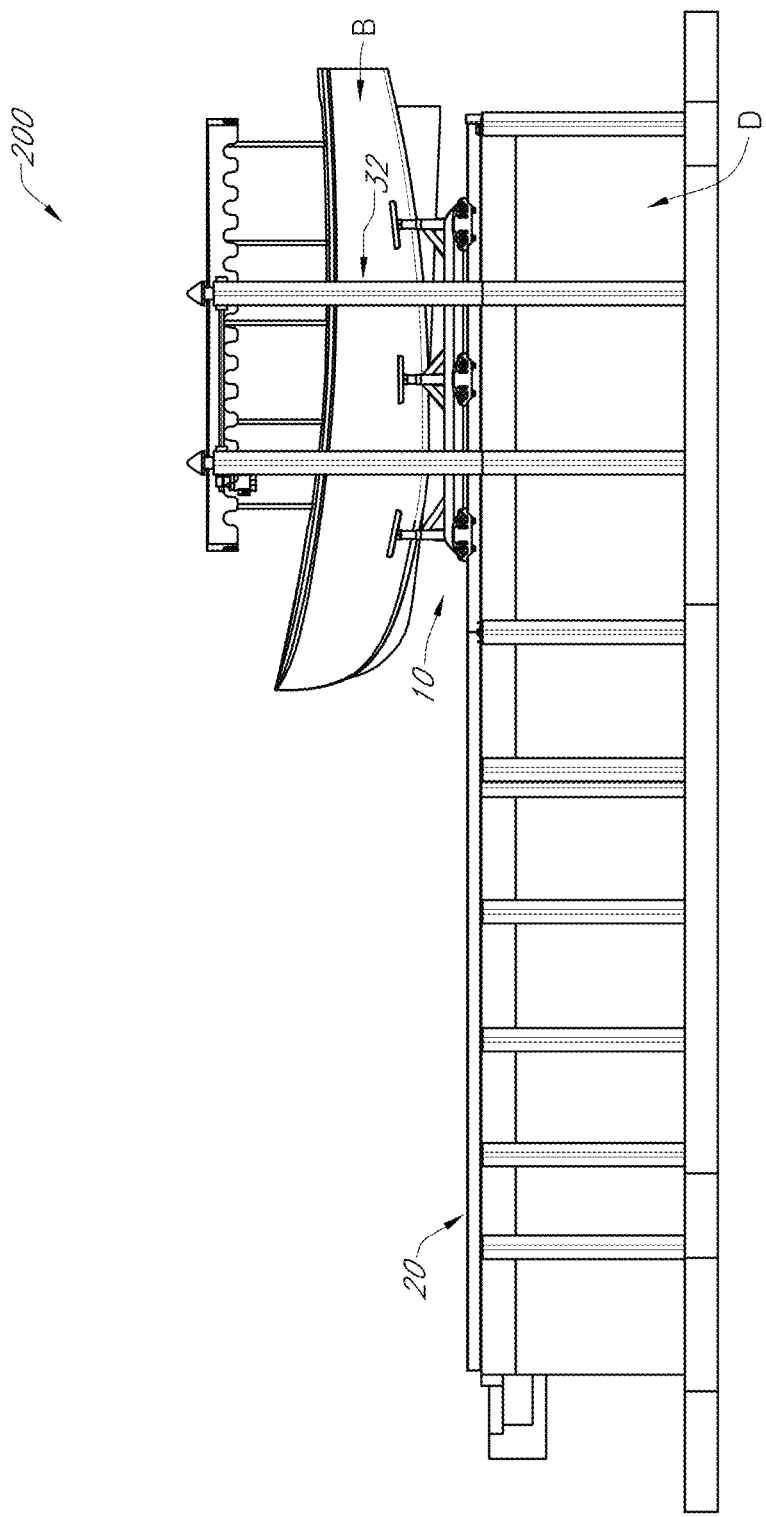
FIG. 6 is a side view of a boat lift and trolley assembly.
Figure 7:
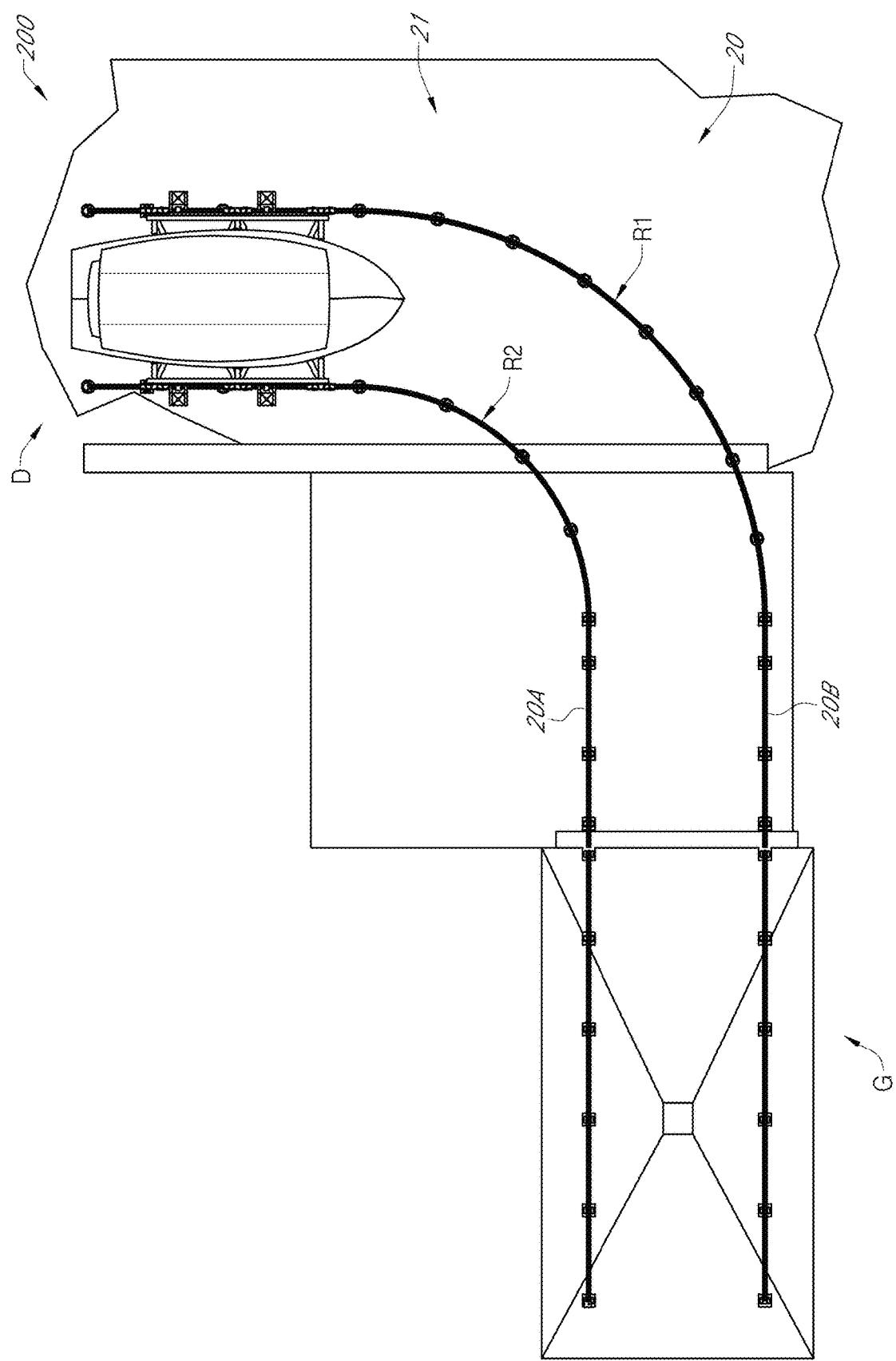
FIG. 7 is a top view of the boat lift and trolley assembly of FIG. 6.
Figure 8:
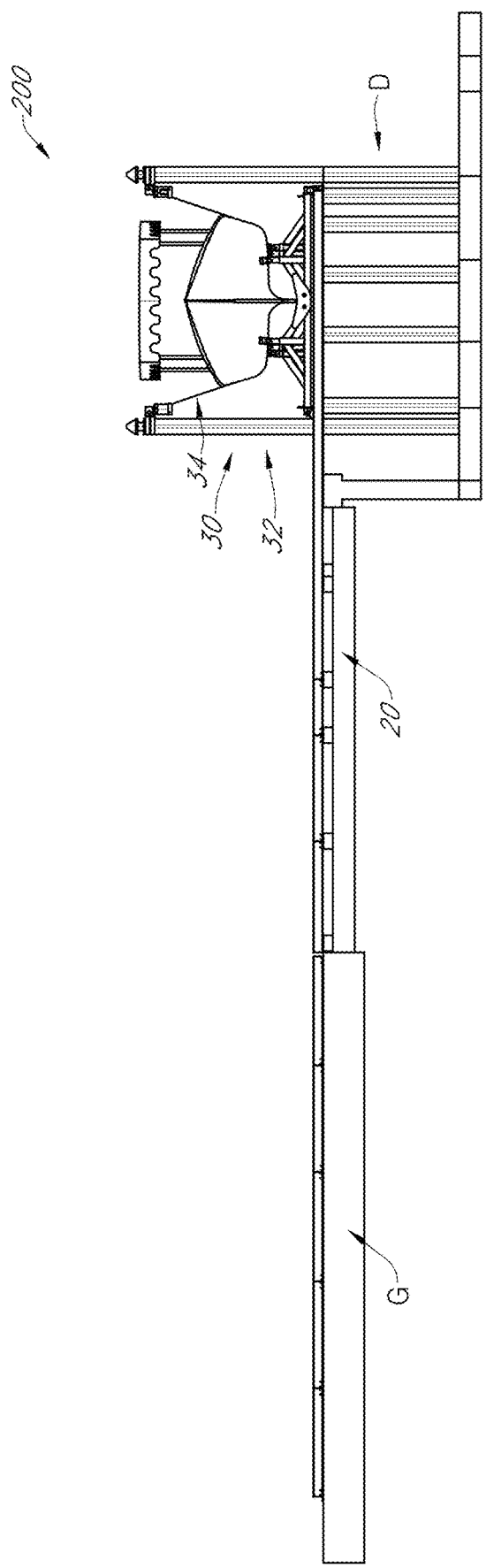
FIG. 8 is a front view of the boat lift and trolley assembly of FIG. 6.

FIGS. 6-8 show another embodiment of a boat lift and trolley system 200 (hereinafter "the system"). The system 200 is similar to the system 100 shown in FIGS. 1-5, except as noted below. Thus, the reference numerals used to designate the various components of the system 200 are identical to those used for identifying the corresponding components of the system 100 in FIGS. 1-5 and the description for the various components of the system 100 shown in FIGS. 1-5 is understood to apply to the corresponding components of the system 200 in FIGS. 6-8, except as described below.

The system 200 differs from the system 100 only in that at least a portion of the track 20 has a curved portion 21 between the dock channel D and the boat garage G. As best shown in FIG. 7, the curved portion 21 can have an outer rail with a first radius of curvature R1 and an inner rail with a second radius of curvature R2. In some embodiments, radius of curvature R2 can be less that the radius of curvature R1.

Though FIGS. 7-8 show various dimensions for various components of the system 200, one of skill in the art will recognize that the various components of the system 200 can have other suitable dimensions.

Figure 9:
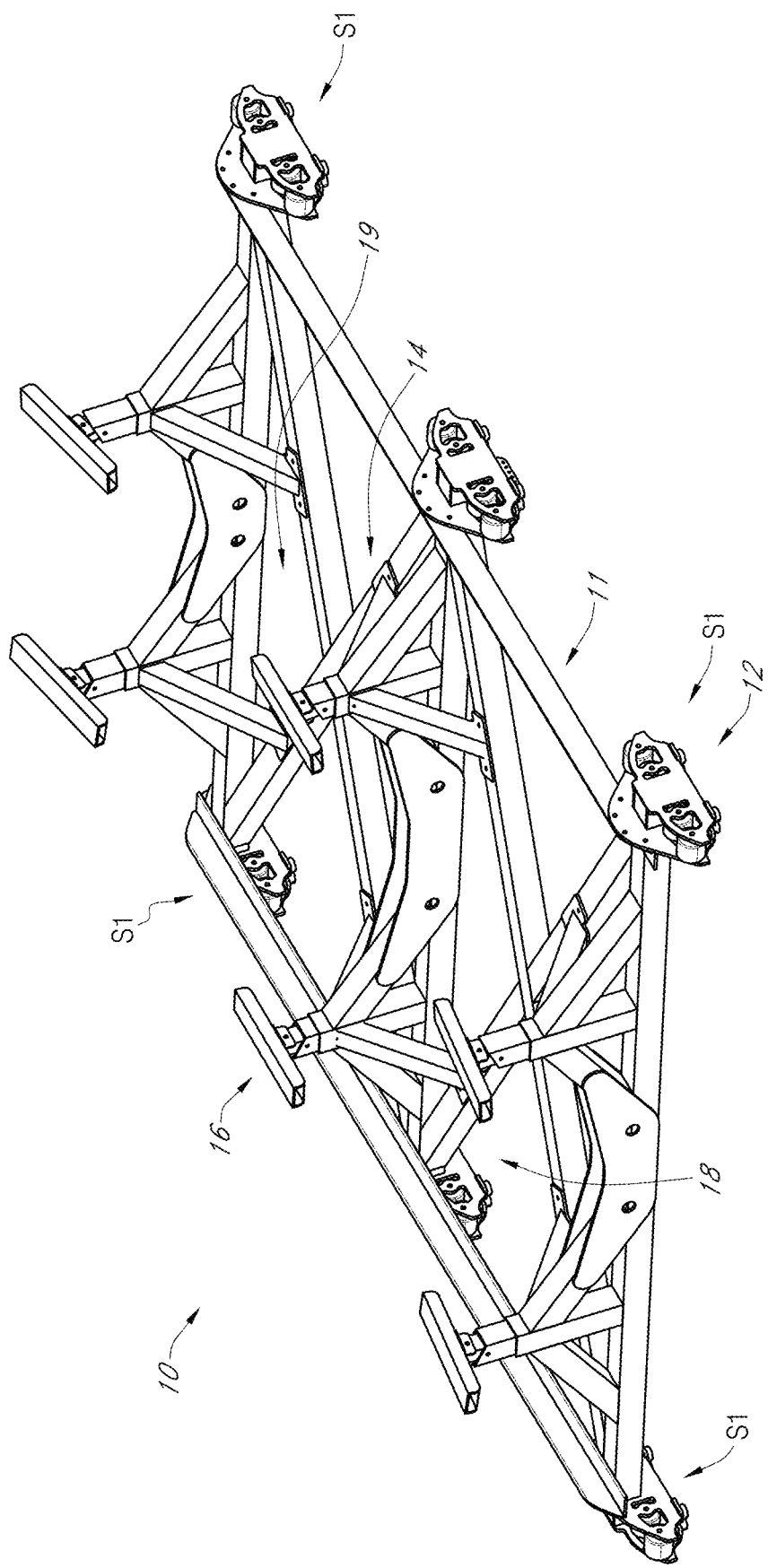
FIG. 9 is a perspective top view of a trolley assembly.
Figure 10:
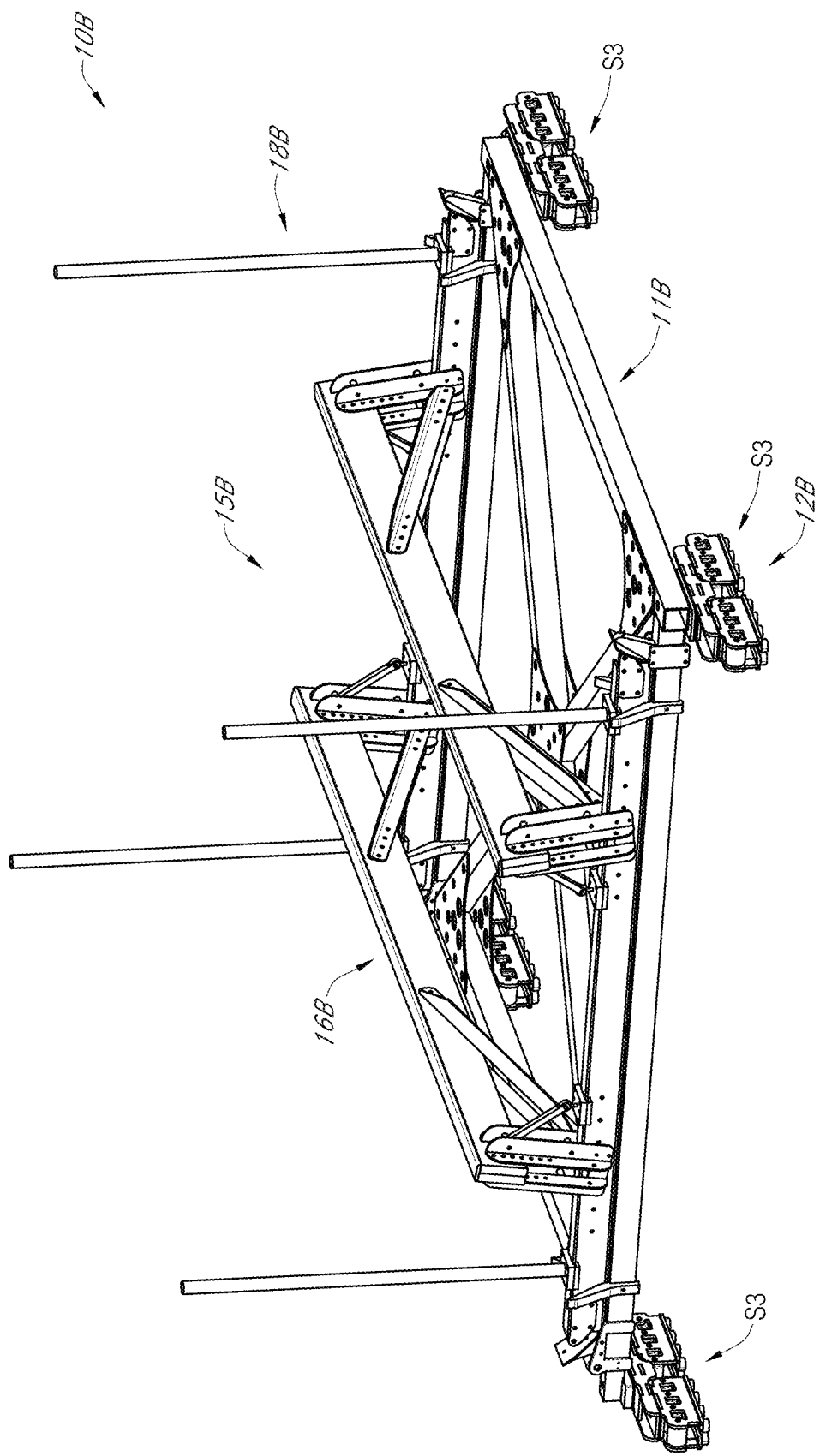
FIG. 10 is a perspective view of another embodiment of a trolley assembly.
Figure 11:
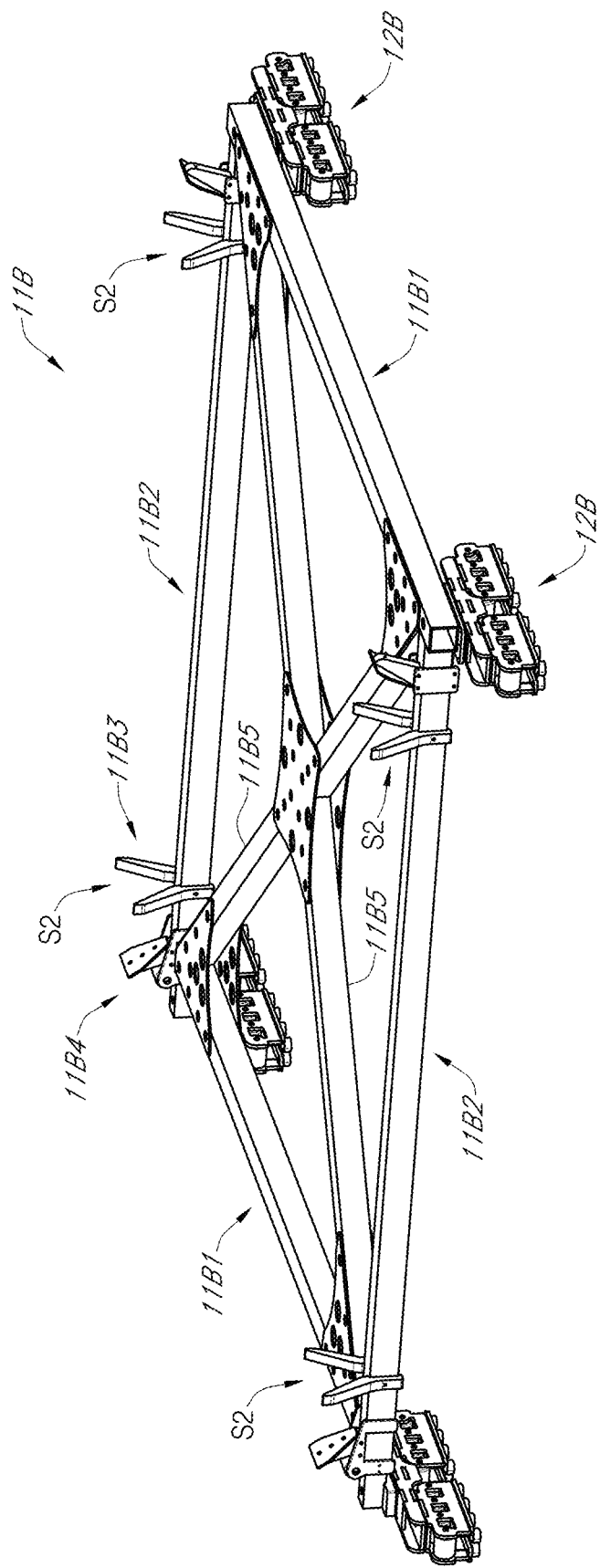
FIG. 11 is a perspective view of a lower frame of the trolley assembly of FIG. 10.
Figure 12:
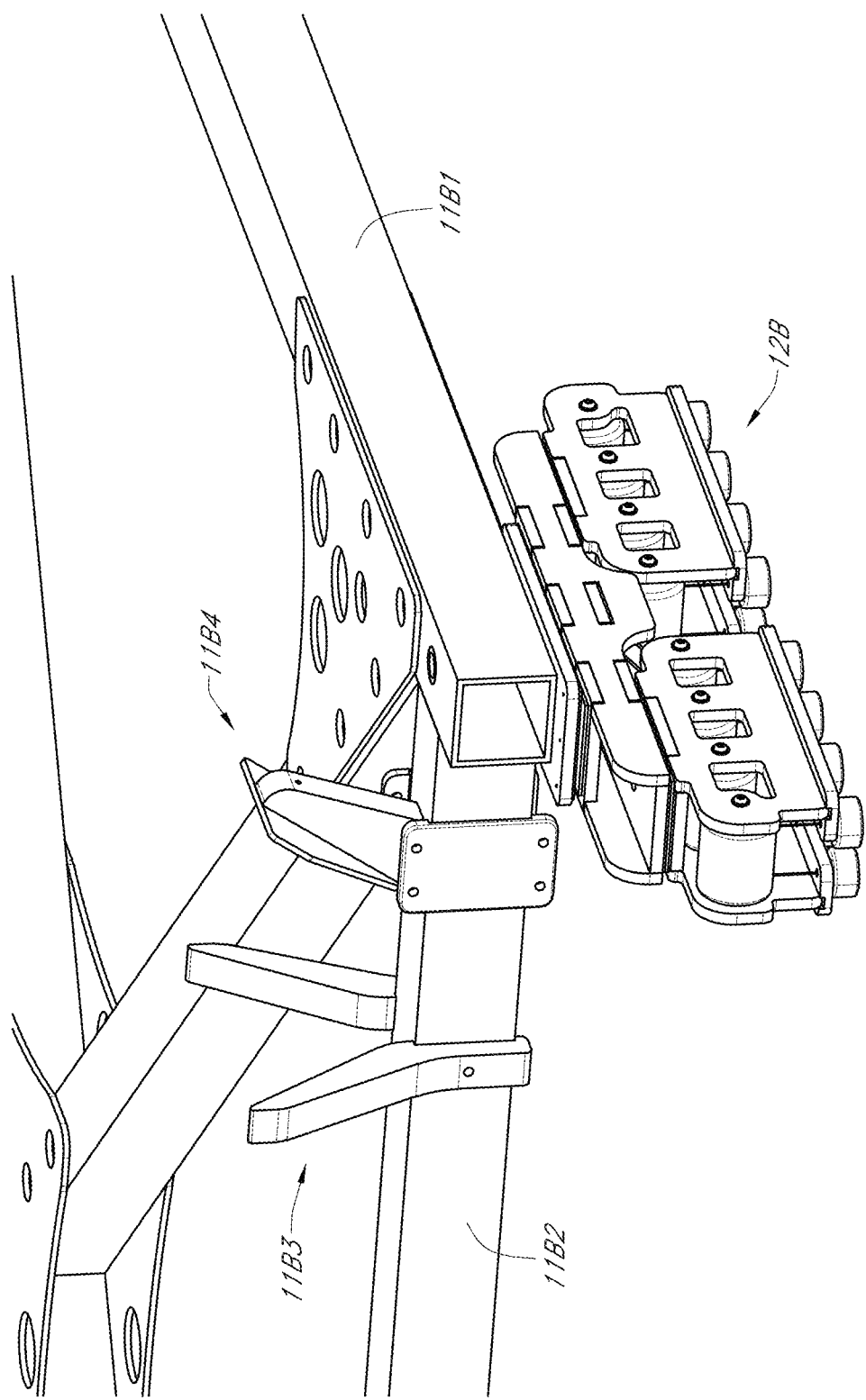
FIG. 12 is a partial view of the lower frame of FIG. 11.

FIG. 9 shows one embodiment of a trolley 10 for use with the system 100, 200. The trolley 10 can be made of metal, such as aluminium or steel. In one embodiment, the trolley 10 can be rated to hold a boat B weighing 26000 lbs or more. The trolley 10 can have a pair of side rails 11, each of which is coupled to a plurality of wheels 12 (e.g., Delrin wheels) that can ride on the track 20. In the illustrated embodiment, each side rail 11 is coupled to or supports three sets of wheels 12. The trolley 10 can include a frame 14 that extends between the pair of rails 11 and defines a channel 18 along a longitudinal axis of the trolley 10. The trolley 10 also has a plurality of support pads 16 for supporting the hull of the boat B. In the illustrated embodiment, a plurality of support pads 16 are arranged in two rows on each side of the channel 18. The support pads 16 can advantageously be adjustable (e.g., in height, in angular orientation) to allow them to be adjusted to fit varying hull profiles. In the illustrated embodiment, the trolley 10 has six support pads 16 arranged in three pairs about the channel 18. The trolley 10 also defines a channel 19 between each two pairs of support pads 16 in a direction transverse to the longitudinal axis of the trolley 10. Said channel 19 allows for the slings 34 to easily be passed under the hull portion between said two pairs of support pads 16 to couple the slings 34 to the posts 32 when the boat B is to be lowered into the dock channel D, or to decouple the slings 34 from the posts 32 when the boat B has been lifted out of the water and onto the trolley 10 and is ready to be moved to the boat garage G.

The trolley 10 can have one or more proximity sensors S1 that can be disposed on one or more of the wheel assemblies 12 (e.g., a wheel assembly 12 on a proximal end of the trolley 10, a wheel assembly 12 on a distal end of the trolley 10). The proximity sensor(s) S1 can sense an obstruction (e.g., on the track 20) and communicate (wirelessly) with the controller EM (in the garage G, such as on a wall of the garage G), which can stop the movement of the trolley 10, as further discussed below, if an obstruction is sensed.

FIGS. 10-16 show another embodiment of a boat trolley assembly 10B. The boat trolley assembly 10B is similar to the boat trolley assembly 10 shown in FIGS. 1-9, except as noted below. Thus, the reference numerals used to designate the various components of the boat trolley assembly 10B are similar to those used for identifying the corresponding components of the boat trolley assembly 10 in FIGS. 1-9 and the description for the various components of the boat trolley assembly 10 shown in FIGS. 1-9 is understood to apply to the corresponding components of the boat trolley assembly 10B in FIGS. 10-16, except as described below.

Figure 14:
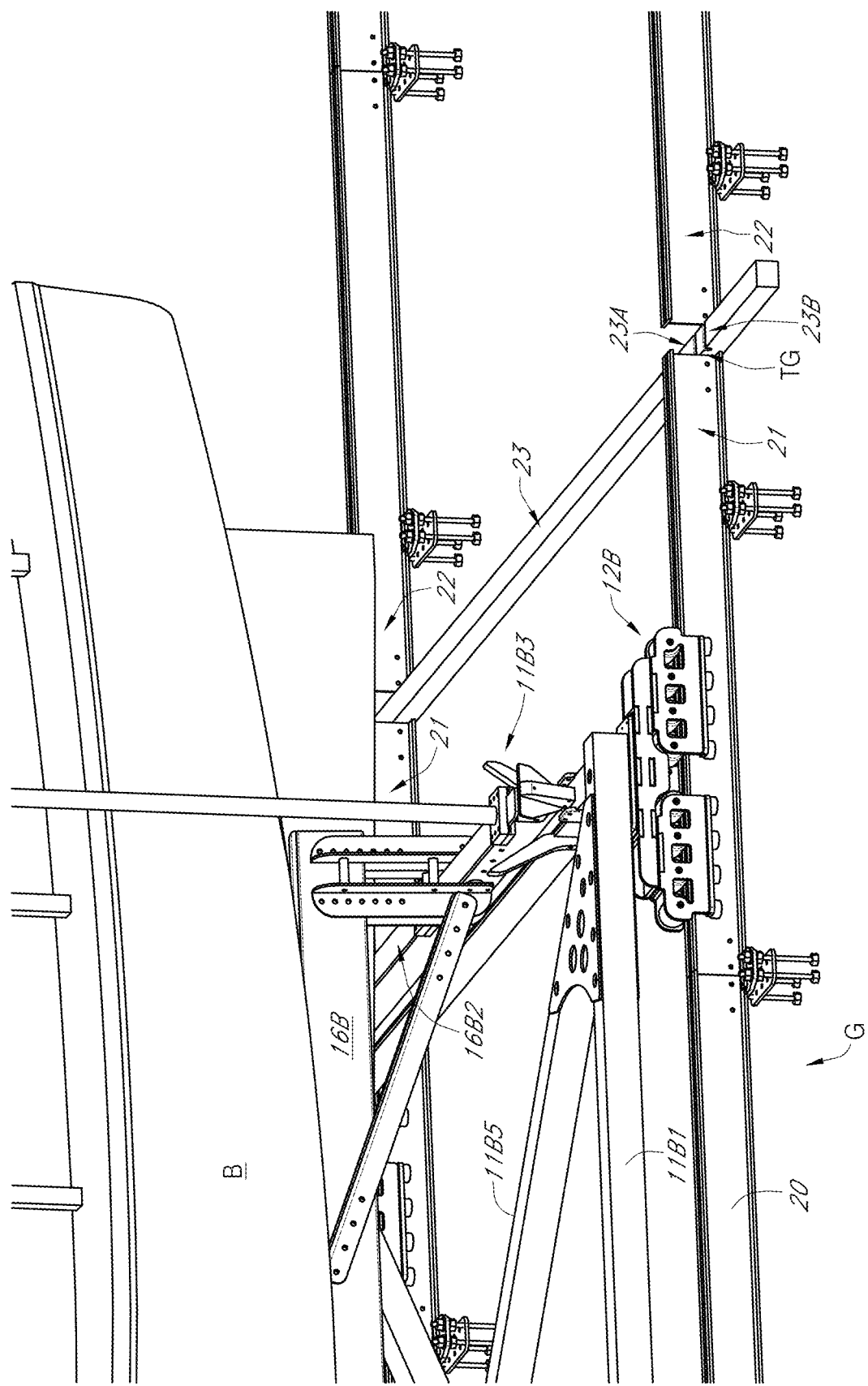
FIG. 14 is a partial view of the trolley assembly of FIG. 10 on a track with the boat disposed on the trolley.
Figure 15:
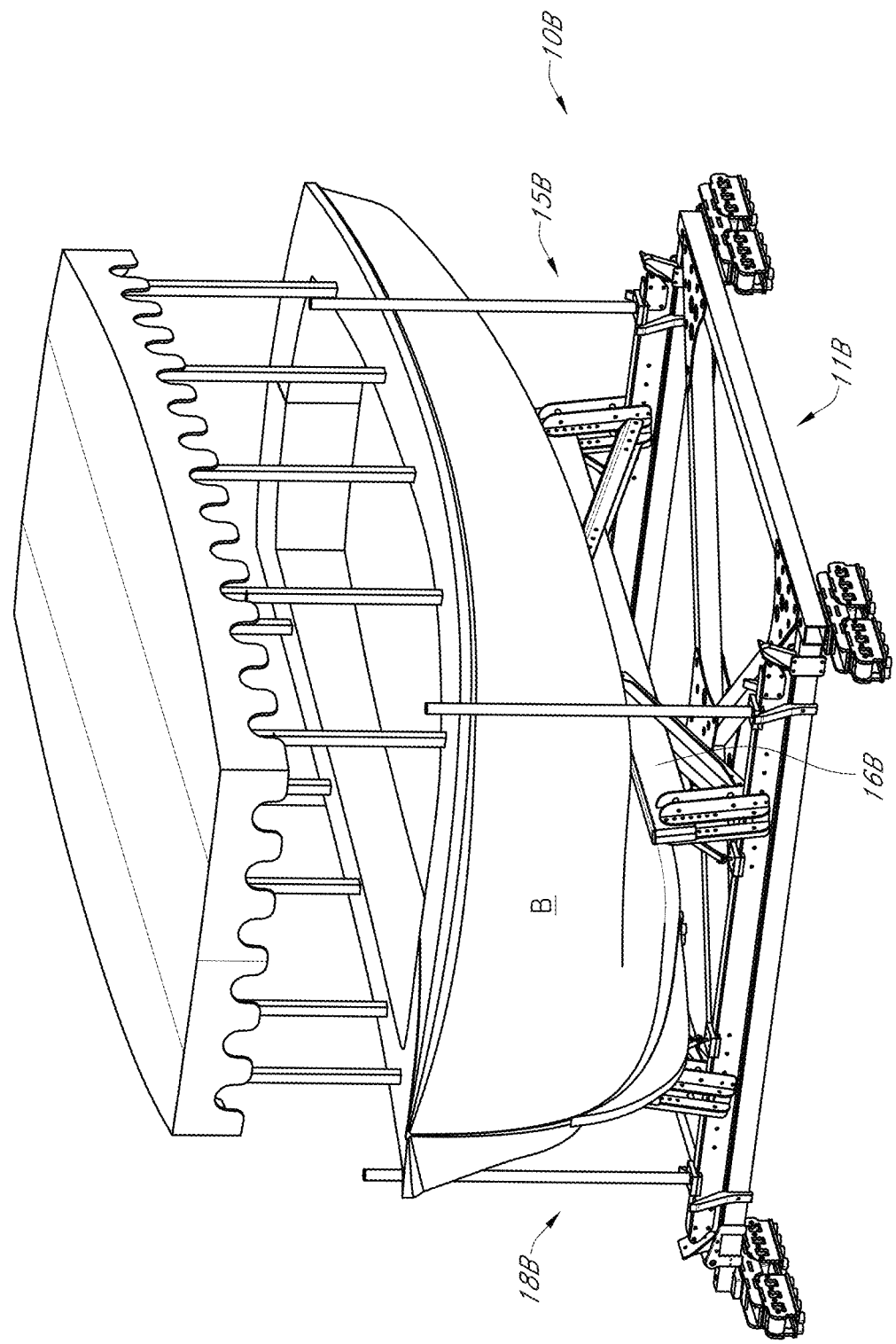
FIG. 15 is a perspective view of the trolley assembly of FIG. 10 with a boat disposed thereon.

The boat trolley assembly 10B includes a lower frame 11B and an upper frame 15B removably disposed on and coupled to the lower frame 11B. The lower frame 11B is supported on a set of wheel assemblies 12B (e.g., Delrin wheels) that couple to rails of the track 20. As best shown in FIG. 14, the wheel assemblies 12B can extend over an I-beam portion of the rails of the track 20 to couple to the track 20.

The lower frame 11B can have support beams 11B1, 11B2 that extend between and couple (e.g., with bolts, welds, etc.) to the set of wheel assemblies 12B. Additionally, the lower frame 11B can have crossbeams 11B5 that extend between the wheel assemblies 12B in a diagonal manner and can couple to the support beams 11B1, 11B2 (e.g., with bolts, welds, etc.).

The lower frame 11B can also have a set of angled Delrin guides 11B3 coupled to the beams 11B2 (e.g., with bolts, welds, etc.) that can receive thereon a beam of the upper frame 15B to couple the upper frame 15B to the lower frame 11B. In the illustrated embodiment, the lower frame 11B has four Delrin guides 11B3, one at each corner of the lower frame 11B (e.g., proximate the wheel assemblies 12B). However, in other embodiments, the lower frame 11B can have fewer or more Delrin guides 11B3. The angled Delrin guides 11B3 advantageously allow the upper frame 15B to be positioned properly onto the lower frame 11B, the angled shape of the Delrin guides 11B3 allowing the upper frame 15B to achieve the correct position on the lower frame 11B even if the upper frame 15B is initially misaligned relative to the lower frame 11B.

The lower frame 11B also have a plurality of supports (e.g., angled supports) 11B4 (generally at the corners of the lower frame 11B, coupled such as with bolts or welds to the beams 11B2) configured to receive pick points of the upper frame 15B thereon, as discussed further below.

Figure 13:
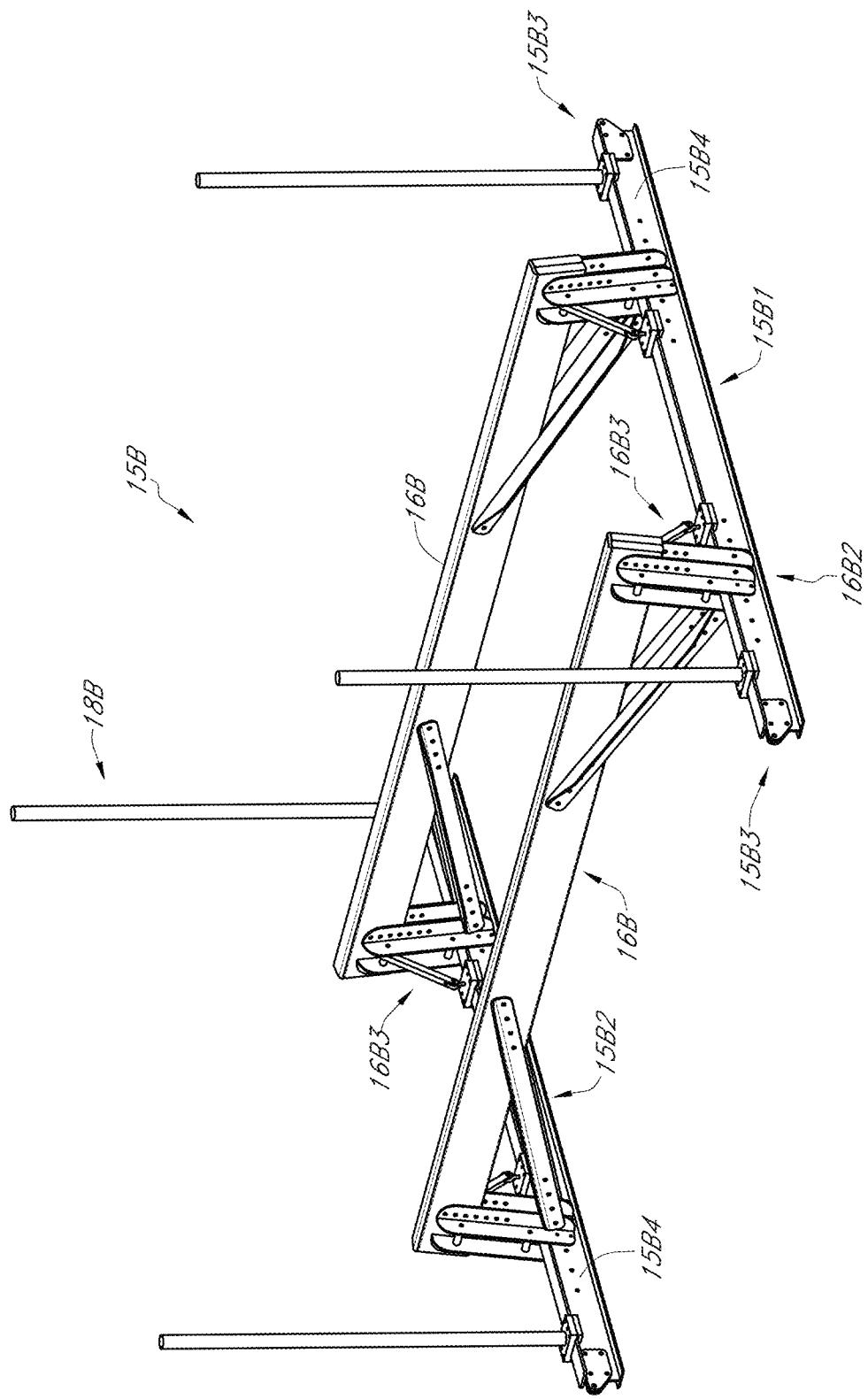
FIG. 13 is a perspective view of an upper frame of the trolley assembly of FIG. 10.

With reference to FIG. 13, the upper frame 15B can include a pair of boat support bunkers 16B that extend between and are coupled (e.g., with bolts) to a pair of support beams 15B1, 15B2 (e.g., I-beams) by bracket assemblies 16B2 on either end of the boat support bunkers 16B. The bracket assemblies 16B2 can couple to the support beams 15B1, 15B2 (e.g., with bolts) at various locations along the length of the support beams 15B1, 15B2 via one or more bolt holes 15B4 in the support beams 15B1, 15B2 (that receive bolts, clevis pins, etc.) to adjust a width between the boat support bunkers 16B to advantageously accommodate a variety of boat hull sizes thereon. Additionally, angle adjustment assemblies 16B3 can couple to the support beams 15B1, 15B2 (e.g., with bolts) and to the bracket assemblies 16B2 proximate the boat support bunkers 16B at both ends of the boat support bunkers 16B. The angle adjustment assemblies 16B3 can be adjusted to adjust the angle between a plane defined by the boat support bunker 16B relative to a horizontal plane defined by the support beams 15B1, 15B2, to advantageously accommodate boat hulls of different sizes and shapes (e.g., boat hulls that are wider and extend at a lower angle towards the bottom of the boat, boat hulls that are narrower and extend at a steeper angle toward the bottom of the boat). Accordingly, the user can adjust (e.g., manually adjust) both the width between the support bunkers 16B and the angle of the support bunkers 16B and the horizontal plane defined by the support beams 15B1, 15B2, as described above, to ensure the support bunkers 16B are adequately spaced and oriented to support the hull of the user's boat B.

The upper frame 15B can have a plurality of pick-up assemblies 15B3 coupled to (e.g., bolted, welded, etc.) to ends of the support beams 15B1, 15B2, from which the upper frame 15B can be raised off of the lower frame 11B, for example to then lower the upper frame 15B with the boat B supported thereon into the water at the end of the dock. In one embodiment, the pick-up assemblies 15B3 can include a quick disconnect member or a clevis pin that can be used to couple cable clevises from a lift mechanism to the upper frame 15B (e.g., via holes in pick-up assemblies 15B3) at the dock to lift the upper frame 15B off the lower frame 11B, after which the lower frame 11B can be moved out of the way (as discussed above) to allow the upper frame 15B to be lowered into the water with the boat B thereon so that the boat B can then be navigated in the water.

The upper frame 15B can also have a plurality of vertical guide poles 18B that can serve to guide the operator of the boat B to navigate the boat B onto the upper frame 15B (e.g., in proper alignment) while it's submerged and so that when the upper frame 15B is raised by the lift mechanism, the boat support bunkers 16B can engage and support the bottom of the hull of the boat B.

The lower frame 11B can have one or more proximity sensors S2 that can signal whether the upper frame 15B is disposed more than a predetermined distance above the lower frame 11B, to thereby allow a controller to move the lower frame 11B out of the way before the upper frame 15B is lowered into the water at the dock (via the lift mechanism). In one embodiment, the proximity sensors S2 can be disposed on the Delrin guides 11B3. In another embodiment, the proximity sensors S2 can be disposed on one or more of the support beams 11B1, 11B2 or crossbeams 11B5.

The trolley 10B can have one or more proximity sensors S3 that can be disposed on one or more of the wheel assemblies 12B (e.g., a wheel assembly 12B on a proximal end of the trolley 10B, a wheel assembly 12B on a distal end of the trolley 10B). The proximity sensor(s) S3 can sense an obstruction (e.g., on the track 20) and communicate (wirelessly) with the controller EM (in the garage G, such as on a wall of the garage G), which can stop the movement of the trolley 10B, as further discussed below, if an obstruction is sensed.

Additionally, the posts or pilings 32 of the dock can have one or more sensor clips mounted thereon that can prevent the trolley 10B from moving (e.g., that can communicate a signal to a controller to prevent the trolley 10B from moving) unless the sensor clips are coupled to lift cable clevises (e.g., that have been decoupled from the pickup assemblies 15B3 of the upper frame 15B), which would also deactivate the boat lift mechanism. Advantageously, this would prevent the trolley 10B from moving away from the dock while the cables of the lift mechanism were attached to the upper frame 15B, avoiding damage to the dock or lift mechanism. In other embodiments, one or more sensors (e.g., weight sensors on the trolley 10B or sensors on the lift mechanism LM) can sense when the upper frame 15B has been lifted off the lower frame 11B by a predetermined amount to allow the lower frame 11B to be moved out of the dock D to allow the upper frame 15B and boat B to be lowered into the water through the dock channel.

Figure 16:
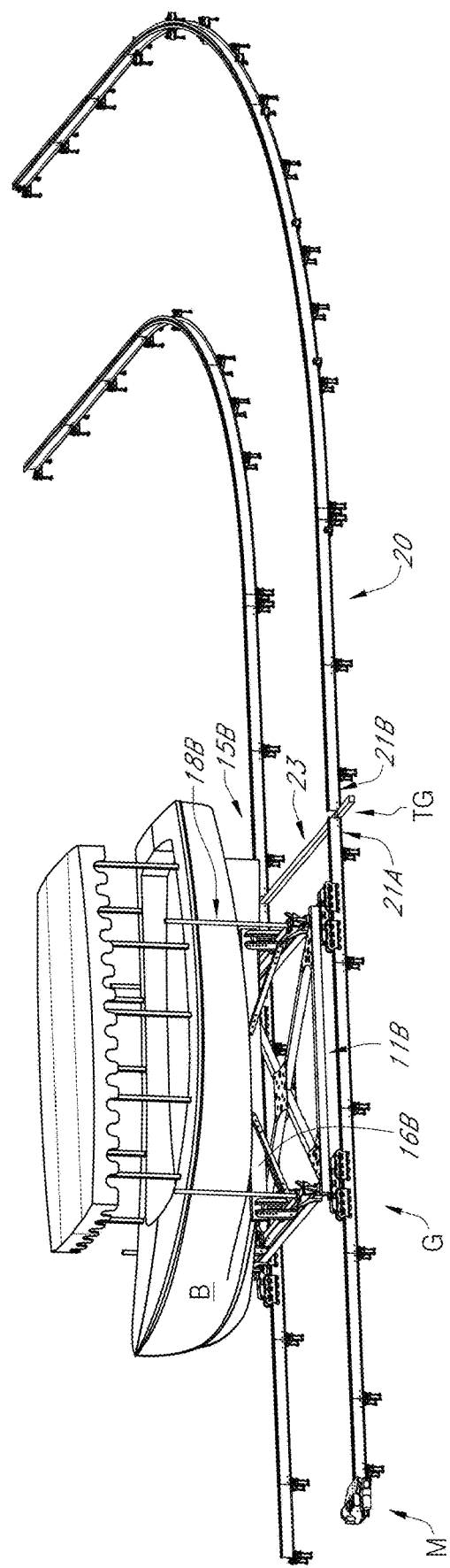
FIG. 16 is a perspective view of the trolley assembly of FIG. 10 on a track and with a boat disposed on the trolley.

With reference to FIGS. 14 and 16, the track 20 can have a gap TG between a first section 21A and a second section 21B of the track 20 and a spacer member 23 that extends along the gap TG between the first and second sections 21A, 21B. In one embodiment, the gap TG can be defined at the location where the garage door GD closes off the boat garage G to allow the garage door GD to close the garage G (e.g., for the garage door GD to bear against the spacer member 23) so as to inhibit entry of debris (e.g., leaves, dirt) and vermin or insects into the garage G. The wheel assemblies 12, 12B advantageously can span the gap TG so that the gap TG does not inhibit the movement of the trolley 10, 10B over the gap TG while it moves from the first section 21A to the second section 21B of the track 20. The spacer member 23 has a first groove 23A on one side of the track 20 and a second groove 23B on an opposite side of the track 20, where the grooves 23A, 23B can receive a chain drive (not shown) of the drive mechanism when the chain detensions (e.g., once the trolley 10, 10B is in the boat garage G and has stopped moving).

The trolley assembly 10B can be made of a suitable metal (e.g., rust resistant metal, such as aluminium or stainless steel). In one embodiment, the boat support bunkers 16B can be made from wood. However, other suitable materials can be used. In one embodiment, the trolley assembly 10B can have a weight rating of 10,000 pounds. However, in other embodiments, the trolley assembly 10B can support boats B weighing less than or more than this.

FIGS. 17-26B schematically illustrate a boat lift and trolley system 300 (hereinafter "the system"). The system 200 is similar to the system 100 in FIGS. 1-5 and the system 200 in FIGS. 6-8, except as described below. Therefore, reference numerals used to designate the various components of the system 300 are identical to those used for identifying the corresponding components of the system 100 in FIGS. 1-5 or system 200 in FIGS. 6-8. Thus, the structure and description for the various features or components of the system 100 in FIGS. 1-5 and of the system 200 in FIGS. 6-8 are understood to also apply to the corresponding features or components of the system 300 in FIGS. 17-26B, except as described below.

The system 300 differs from the system 100, 200 in that it includes a platform lift mechanism 30'. The platform lift mechanism 30' can include a platform 34' that supports a pair or rails 20A', 20B' ("platform rails") thereon. The platform 34' can include a frame that supports the rails 20A', 20B'. The rails 20A', 20B' can substantially align with the rails 20A, 20B of the track 20 to allow the boat trolley 10, 10B, 10C to travel from the track 20 onto the platform 34' with the boat B thereon. The platform 34' can be moved (e.g., via a hydraulic mechanism) between a raised state (see FIG. 20A) where the rails 20A', 20B' of the platform 34' substantially align with the rails 20A, 20B of the track 20, and a lowered state (see FIG. 21, 21A) where the platform 34' is lowered from the dock to underwater position to allow the boat B to be removed from the trolley 10, 10B, 10C. The platform 34' advantageously has a low profile and excludes the need for any above dock hardware (e.g., such as posts 32 or slings 34). The trolley 10, 10B, 10C remains on the platform 34' as it moves between the lowered and raised state. As further discussed below, the platform lift mechanism 30' includes a drive assembly M' operable to move the trolley 10, 10B, 10C onto, as well as off, the platform 34'.

The platform lift mechanism 30' of FIGS. 17-26B can have one or more sensors S8, S8A (see FIGS. 24F-24G) that sense the position of the platform 34' to determine if it's in a lowered position or in a raised position. The sensor(s) S8, S8A can optionally be powered by low voltage line power that powers the motor M' on the platform lift mechanism 30', said low voltage line power carried via a conduit to the sensor(s) S8, S8A. In one implementation, if the platform 34' is in the raised position with the trolley 10, 10B, 10C (with boat B) on it, the controller EM (in the garage G) will optionally actuate the hydraulics of the lift mechanism 30' in the up mode to ensure the platform 34' is fully raised. Once a signal from the sensor(s) S8, S8A confirm the platform 34' is fully raised and/or signal from the sensor(s) S7 confirm the platform 34' is aligned with the track 20, the mule 50' can move the trolley 10, 10B, 10C from the platform 34' onto the track 20, as further discussed below.

Figure 17:
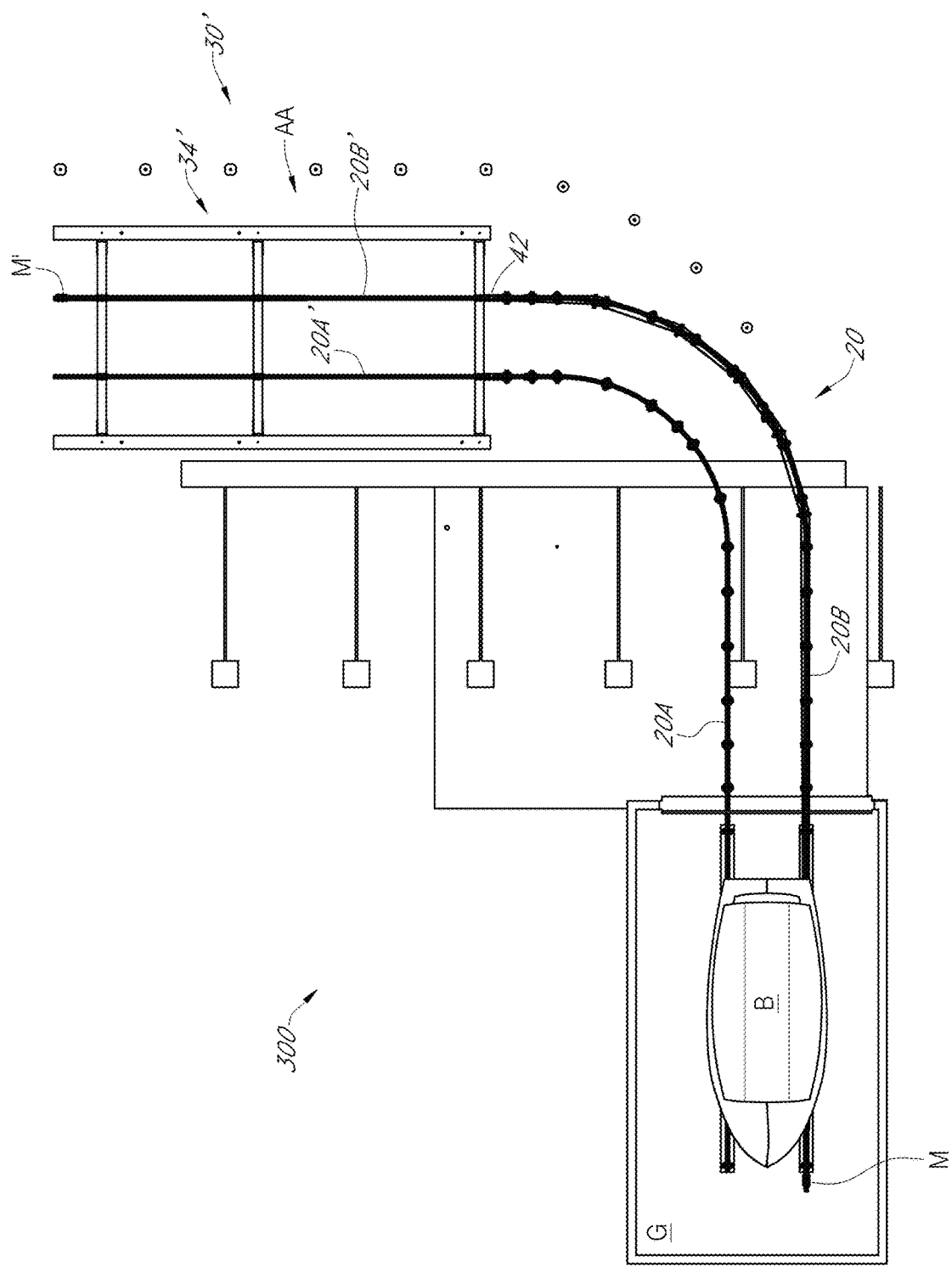
FIG. 17 is a schematic view of an automated boat lift and trolley that travels between a boat garage and a platform lift, showing the boat in the boat garage.
Figure 18:
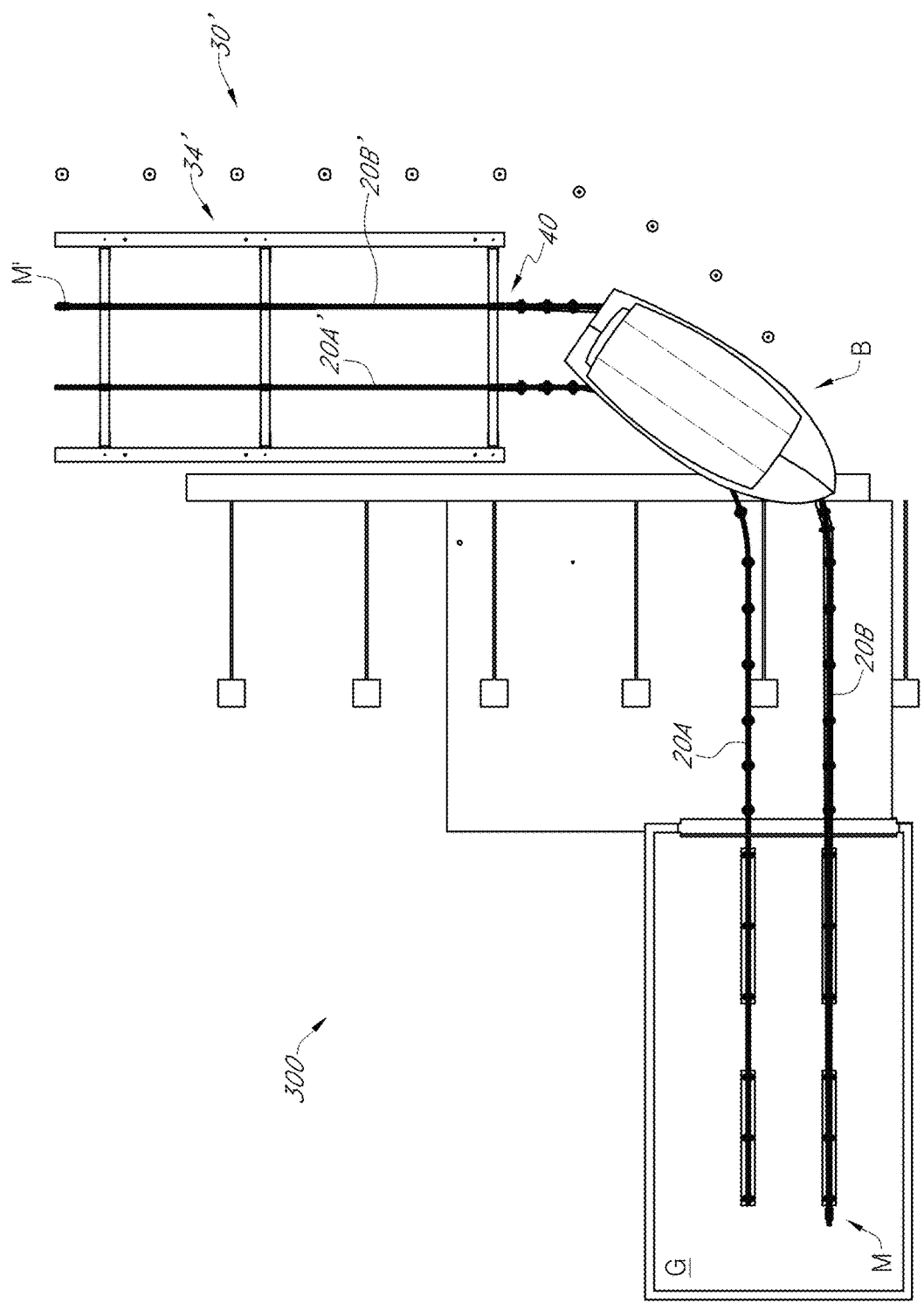
FIG. 18 is a schematic view of the automated boat lift and trolley of FIG. 17, showing the boat on the track between the boat garage and platform lift.
Figure 19:
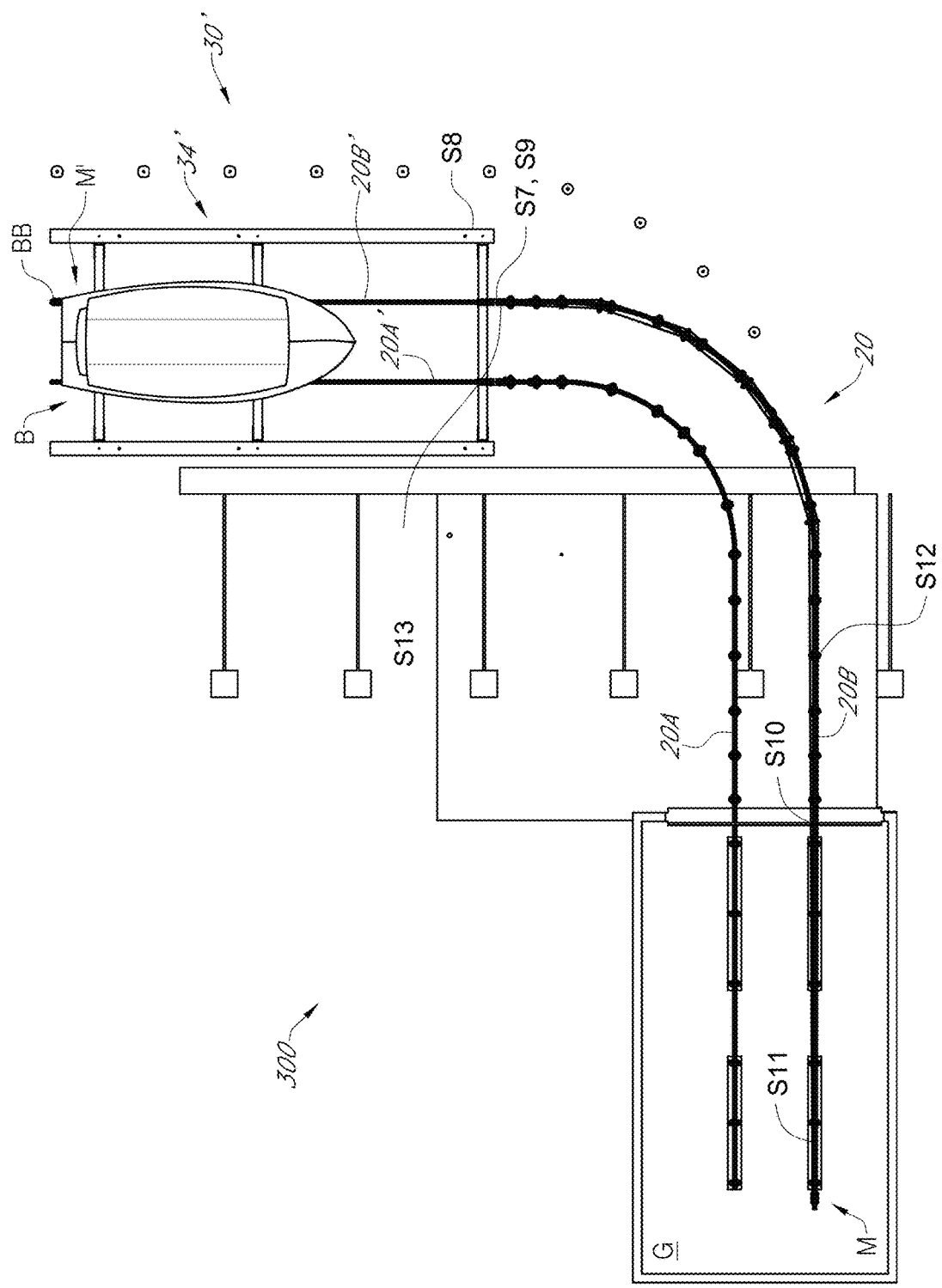
FIG. 19 is a schematic view of the automated boat lift and trolley of FIG. 17 showing the boat on the platform lift.
Figure 21:
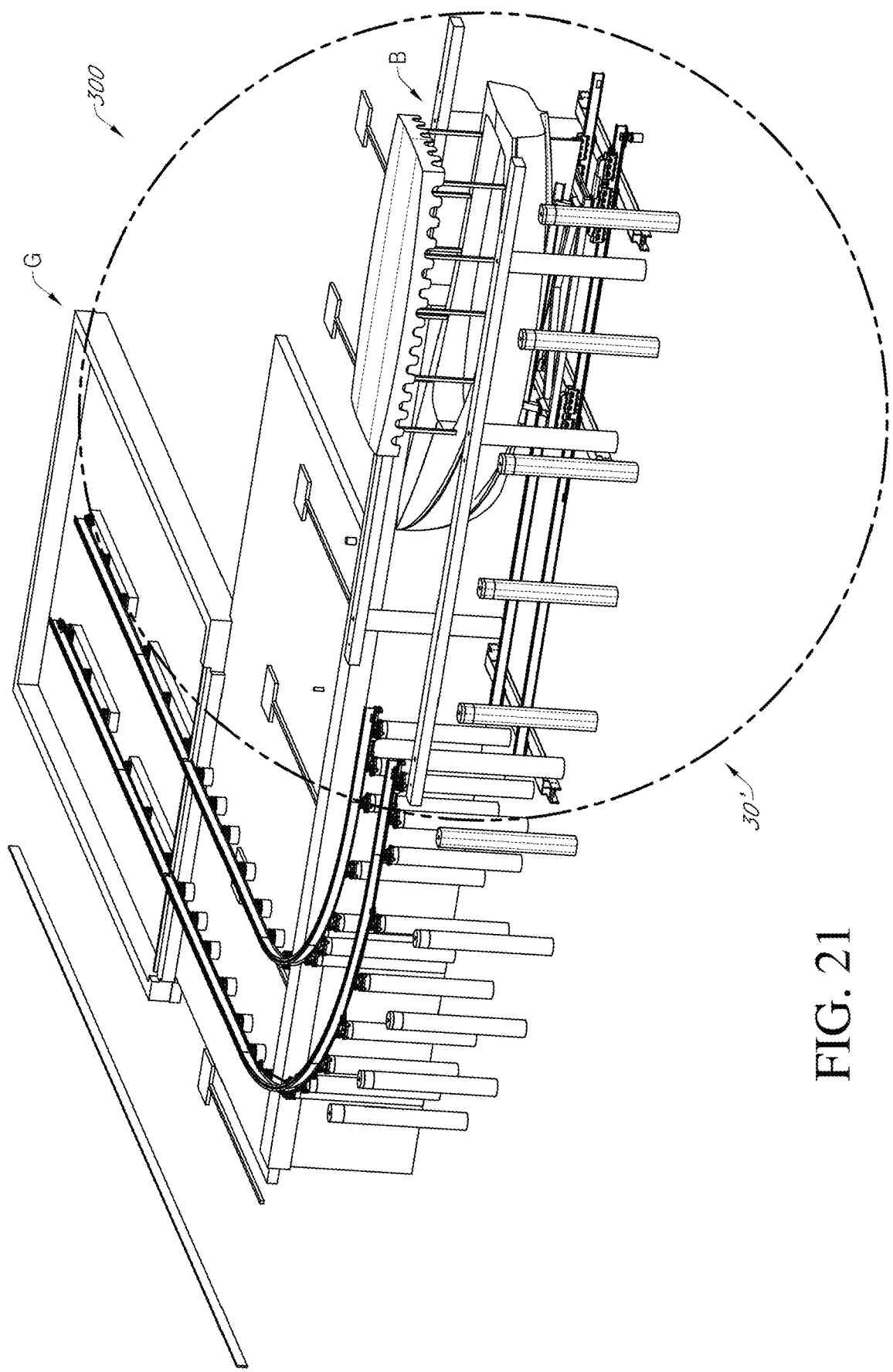
FIG. 21 shows a schematic partial view of the automated boat lift and trolley showing the boat on the platform lift with the platform lift in the lowered position.
Figure 21A:
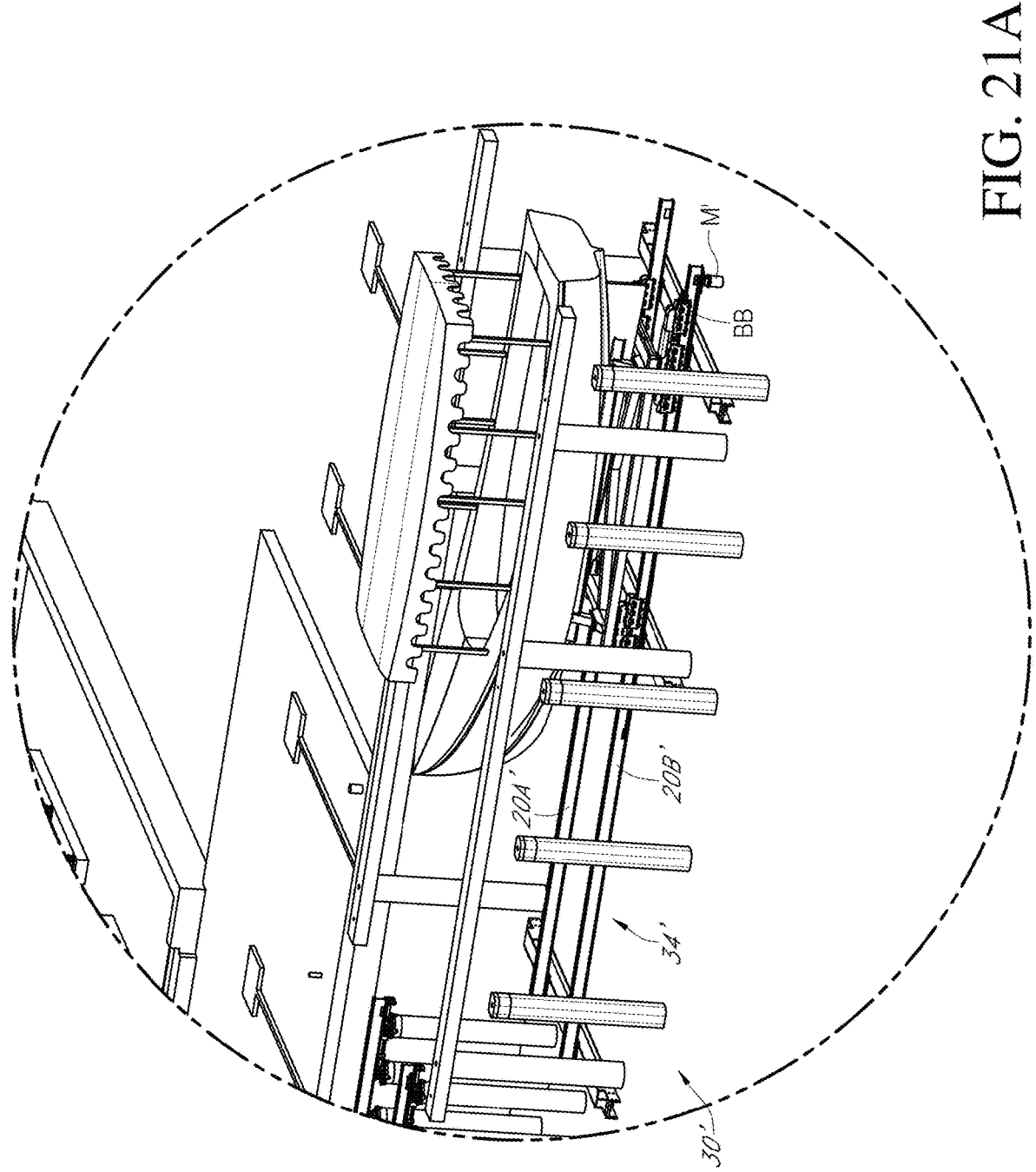
FIG. 21A is a schematic partial view of the platform lift in the lowered position.

FIG. 17 shows the boat B in the boat garage G. Though not shown in the drawing, the boat B is disposed on a trolley, such as the trolley 10, 10B, 10C. FIG. 18 shows the boat B (while on the trolley 10, 10B, 10C) on the track 20 at a location between the boat garage G and the platform 34'. FIG. 19 shows the boat B (while on the trolley 10, 10B, 10C) on the platform 34'. FIGS. 21-21A show the platform 34' in the lowered state relative to the track 20 to position the trolley 10, 10B, 10C underwater to allow the boat B to be removed from over the trolley 10, 10B, 10C.

Figure 20A:
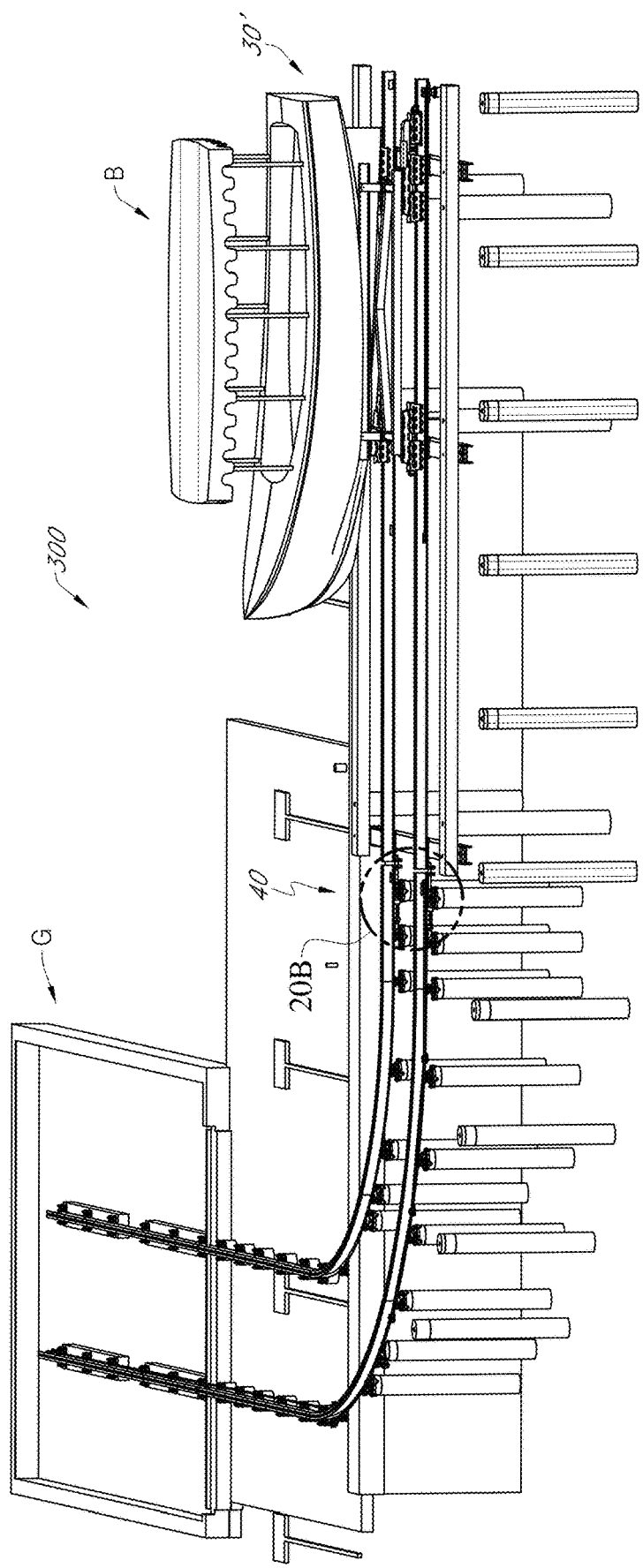
FIG. 20A is a perspective schematic view of the automated boat lift and trolley, showing the boat on the platform lift.
Figure 20B:
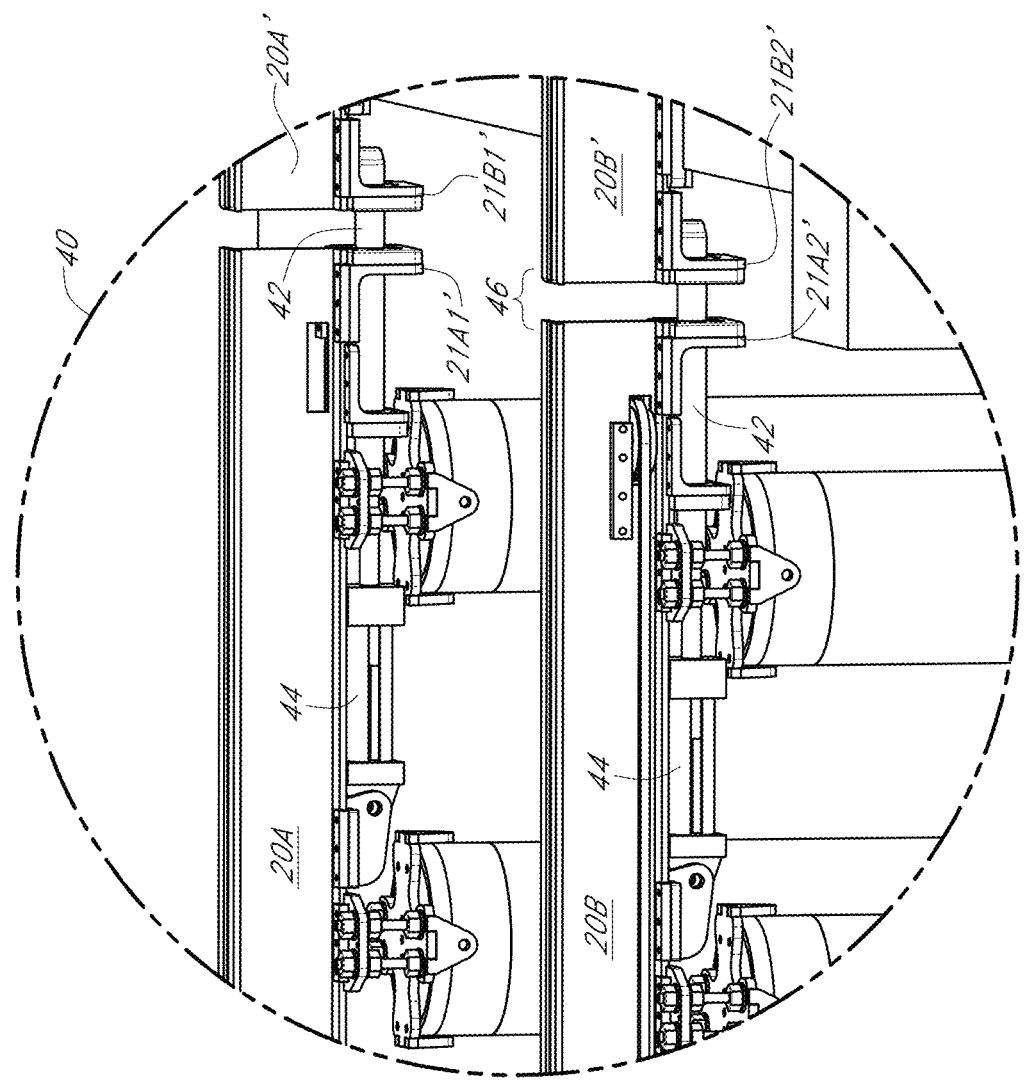
FIG. 20B is a schematic partial view of the transition from the track to the platform, in a locked configuration.
Figure 20C:
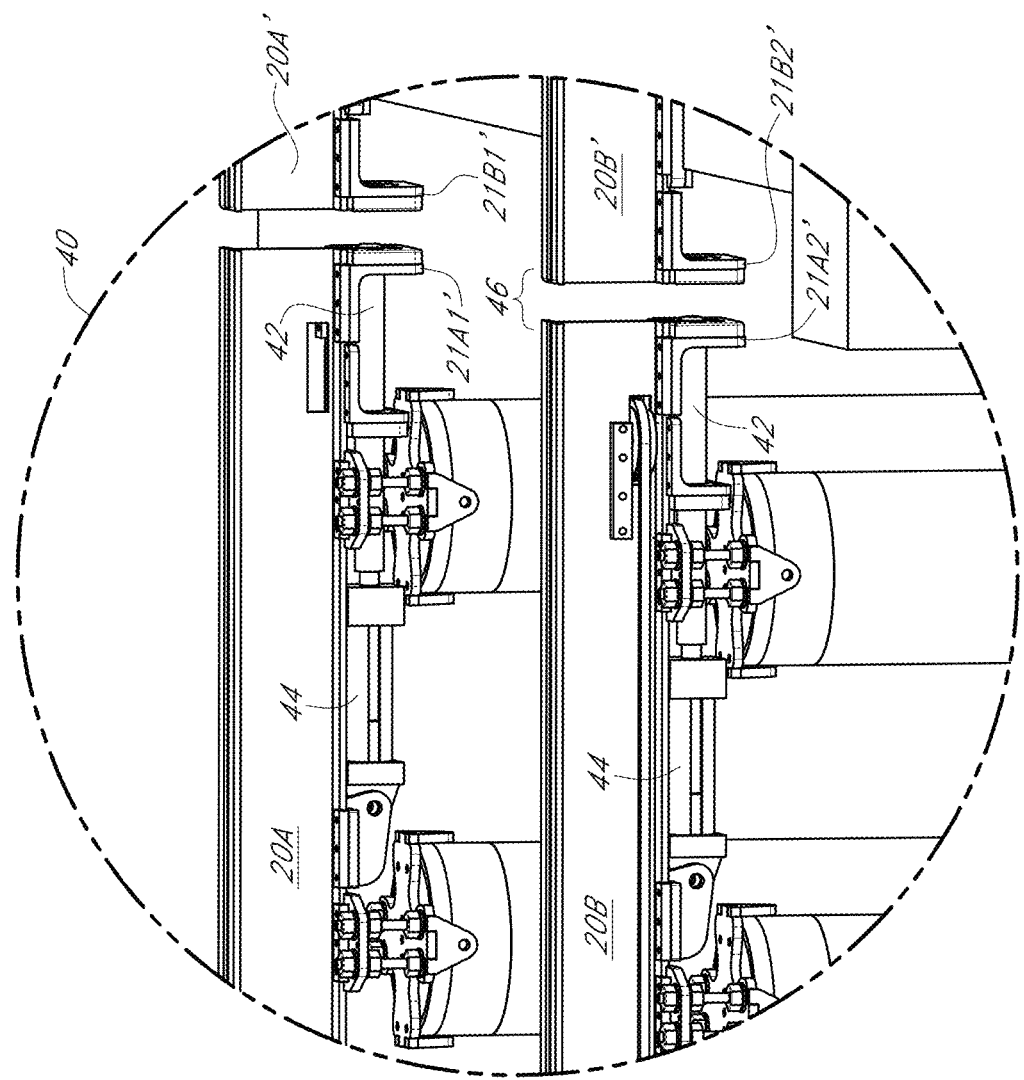
FIG. 20C is a schematic partial view of the transition from the track to the platform, in an unlocked configuration.

With reference to FIGS. 20A-20C, in one implementation the system 300 can include a locking mechanism 40 actuatable to lock and unlock the track 20 relative to the platform 34' to substantially couple and decouple the track 20 to the platform 34'. The locking mechanism 40 can include one or more locking pins 42 and one or more actuators 44. In the implementation shown in FIGS. 20A-20C, the locking mechanism 40 includes a pair of pins 42, one of the pins 42 actuatable to interconnect the rail 20A of the track 20 with the rail 20A' on the platform 34' and the other of the pins 42 actuatable to interconnect the rail 20B of the track 20 with the rail 20B' on the platform 34'. In one implementation, one or more sensors S7 (e.g., proximity sensors) are operable to sense alignment between the rails 20A, 20B of the track 20 and the rails 20A', 20B' on the platform 34' to allow the actuator(s) 44 to move the pin(s) 42 to the extended position to interlock the track 20 with the platform 34'. The sensor(s) S7 can optionally be mounted to a portion of the track 20 near the gap 46, such as mounted to a flange (not shown) attached to the track 20 or the actuator 44. The sensor(s) S7 can optionally be powered with line power from the controller EM (located in the garage G). Alternatively, the sensor(s) S7 can optionally be mounted on the platform 34' and powered by low voltage line power that powers the motor M' on the platform lift mechanism 30', said low voltage line power carried via a conduit to the sensor(s) S7.

With continued reference to FIGS. 20A-20C, the one or more actuators 44 can be hydraulic actuators operable to move the locking pins 42 between an extended position (see FIG. 20B), where the locking pins 42 engage portions of the rails 20A, 20B on the track 20 and rails 20A', 20B' on the platform 34', and a retracted position (see FIG. 20C), where the locking pins 42 do not interlock the rails 20A, 20B of the track 20 with the rails 20A', 20B' on the platform 34'. In another implementation, the one or more actuators 44 can be pneumatic actuators. In still another implementation, the one or more actuators 44 can be electric motors.

As shown in FIGS. 20A-20C, the locking pins 42 can extend through openings in flanges 21A1',21A2' attached to the rails 20A, 20B of the track 20 and through openings in flanges 21B1',21B2' attached to the rails 20A', 20B' on the platform 34' to interlock (e.g., substantially rigidly couple) and substantially align the rails 20A, 20B of the track 20 with the rails 20A', 20B' on the platform 34'. The ends of the rails 20A, 20B are spaced from the rails 20A', 20B' by a distance 46. Advantageously, interlocking of the rails 20A, 20B of the track 20 with the rails 20A', 20B' on the platform 34' inhibits (e.g., prevents) misalignment of the platform 34' with the track 20 to facilitate movement of the trolley 10, 10B, 10C over the rails 20A, 20B, 20A', 20B'. Additionally, one or more sensors S9 (e.g., contact sensors, pressure sensors, load sensors) can detect when the pin(s) 42 have been fully extended to confirm the platform 34' is engaged with the track 20.

Once the trolley 10, 10B, 10C has moved from the track 20 onto the platform 34', a stop tab (e.g., hydraulic stop, pneumatic stop) 36' can be actuated to be moved relative to at least one of the rails 20A', 20B' to inhibit (e.g., prevent) movement of the trolley 10, 10B, 10C along the rails 20A', 20B'. One or more sensors S14 can confirm engagement of the stop tab 36'. The locking pin(s) 42 can then be retracted to disengage the platform 34' from the track 20 and allow a user to use the platform controls to lower the platform 34' to a submerged position.

Figure 22:
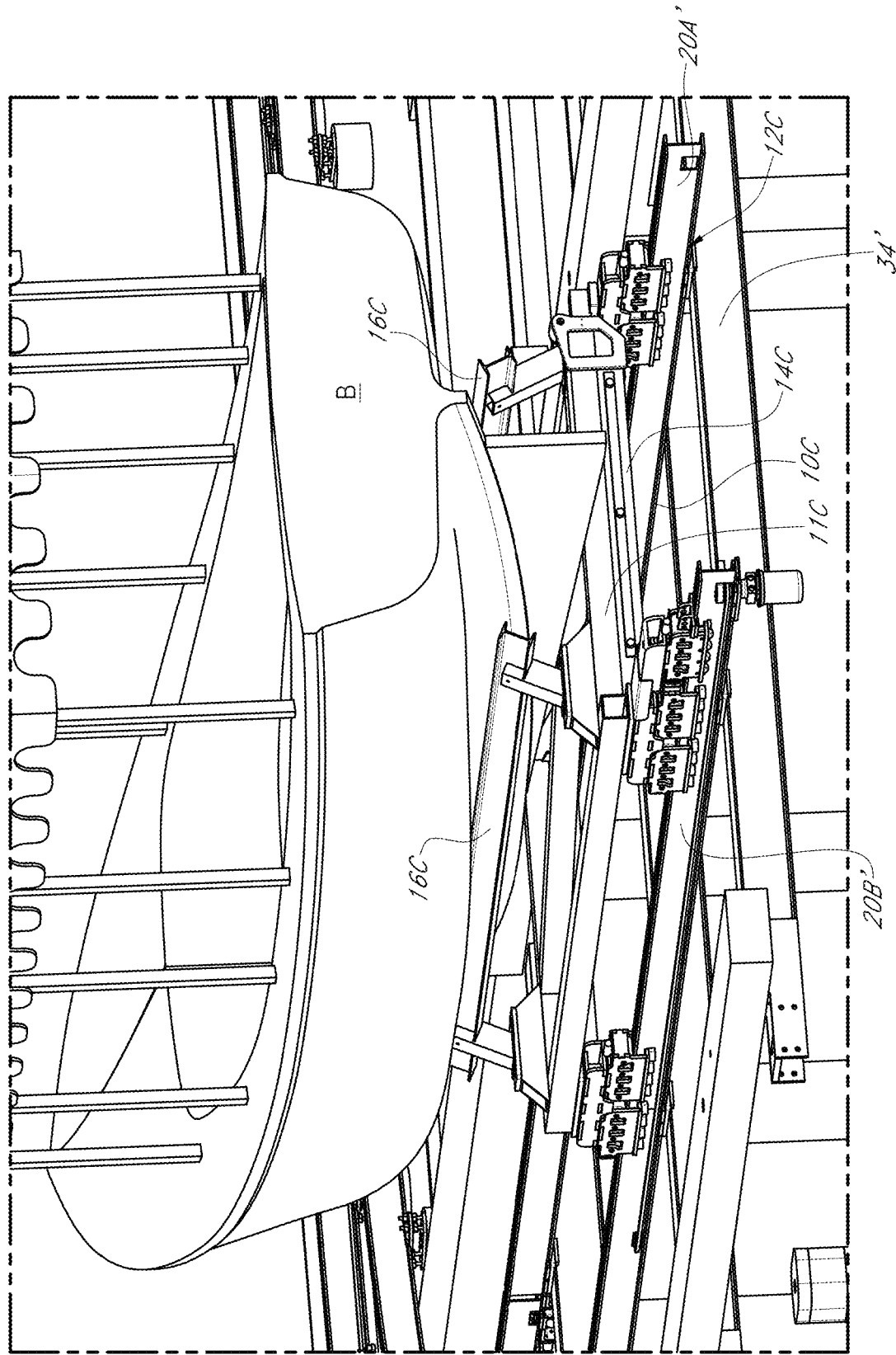
FIG. 22 is a schematic perspective partial view of the trolley on the track, the trolley supporting a boat thereon.

FIG. 22 schematically illustrates a trolley assembly 10C supporting a boat B on rails 20A, 20B of the track 20. The trolley assembly 10C is similar to the trolley assembly 10 of FIG. 9, except as described below. Therefore, reference numerals used to designate the various components or features of the trolley assembly 10C are identical to those used for identifying the corresponding components of the trolley assembly 10 in FIG. 9, except that a "C" is added to the numerical identifier. Thus, the structure and description for the various features or components of the trolley assembly 10 in FIG. 9 are understood to also apply to the corresponding features or components of the trolley assembly 10C in FIG. 22, except as described below.

The trolley assembly 10C can be an integral (e.g., single piece structure) with four sets of wheels 12C (e.g., generally at the corners of the trolley assembly 10C) and two support pads or bunkers 16C attached to a frame 14C of the trolley assembly 10C and that can support the hull of the boat B thereon. The four sets of wheels 12C advantageously allow the trolley 10C to span the gap TG so that the gap TG does not inhibit the movement of the trolley 10C from within the garage G or movement of the trolley 10C into the garage G, allowing the garage door to fully close (e.g., without there being any gaps underneath the garage door due to the rails 20A, 20B). One side of the trolley 10C has fixed sets of wheels 12C other than to pivot, the other side of the trolley 10C has sets of wheels 12C mounted on a slider rig that advantageously allows for compensation for track width deviation and allow movement of the trolley 10C around a curved track 20. The trolley assembly 10C is advantageously made of corrosion resistant materials that allow the trolley assembly 10C to be submerged in water (e.g., in salt water) when the platform 34' is moved to the lowered state, and from which the boat B can be removed from on top of the trolley assembly 10C for use.

The trolley assembly 10C can have one or more proximity sensors S4 that can be disposed on one or more of the wheel assemblies 12C and one or more proximity sensors S4' that can be disposed on the frame 11C of the boat trolley 10C. The proximity sensor(s) S4, S4' can sense an obstruction (e.g., on the track 20) and communicate (wirelessly) with the controller EM (in the garage G, such as on a wall of the garage G), which can stop the movement of the trolley 10C, as further discussed below, if an obstruction is sensed.

FIGS. 23A-26B show features of a drive assembly 400 of the boat lift and trolley system 100, 200, 300. The drive assembly 400 can include a chain drive 60. The chain drive 60 can include a drive sprocket 62, which can engage an output shaft of the motor M (in the garage G), a driven or tail sprocket 66 located near the end of the track 20 (e.g., proximate the gap 46 between the track 20 and the platform 34'), and a chain 64 that extends between (and loops around) the drive sprocket 62 and the driven or tail sprocket 66. The drive sprocket 62 can optionally be located in the garage G. Optionally, the chain drive 60 can include one or more chain idler rollers 65 that support the chain 64 between the sprockets 62, 66. The chain 64 can extend along a portion of a rail (e.g., portion of the rail 20B in FIG. 23B, 24A) and attach to a mule 50 (e.g., via a connector 67) that is movably coupled to the rail 20B by one or more rollers or wheels 52. Therefore, operation of the motor M to rotate the drive sprocket 62, which moves the chain 64 along the track 20 causes the mule 50 to move along the track 20. In particular, operation of the motor M in one direction (e.g., to rotate the output shaft clockwise) causes the drive sprocket 62 to rotate clockwise and the chain 64 to move so that the mule 50 moves away from the drive sprocket 62. Similarly, operation of the motor M in an opposite direction (e.g., to rotate the output shaft counter-clockwise) causes the drive sprocket 62 to rotate counter-clockwise and the chain 64 to move so that the mule 50 moves toward the drive sprocket 62. Accordingly, the mule 50 can move along the rail 20B from a location in the garage G to a location proximate the end of the track 20 (e.g., proximate the gap 46 between the track 20 and the platform 34').

Figure 23:
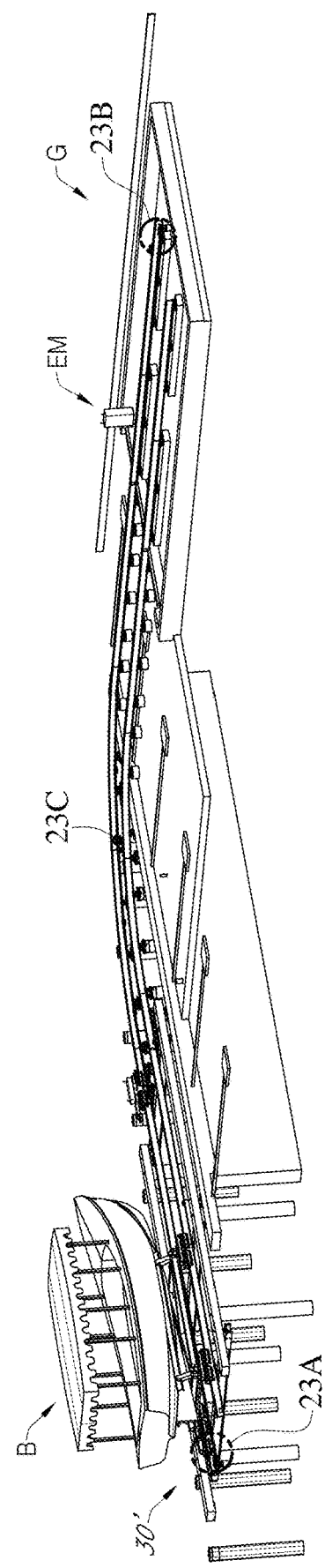
FIG. 23 is a schematic perspective partial view of the drive assembly of the automatic boat lift and trolley with the trolley and boat on the platform lift.
Figure 23A:
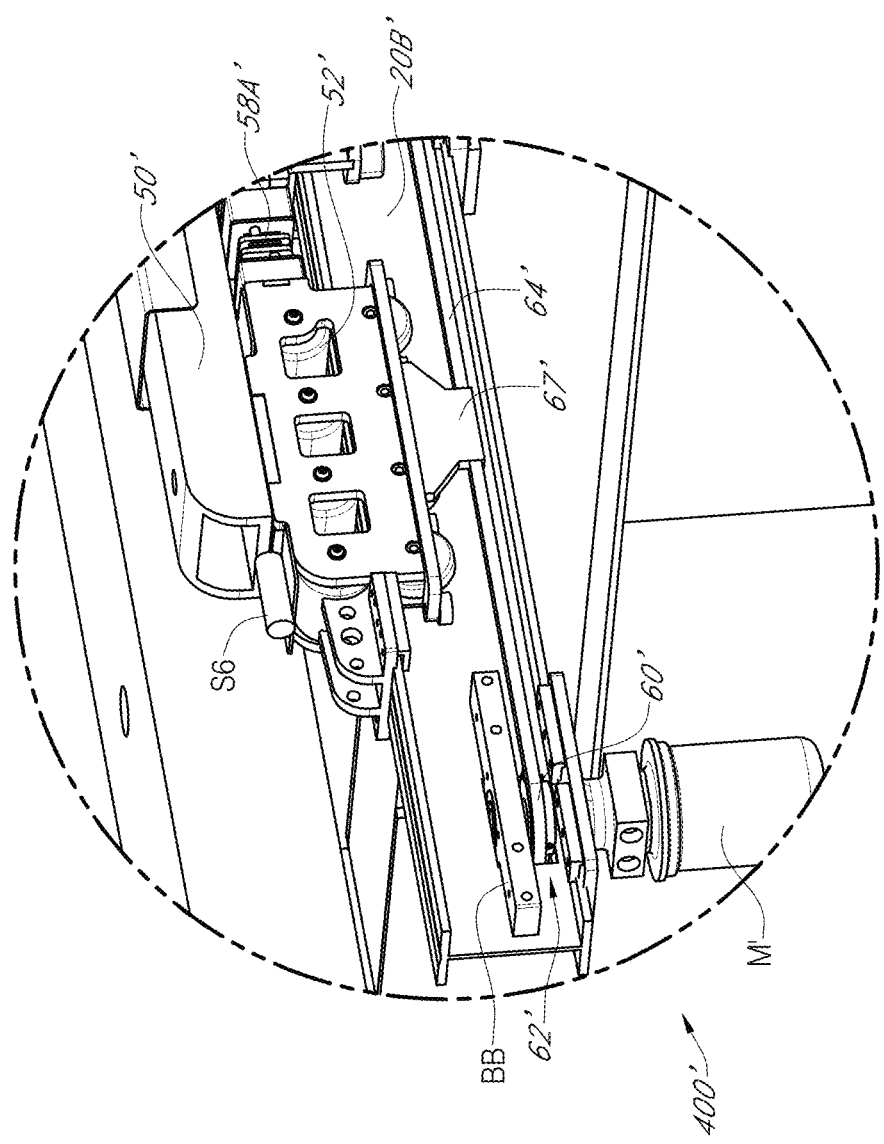
FIG. 23A is a schematic perspective partial view of a portion of the drive assembly for the trolley.
Figure 23C:
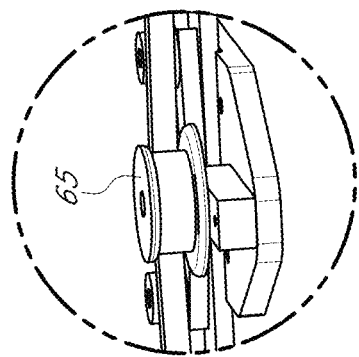
FIG. 23C is a schematic perspective partial view of another portion of the drive assembly for the trolley.
Figure 23B:
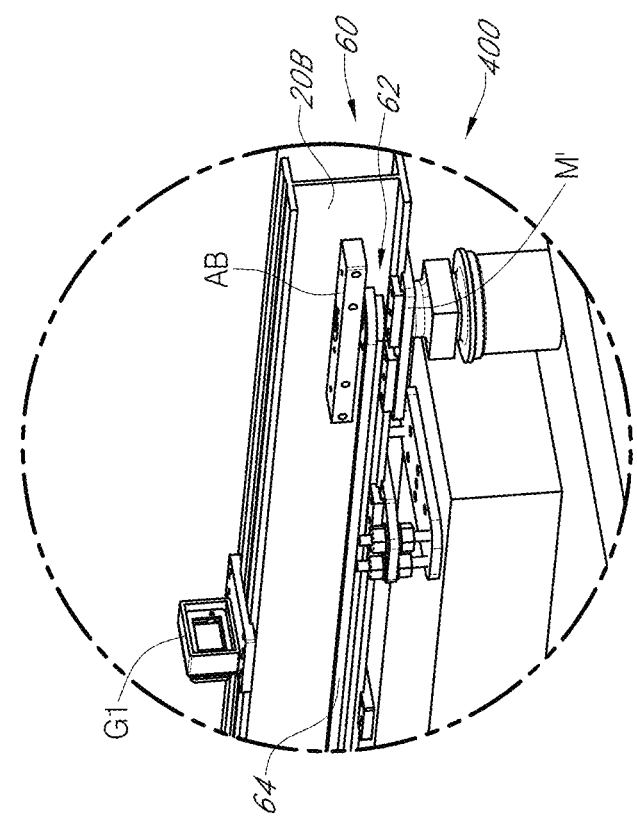
FIG. 23B is a schematic perspective partial view of another portion of the drive assembly for the trolley.

With reference to FIG. 23A, the platform lift mechanism 30' can have a drive assembly 400' that can include a chain drive 60'. The chain drive 60' can include a drive sprocket 62', which can engage an output shaft of the motor M' (on the platform 34'), a driven or tail sprocket 66' movably coupled to the rail 20B', and a chain 64' that extends between (and loops around) the drive sprocket 62' and the driven or tail sprocket 66'. The drive sprocket 62' can be located on the platform 34'. The chain 64' can extend along a portion of a rail (e.g., portion of the rail 20B' of the platform 34') and attach to a mule 50' (via connector 67') that is movably coupled to the rail 20B' by one or more rollers 52'. Therefore, operation of the motor M' to rotate the drive sprocket 62', which moves the chain 64' along the rail 20B' causes the mule 50' to move along the rail 20B'. In particular, operation of the motor M' in one direction (e.g., to rotate the output shaft clockwise) causes the drive sprocket 62' to rotate clockwise and the chain 64' to move so that the mule 50' moves away from the drive sprocket 62' (e.g., toward the front of the platform 34' near the track 20). Similarly, operation of the motor M' in an opposite direction (e.g., to rotate the output shaft counter-clockwise) causes the drive sprocket 62' to rotate counter-clockwise and the chain 64' to move so that the mule 50' moves toward the drive sprocket 62' (e.g., toward the rear of the platform 34' away from the track 20). Accordingly, the mule 50' can move along the rail 20B' from a location near the track 20 to a location further apart from the track 20.

The mule 50 that travels on the track 20 and the mule 50' that travels on the platform 34' (e.g., on the rail 20B') can optionally have a similar construction. The mule 50 can engage the trolley 10, 10B, 10C (e.g., engage a front portion of the trolley 10, 10B, 10C), as further discussed below, and move the trolley 10, 10B, 10C along the track 20 (e.g., via actuation of the chain drive 60 in a forward direction) from the garage G toward the end of the track 20 (e.g., proximate the gap 46), where the mule 50 can disengage from the trolley 10, 10B, 10C (e.g., when at least a portion of the trolley 10, 10B, 10C has travelled onto the platform 34'). The mule 50' can engage the trolley 10, 10B, 10C (e.g., engage a rear portion of the trolley 10, 10B, 10C), as further discussed below, and move the trolley 10, 10B, 10C onto the platform 34' (via actuation of the chain drive 60' in a forward direction) so that the trolley 10, 10B, 10C is fully supported on the platform 34'. To move the trolley 10, 10B, 10C off the platform 34' and onto the track 20, the mule 50' can engage the trolley 10, 10B, 10C (e.g., engage the rear portion of the trolley 10, 10B, 10C) and move the trolley 10, 10B, 10C off the platform 34' and onto the track 20 (e.g., by operating the chain drive 60' in a reverse direction that is opposite to the forward direction). Once at least a portion of the trolley 10, 10B, 10C has travelled onto the track 20 from the platform 34', the mule 50' can disengage from the trolley 10, 10B, 10C (e.g., from a rear portion of the trolley 10, 10B, 10C). The mule 50 can then engage the trolley 10, 10B, 10C (e.g., engage a front portion of the trolley 10, 10B, 10C) and move the trolley 10, 10B, 10C along the track 20 (e.g., via actuation of the chain drive 60 in a reverse direction opposite the forward direction) toward the garage G. Accordingly, the mules 50, 50' can work to hand off the trolley 10, 10B, 10C to each other as the trolley 10, 10B, 10C travels between track 20 and the platform 34'.

With reference to FIGS. 23-26B, the mule 50 can be movably coupled to a rail of the track 20, such as to one of the rails 20A, 20B. FIG. 24A shows the mule 50 over the rail 20B, though in another implementation the mule 50 can be movably coupled to the rail 20A. The mule 50 can have a frame 51 with one or more rollers or wheels 52 rotatably coupled to the frame 51, the rollers or wheels 52 being able to rotate over an upper surface 27a of a head 29 of the rail 20B. The mule 50 and optionally have one or more wheels 54 rotatably coupled to the frame 51, where the wheels 54 engage an underside 27b of the head 29 of the rail 20B, to control upward torque applied to the mule 50 and resist lateral forces on the mule 50, thereby providing for increase stability of the mule 50 on the rail 20B. The mule 50 can have a grabber armlet 55 that is actuatable (by an actuator 56 on the mule 50) between an engaged position (see FIG. 24D) and a release position (see FIG. 24C). In the engaged position (see FIG. 24D), the grabber armlet 55 engages a portion of a wheel assembly 12, 12B, 12C to couple the mule 50 to the wheel assembly 12, 12B, 12C (such that the mule 50 and trolley 10, 10B, 10C move together as an integral unit). In the release position (see FIG. 24C), the grabber armlet 55 does not engage the wheel assembly 12, 12B, 12C so that the mule 50 and trolley 10, 10B, 10C can move independently of each other. In one implementation, the grabber armlet 55 can have a clamp 55A (e.g., a spring-loaded clamp) that can engage (e.g., extend over) a pin 12C1 of the wheel assembly 12, 12B, 12C. With the grabber armlet 55 in the engaged position, the mule 50 can pull or push the trolley 10, 10B, 10C (e.g., with the boat B supported thereon) along the track 20 (e.g., from the garage G to the end of the track 20 adjacent the platform 34' and locations in between).

Figure 24A:
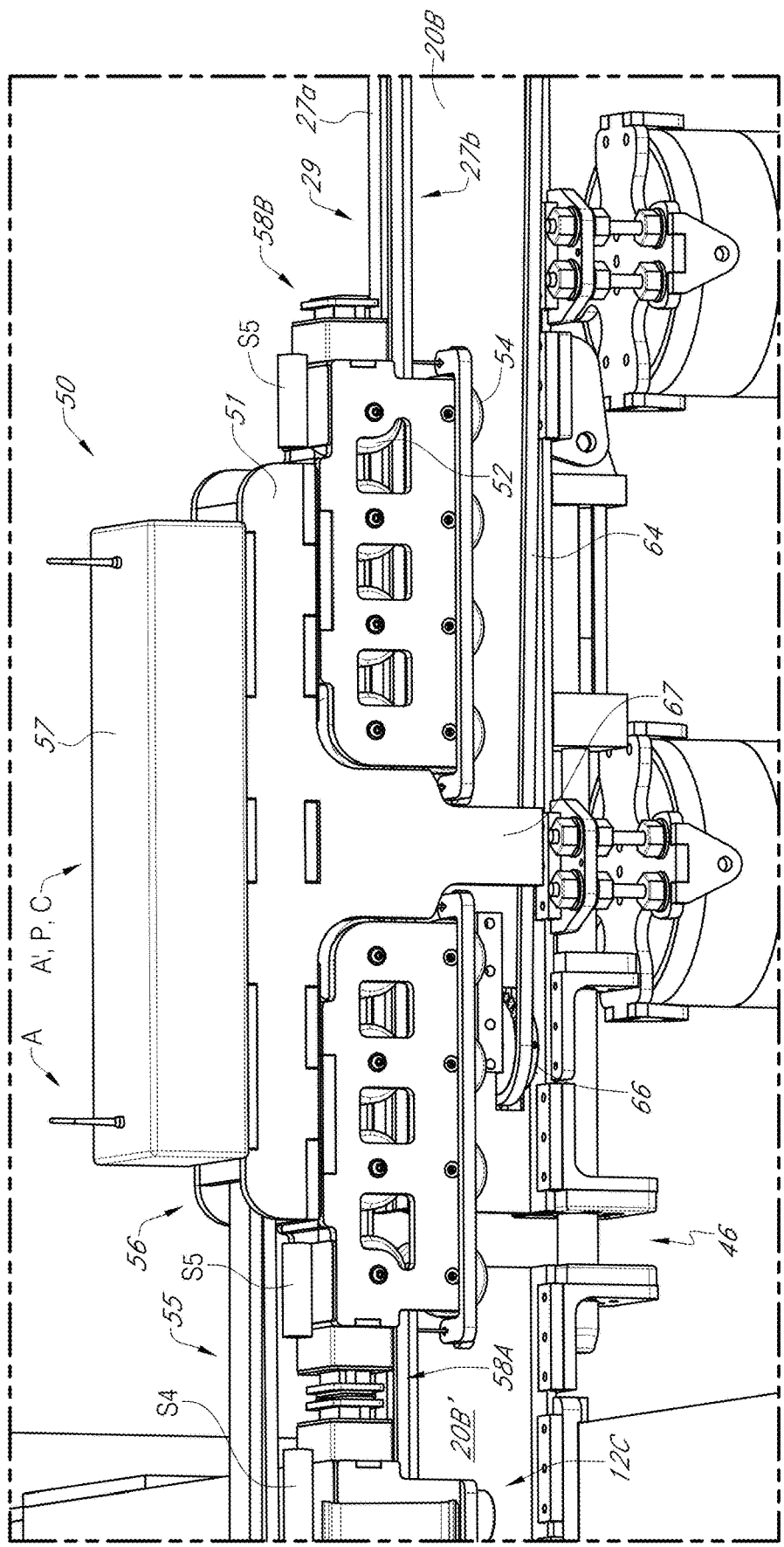
FIG. 24A is a schematic partial perspective view of a mule of the drive assembly for the trolley, showing a grabber armlet of the mule coupled to a wheel set of the trolley.
Figure 24B:
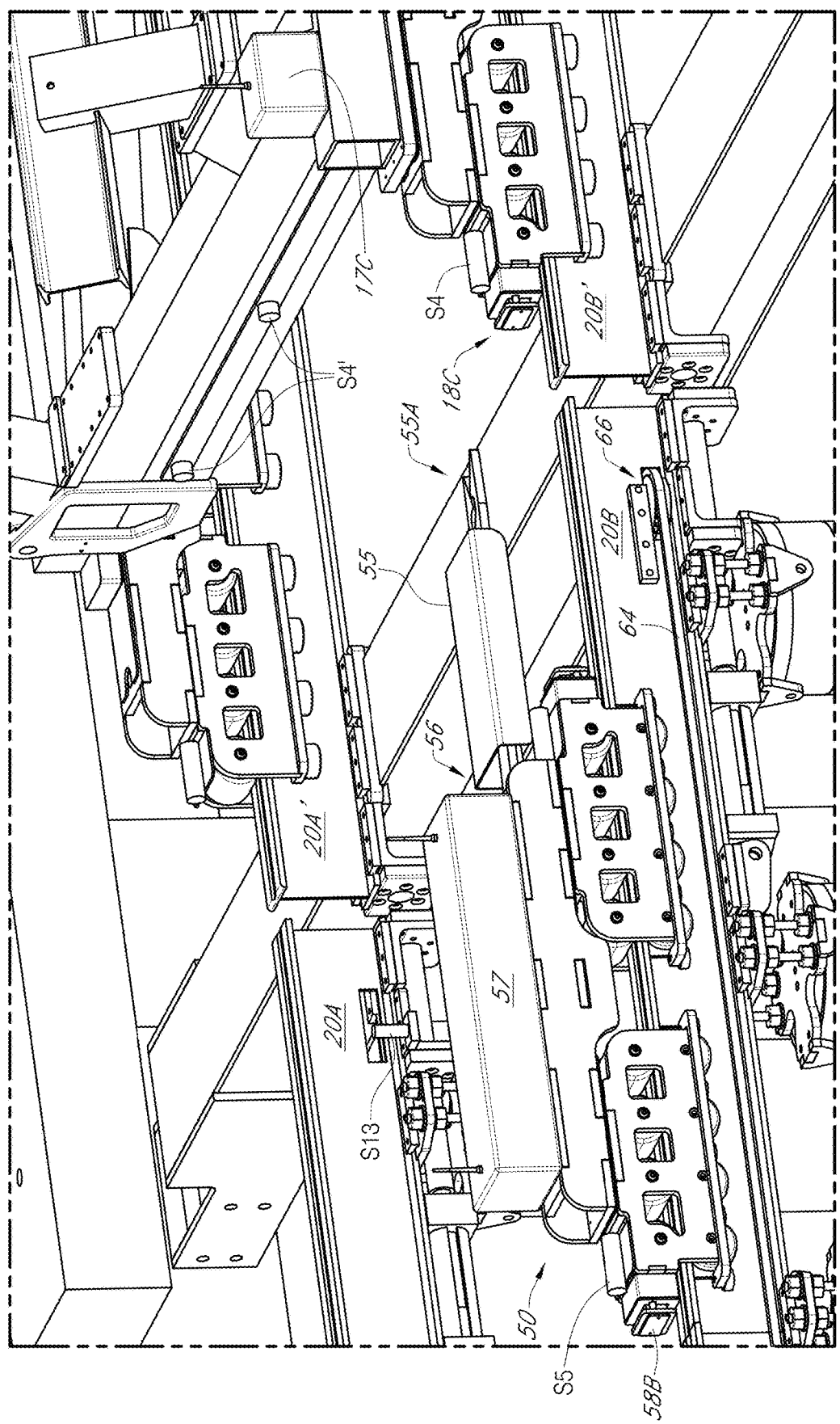
FIG. 24B is another schematic perspective view of the mule of the drive assembly for the trolley, showing a grabber armlet of the mule in a disengaged position relative to a wheel set of the trolley.
Figure 24C:
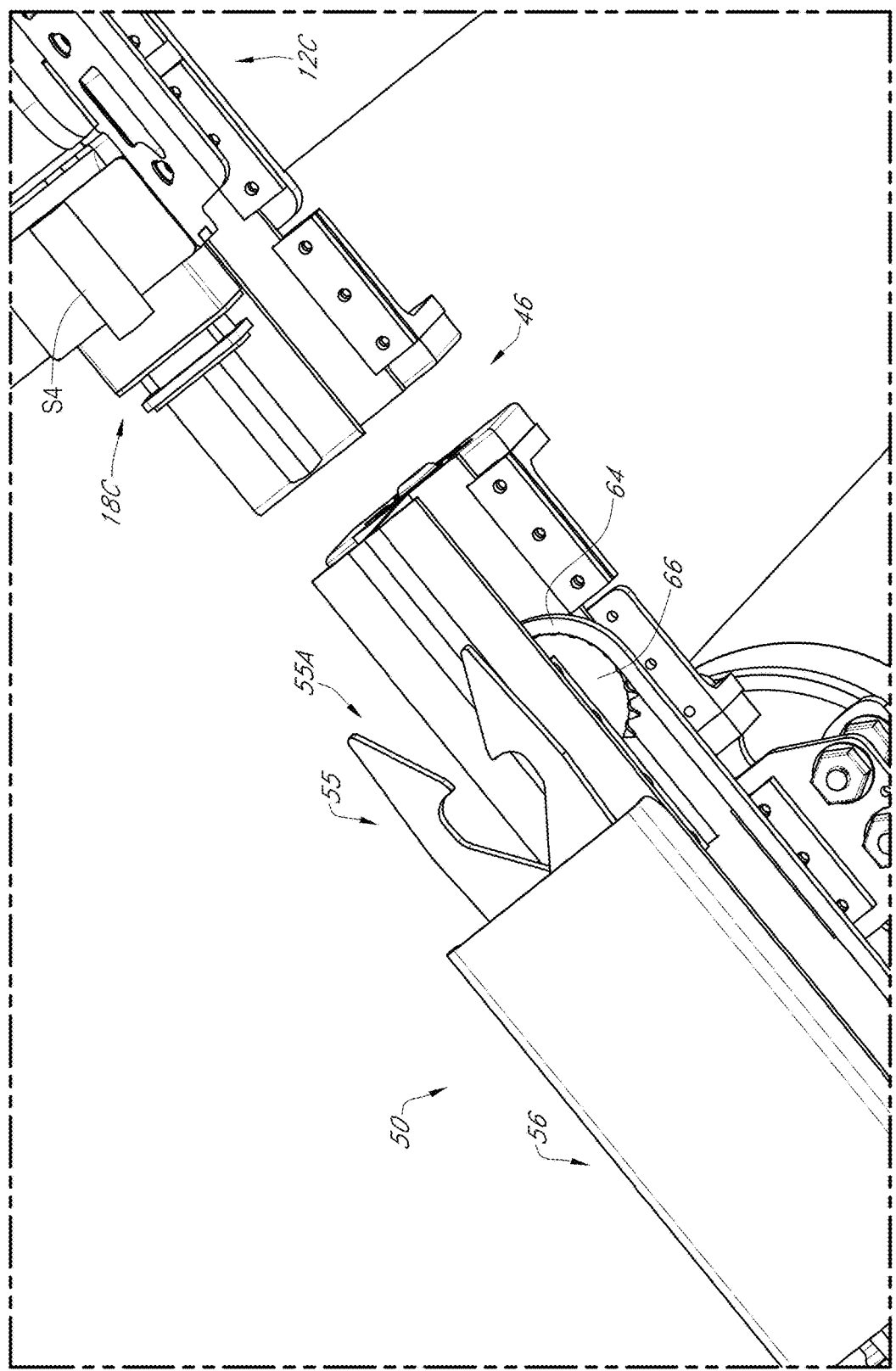
FIG. 24C is another schematic perspective partial view of the mule of the drive assembly for the trolley, showing a grabber armlet of the mule in a disengaged position relative to a wheel set of the trolley.
Figure 24D:
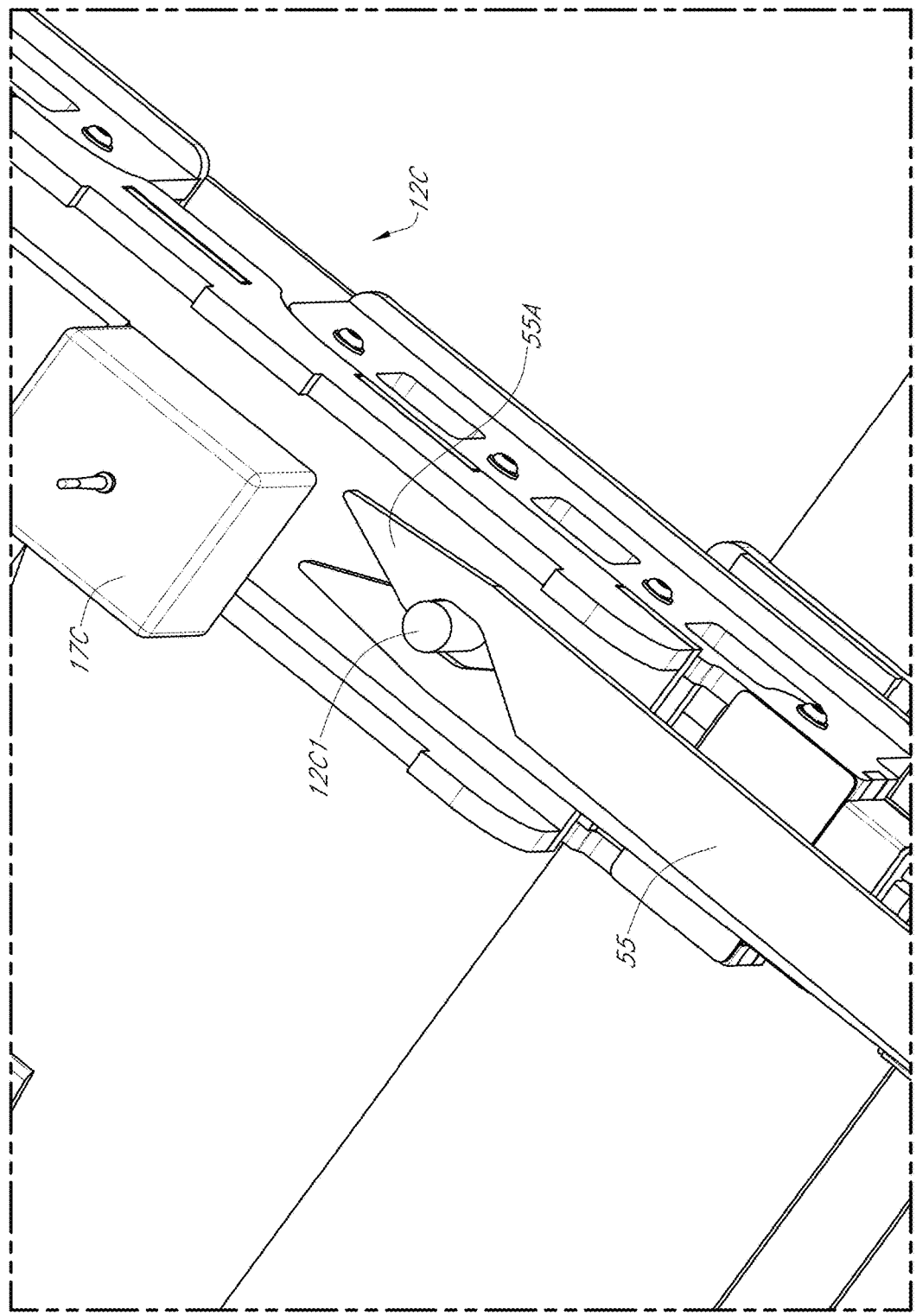
FIG. 24D is another schematic perspective partial view of the mule of the drive assembly for the trolley, showing a grabber armlet of the mule coupled to a wheel set of the trolley.

With reference to FIG. 24A, the mule 50 can optionally include an electronics module 57 with circuitry C (e.g., including a wireless transmitter A' and one or more antennas A) and a power source P (e.g., a battery, such as a rechargeable battery), as well as one or more sensors S5 (e.g., proximity sensors). The sensor(s) S5 on the mule 50 can communicate (e.g., wirelessly via the wireless transmitter A') with the controller EM (located in the garage G, such as on a wall of the garage G) to control the operation of the motor M, and therefore control the motion of the mule 50 along the track 20 (e.g., when it is separated from the trolley 10, 10B, 10C and/or when it is coupled to the trolley 10, 10B, 10C). Further discussion of the operation of the sensors is provided below. The power source P can power the sensor(s) S5 on the mule 50 and/or the actuator 56 of the mule 50 that operates the grabber armlet 55.

Figure 24E:
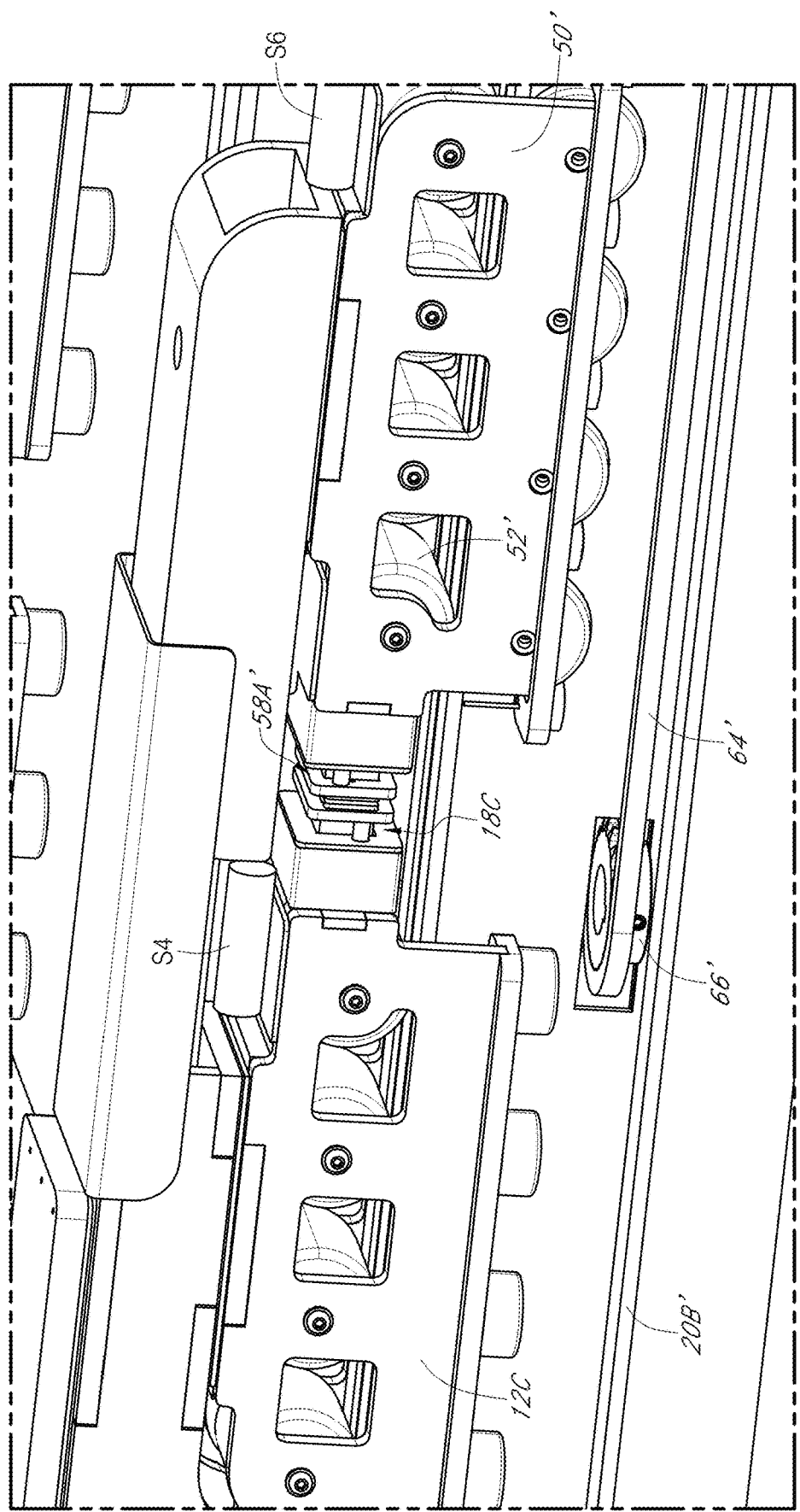
FIG. 24E is another schematic perspective partial view of the mule of the drive assembly for the trolley, showing the mule coupled to a wheel set of the trolley.
Figure 24F:
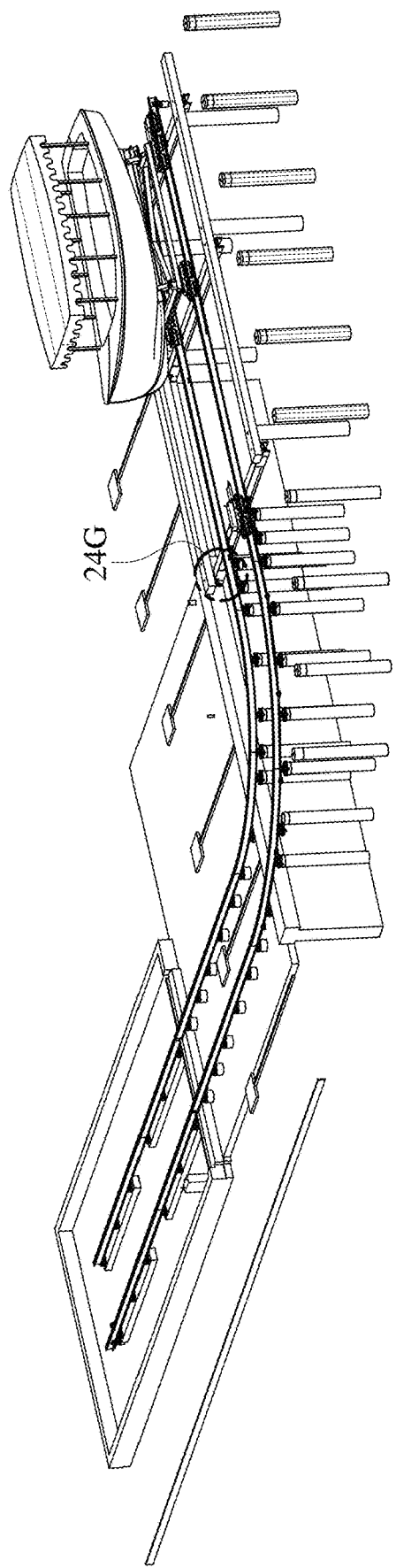
FIG. 24F is another schematic perspective partial view of the automated boat lift and trolley with the trolley and boat on the platform lift.
Figure 24G:
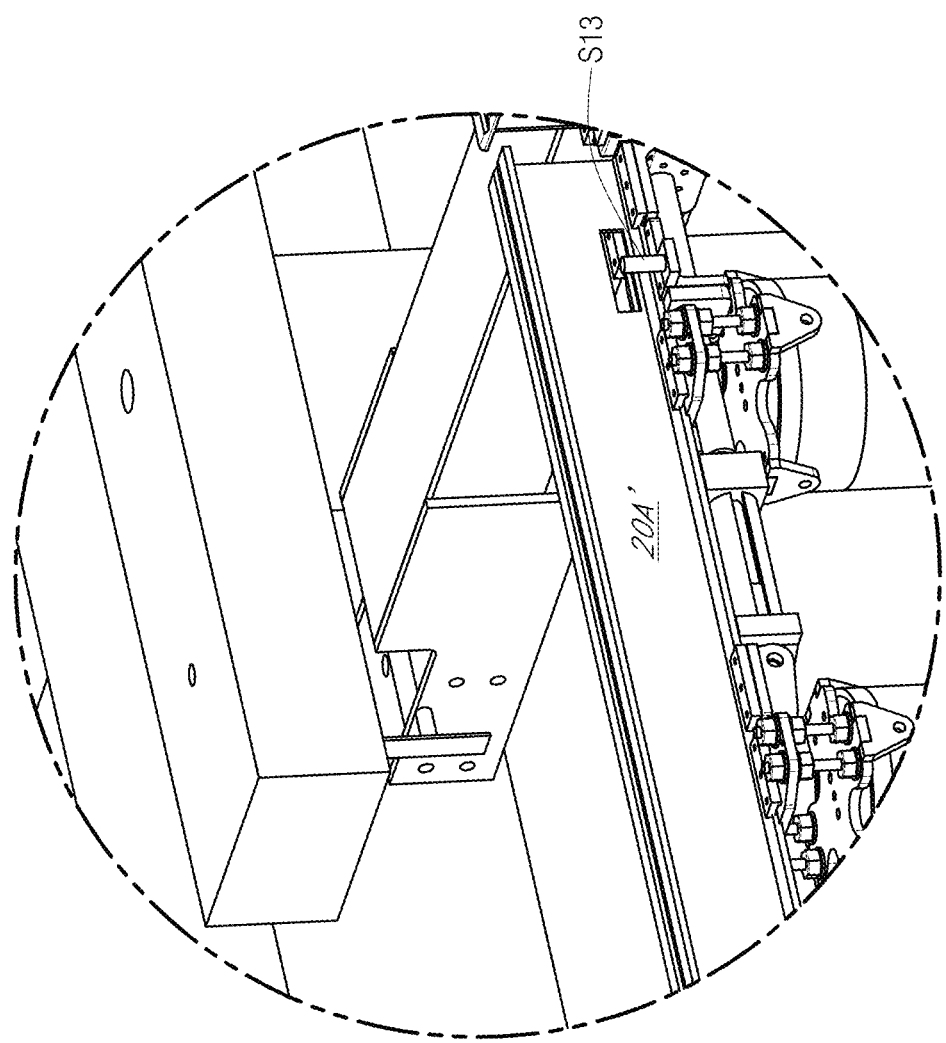
FIG. 24G is a schematic perspective partial view of a portion of the automated boat lift and trolley, showing sensors of the system.
Figure 25:
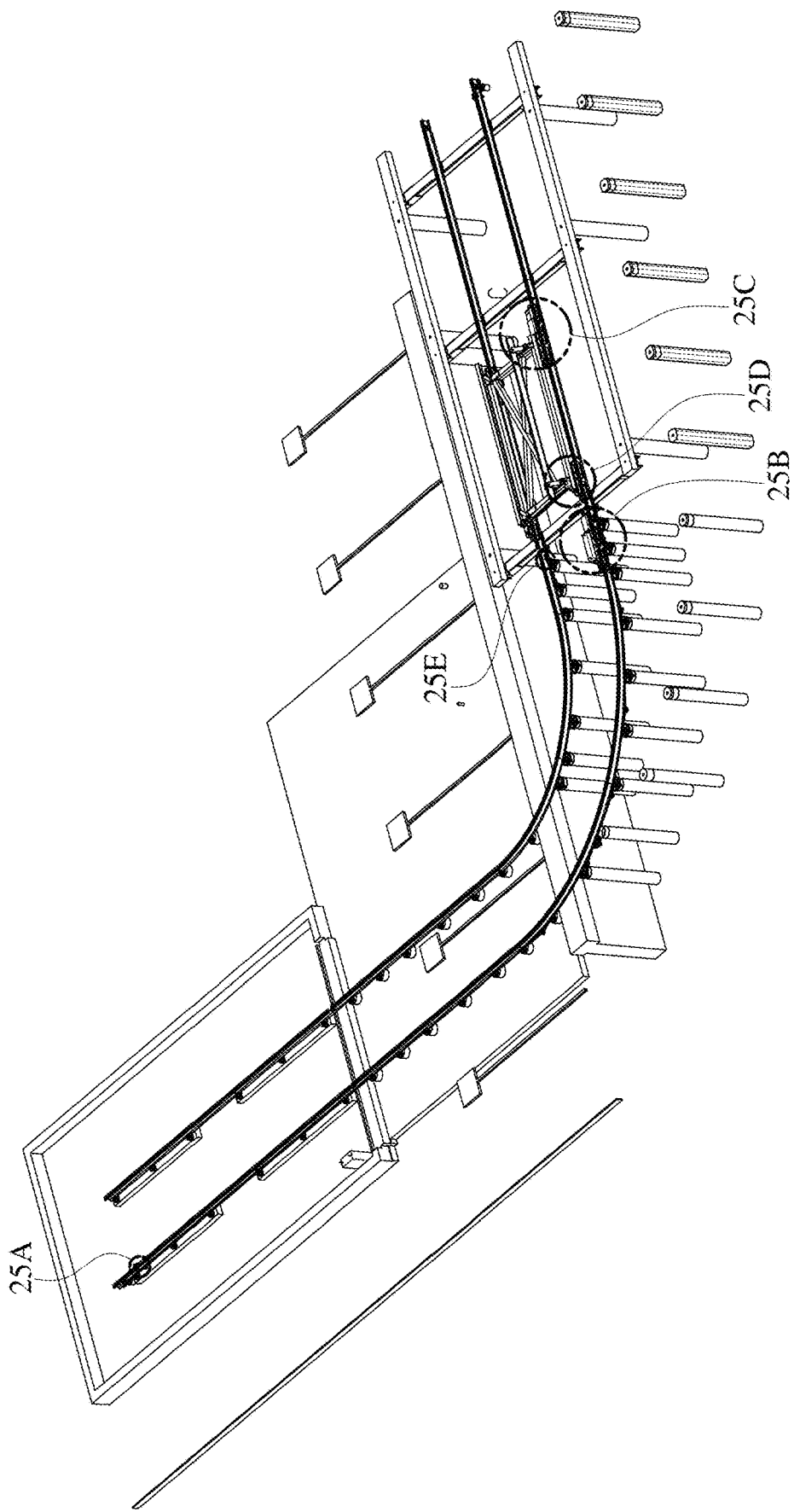
FIG. 25 is a schematic perspective partial view of the automated boat lift and trolley, showing certain electronic components of the system.
Figure 25D:
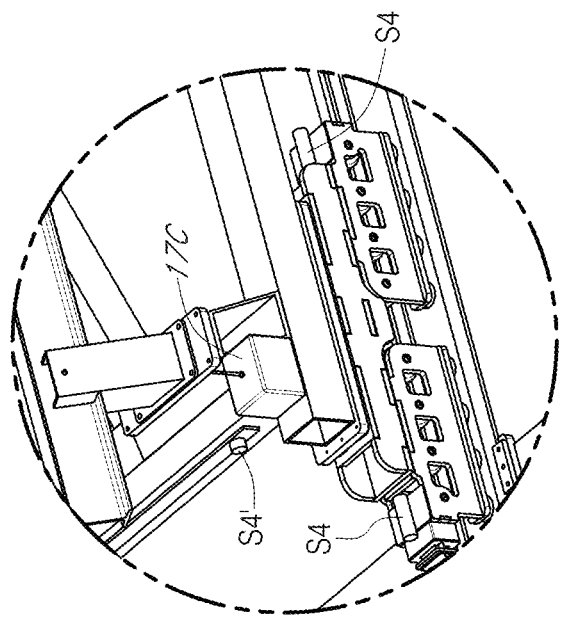
FIG. 25D is a schematic perspective partial view of another portion of the electronics system of the automated boat lift and trolley system.
Figure 25E:
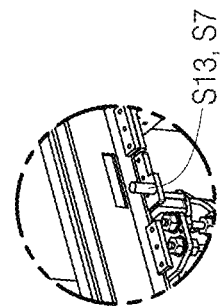
FIG. 25E is a schematic perspective partial view of another portion of the electronics system of the automated boat lift and trolley system.
Figure 25C:
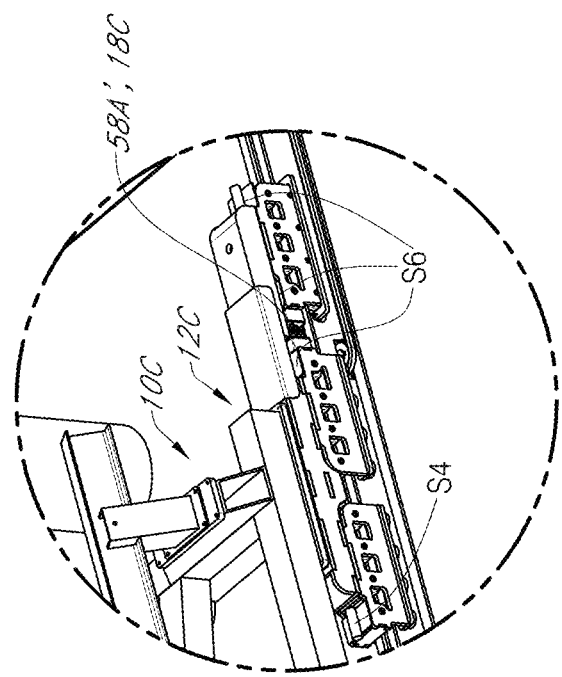
FIG. 25C is a schematic perspective partial view of another portion of the electronics system of the automated boat lift and trolley system.
Figure 26:
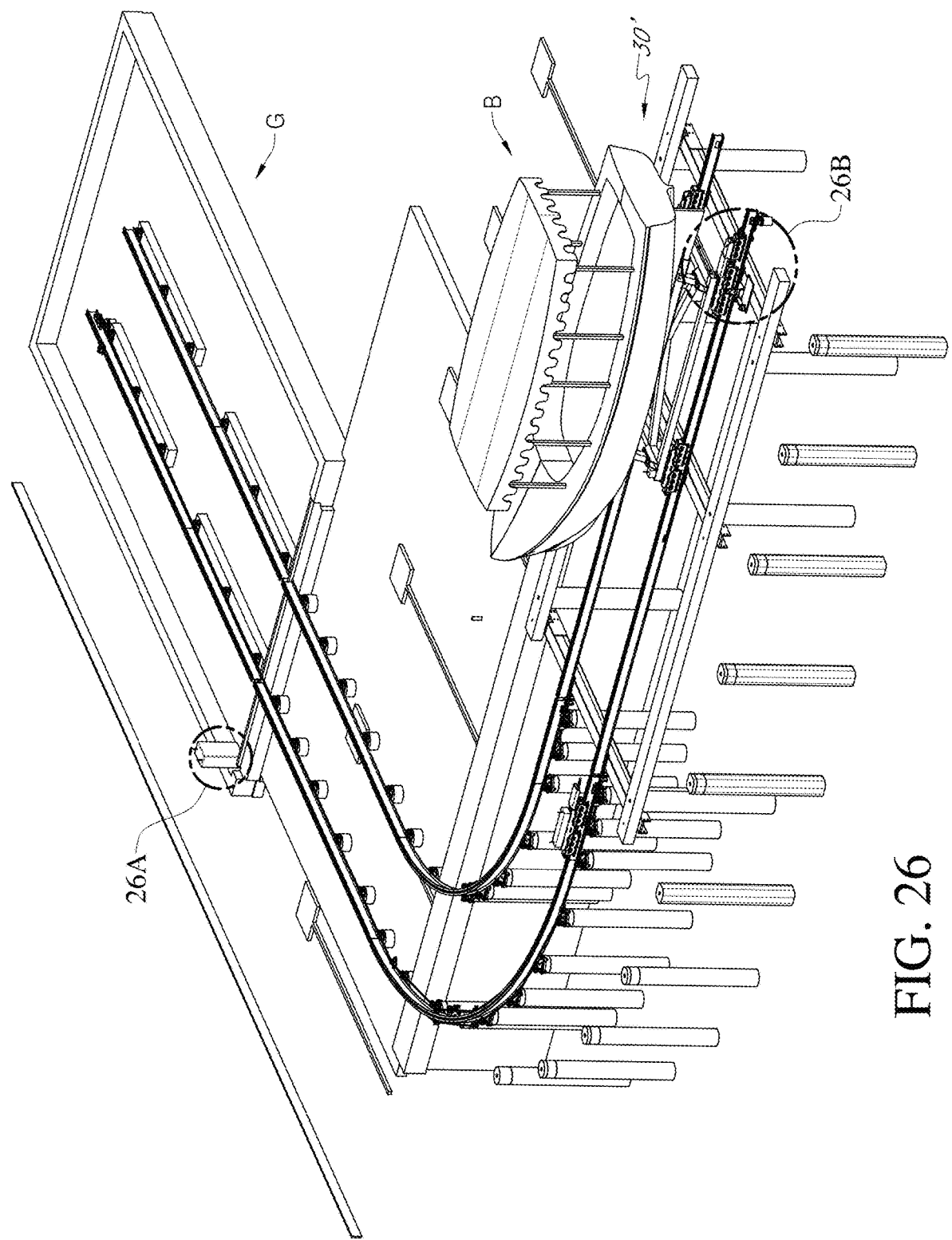
FIG. 26 is a schematic perspective partial view of a portion of the automatic boat lift and trolley system.
Figure 26B:
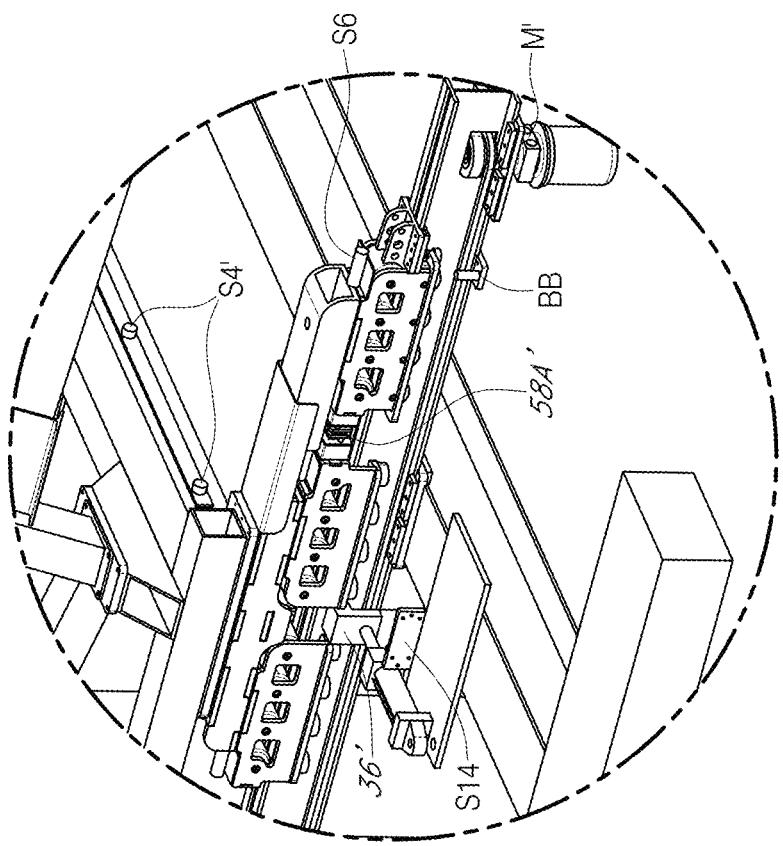
FIG. 26B is a schematic perspective partial view of another portion of the electronics system of the automated boat lift and trolley system.
Figure 26A:
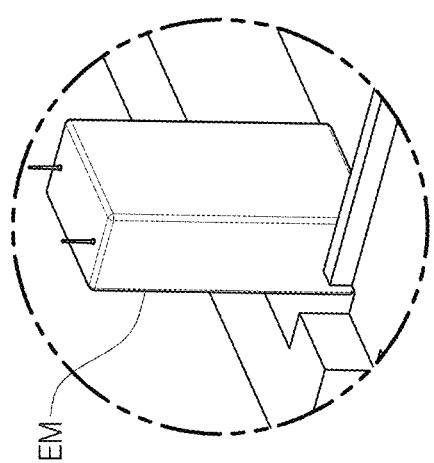
FIG. 26A is a schematic perspective partial view of another portion of the electronics system of the automated boat lift and trolley system.

With reference to FIGS. 23A and 24E, the platform lift mechanism 30' includes a mule 50' movably coupled to the rail 20B' on the platform 34' that is similar to the mule 50. Therefore, reference numerals used to designate the various components or features of the mule 50' are identical to those used for identifying the corresponding components of the mule 50 in FIG. 24A, except that a "'" is added to the numerical identifier. Thus, the structure and description for the various features or components of the mule 50 in FIG. 24A are understood to also apply to the corresponding features or components of the 50' in FIGS. 23A and 24E, except as described below.

In one implementation, the mule 50' is identical to the mule 50. In another implementation, the mule 50' can be smaller in size than the mule 50. In some implementations, the mule 50' excludes the electronics module 57. The mule 50' can include sensors S6 that are powered by line power from the motor M' (e.g., a submersible hydraulic motor), and travels between a proximal location AA and a distal location BB along the rail 20B'. As with the mule 50, the mule 50' can have a grabber armlet 55' that is actuatable between an engaged position and a release position. In the engaged position, the grabber armlet 55' engages a portion of a wheel assembly 12, 12B, 12C to couple the mule 50' to the wheel assembly 12, 12B, 12C (such that the mule 50' and trolley 10, 10B, 10C move together as an integral unit). In the release position, the grabber armlet 55' does not engage the wheel assembly 12, 12B, 12C so that the mule 50' and trolley 10, 10B, 10C can move independently of each other. With the grabber armlet 55' in the engaged position, the mule 50' can pull or push the trolley 10, 10B, 10C (e.g., with the boat B supported thereon) along the platform 34' (e.g., between a proximal location AA and a distal location BB).

With reference to FIGS. 23A-25E, the mule 50, 50' can have a power transmitter 58A, 58A' (e.g., inductive power transmitter) optionally provide power to sensors on the trolley 10, 10B, 10C, such as proximity sensors S1, S3, S4, S4', via a power receiver 18C of the boat trolley 10, 10B, 10C, allowing the sensors on the trolley 10, 10B, 10C to communicate (e.g., wirelessly) with the controller EM (in the garage G, such as on a wall of the garage G) via a transmitter 17C on the trolley 10, 10B, 10C. The mule 50 can also have a power receiver 58B (e.g., inductive power receiver) via which it receives power (e.g., to charge the power source, such as batteries, P of the mule 50), as further described below. Advantageously, this allows the trolley 10, 10B, 10C to not have a power source (e.g., battery) which may be damaged when the trolley 10, 10B, 10C is submerged in water with the platform 34'. The power source P on the mule 50 can be charged or recharged when the mule 50 is retracted to or proximate an end position (e.g., the "storage position") in the garage G (e.g., when the mule 50 has pulled the trolley 10, 10B, 10C all the way back into the garage G). In one implementation, an inductive power transmitter G1 can be disposed in the garage and positioned so as to inductively transmit power to the power receiver 58B of the mule 50 when the mule 50 is in the "storage position" in the garage G. In one implementation, though the power transmitters G1, 58A, receiver 58B are inductive power transmitters and receiver, respectively. In another implementation, the power transmitters G1, 58A and receiver 58B can transmit or receive power via electrical contacts thereof. The battery charge level (and whether the battery is currently being charged) may be detected and report by battery charge level sensors.

Figure 27:
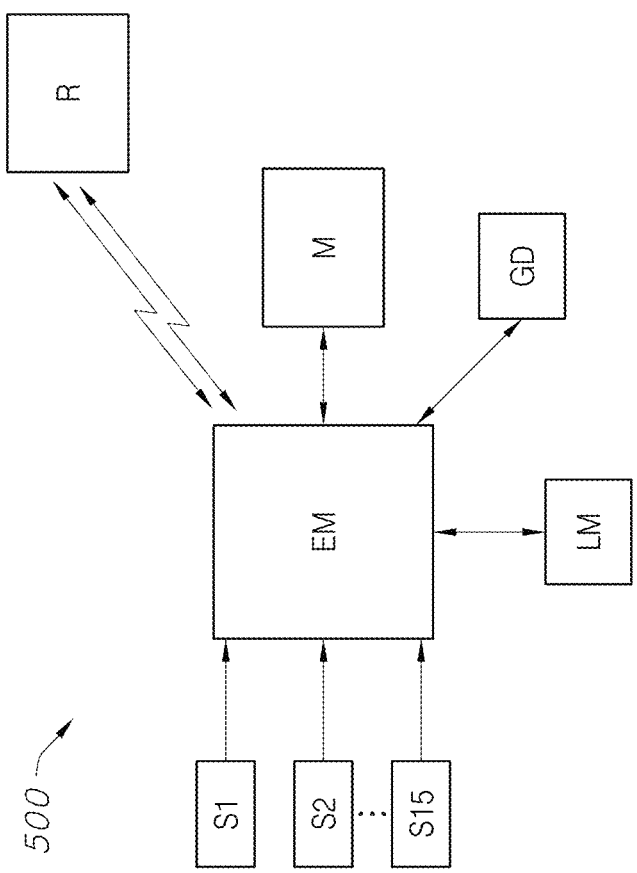
FIG. 27 is a schematic block diagram showing a control module for the boat lift and trolley assembly.

FIG. 27 shows a block diagram of a control system 500 for the boat lift and trolley assembly 100, 200, 300. The control system 500 includes a controller EM (e.g., located in the garage G, such as on a wall of the garage G) that receives information from a plurality of sensors S1-Sn (e.g., where n is a digit, such as S1-S10, S1-S15, as described herein, or greater or fewer number of sensors, etc.). The controller EM sends control signals to the motor M (and optionally to the motor M' on the platform 34') and receives operational information from the motor M based at least in part on the information the controller EM receives from the plurality of sensors S1-Sn. As discussed above, one or more of the sensors S4, S4' can be on the trolley 10, 10B, 10C to sense a position and/or motion of the trolley 10, 10B, 10C and/or any obstructions on the track 20 and in the path of the trolley 10, 10B, 10C. Optionally, one or more of the sensors can be located in one or more locations on the track 20, for example, to sense a position of the trolley 10, 10B, 10C. For example, at least one of the sensors S10 can be located in the boat garage G, just outside the boat garage G, and/or at the edge of the dock channel D. For example, one or more sensors S11 can be disposed in the garage G proximate the end of the track 20 to indicate the end of the track 20 and one or more sensors S12 can be disposed outside the garage G to indicate when the mule 50 and/or boat trolley 10, 10B, 10C is proximate the garage door GD, to cause the garage door GD to open. One or more sensors S13 (see FIG. 24G) can be disposed proximate the end of the track 20 (near the gap 46) to indicate the end of the track 20. One or more sensors can be located on the garage door of the boat garage G. With reference to the lift mechanism 30, one or more sensors can optionally be located on the posts 32 to sense when the slings 34 are connected thereto.

In operation, the boat B can be disposed within the boat garage G and on top of the trolley 10, 10B, 10C frame with the garage door GD in a closed position. The mule 50 can be coupled to the trolley 10, 10B, 10C, as discussed above, and proximate stop AB in the garage G near end of track 20. A user can initiate the automated deployment of the boat B by actuating a button, such as a "trolley out" activation button or "garage door open" activation button on a controller (e.g., control attached to the garage G, handheld remote control R, or a mobile electronic device such as a smartphone), at which point the garage door GD can open. Once the garage door GD is open (e.g., and triggers a signal from a "garage open" sensor S15, such as a proximity sensor that senses a location of the garage door GD), the controller EM can optionally turn on a chain tensioner to tension a drive chain attached to the trolley, such as drive chain 60 operatively coupleable to trolley 10C via mule 50). When the drive chain is tensioned to a predetermined amount, as sensed by a (tension) sensor, the controller EM can receive a signal that movement of the trolley 10, 10B, 10C is allowed. The operator can optionally press and hold a "trolley out" button to actuate the motor M to move the trolley 10, 10B, 10C (and the boat B) out of the boat garage G. The "trolley out" button can optionally be a Deadman button that the operator must continuously press for the trolley 10A, 10B, 10C to move. As the trolley 10, 10B, 10C moves, one or more sensors S4, S4' (e.g., proximity sensors) on the trolley 10, 10B, 10C and/or sensors S5 on the mule 50 can sense for obstructions in the trolley's path (e.g., on the track 20), and can signal the controller EM to stop movement of the trolley 10, 10B, 10C if an obstruction is sensed. In one embodiment, the lift mechanism 30, 30' can have one or more sensors that can communicate with the controller EM. For example, the lift mechanism 30 can have one or more sensors indicating that the lift cables/slings are in a stowed position and can communicate such a signal to the controller EM. Alternatively, as discussed above the lift mechanism 30' can have one or more sensors S8 that sense a position of the platform 34' (e.g., fully raised, lowered) and optionally communicates this to the controller EM. It the platform 34' is not in a fully raised position, the controller EM will stop the trolley 10A, 10B, 10C short of the end of the track 20 (near the gap 46) until sensors confirm the platform 34' has been fully raised, sensors S7, S9 confirm alignment between the rails 20A', 20B' and the rails 20A, 20B and/or sensors confirm the locking pins 42 have been actuated by the actuator(s) 44 to lockingly couple the track 20 to the platform 34'.

In one implementations, even upon receipt of signals that the platform 34' is completely raised, the controller EM can optionally pause movement of the trolley 10, 10B, 10C for a predetermined period of time before actuating the mule 50 (via the chain drive 60) to move the trolley 10, 10B, 10C onto the platform 34'. During said pause, the controller EM can bump the hydraulics of the platform 34' in the up mode to ensure the platform 34' is fully raised, and the pins 42 can be extended to align the rails 20A, 20B with the rails 20A', 20B'. and the locking engagement of the pins 42 with the rails 20A', 20B' is confirmed by sensors.

The controller EM actuates movement of the mule 50 (via the chain drive 60) to move the trolley 10, 10B, 10C onto the platform 34' until the trolley 10, 10B, 10C engages the mule 50'. The mule 50' on the platform 34' can then engage the trolley 10, 10B, 10C, as discussed above, and the mule 50 can disengage from the trolley 10, 10B, 10C and the controller EM actuates movement of the mule 50 in the opposite direction (away from the platform 34'), for example to a predetermined distance from the gap 46. The locking tab 36' on the platform 34' can then be moved, as discussed above, to inhibit movement of the trolley 10, 10B, 10C while on the platform 34'. The controller EM then actuates the locking pins 42 to retract to disengage the track 20 from the platform 34' (e.g., disengage the rails 20A, 20B from the rails 20A', 20B'). At this point, the operator can optionally use the controls on the platform 34' to lower the platform 34'. Alternatively, the operator can use a remote control or their mobile electronic device to operate the platform 34'.

Once the operator is done operating the boat B, and is ready to return the boat B to the garage, the operator can operate the system in reverse. For example, once the operator has maneuvered the boat B over the trolley 10, 10B, 10C, the operator can operate the "Platform Up" button (e.g., Deadman button) on the platform controller (e.g., remote control, mobile electronic device) to raise the platform 34'. When the platform 34' reaches the raised position, the platform 34' stops. The operator can then actuate the "Boat to Garage" button (e.g., dead man button) to start the trolley process. As the operator continues to hold the "Boat to Garage" button, the controller EM can bump the platform hydraulics to ensure the platform 34' is fully raised, then the locking pins 42 can be actuated to extend and engage the rails 20A, 20B of the track 20 with the rails 20A', 20B' on the platform 34'. Once the engagement of the track 20 with the platform 34' is sensed, the hydraulic lock tab 36' on the platform 34' will disengage and the mule 50 will move to its forward most position and stop. The mule 50' will push the trolley 10, 10B, 10C toward the track 20 until the mule 50 engages the trolley 10, 10B, 10C, at which point the mule 50' will disengage from the trolley 10, 10B, 10C. The controller EM can then actuate the mule 50 (via the chain drive 60) to pull the trolley 10, 10B, 10C toward the garage G. Once the trolley 10, 10B, 10C clears the gap 46, the locking pins 42 can optionally be actuated (by the controller EM) to disengage the track 20 from the platform 34'. The mule 50 will continue to pull the trolley 10, 10B, 10C toward the garage G. If the garage door GD is closed, it can optionally open automatically once the mule 50 and/or trolley 10, 10B, 10C trigger a sensor on the track 20. The trolley 10, 10B, 10C can continue into the garage G and stop when it reaches a stop position (as triggered by a sensor proximate the end of the track 20 in the garage G). The garage door GD can then be closed (using a Door Close button).

If the trolley 10, 10B, 10C is stopped in the garage door GD area, one or more track sensors S10 (e.g., sensors proximate the gap TG) can communicate with the controller EM to inhibit the closing of the garage door GD until the trolley 10, 10B, 10C is clear of the garage door GD area. The trolley 10, 10B, 10C can continue to travel toward the dock D (e.g., via a chain drive 60 actuated by the motor M under the control of the controller EM). One or more track end sensors S13 can communicate with the controller EM to stop the position of the trolley 10, 10B, 10C in a predetermined position on the dock D once it is reached.

As discussed above with reference to the trolley 10B, clips from the lift mechanism 30 can then be attached to pick-up mechanisms 15B3 (e.g., lift devises) of the upper frame 15B of the trolley 10B. The movement of the lift cable or sling from the stowed position can lock the movement of the trolley 10B, as discussed above. The operator can then press a "lift up" button to raise the boat B (and upper frame 15B) off the lower frame 11B of the trolley 10B. In one embodiment, the lift mechanism will not operate to lift the boat B unless all dock side cable clip sensors are vacant (indicating that the lift cable clips have been moved from the stowed position to couple them to the upper frame 15B.

The "lift up" button actuation can lift the upper frame 15B and boat B off the lower frame 11B of the trolley 10B until a lift stop sensor senses that the upper frame 15B has been lifted by at least a predetermined amount. Once said predetermined amount is reached, the lift stop sensor can communicate a signal to the controller EM, allowing the controller EM to allow movement of the lower frame 11B of the trolley 10B.

Optionally, the operator can then press a "trolley in" button to cause the controller EM to move the lower frame 11B of the trolley 10B from underneath the upper frame 15B (e.g., via the motor M operated chain drive attached to the lower frame 11B). The trolley 10B can be moved until a parking sensor is activated, indicating that the lower frame 11B of the trolley 10B is clear of the boat B, at which point the controller EM can receive a signal to stop movement of the lower frame 11B. At this point, the operator can actuate the lift mechanism to lower the boat and upper frame 15B into the water. Advantageously, the parking sensor would prevent the lift mechanism from lowering the upper frame 15B and boat B if it does not sense that the lower frame 11B is clear of the upper frame 15B.

Once use of the boat B was complete, the operator could navigate the boat B back onto the upper frame 15B while this is submerged in the water and press a "lift up" button to lift the boat B and upper frame 15B out of the water. Once a sensor of the lift mechanism 30 indicates the boat B is in the lifted position, such a sensor can communicate a signal to the controller EM allowing movement of the lower frame 11B. The operator can press a "trolley out" button to operate the motor M to drive the lower frame 11B under the upper frame 15B until a track end sensor is triggered. The operator can then operate the lift mechanism 30 to lower the upper frame 15B onto the lower frame 11B, as discussed above, at which point the operator can decouple the lift cable clips from the upper frame 15B and place them in the stowed position, thereby triggering the cable/sling stowed signal that can communicate to the controller EM that the trolley 10B can be moved. Such a signal allowing the trolley 10B to move, will not occur unless all the cable clip sensors on the lift mechanism indicate that the lift cables have been stowed and are no longer attached to the upper frame 15B. The operator can then operate a "trolley in" button to cause the controller EM to move the trolley 10B (via the motor M driven chain drive) toward the garage G. The signal from the cable clip sensors indicating that the lift cables are stowed, would allow the trolley 10B to continue moving toward the garage G without stopping once it passes the parking sensor, as discussed above. Optionally, a release and reapplication of the "trolley in" button can bypass the stop point indicated by the parking sensor.

The controller EM could continue to move the trolley 10, 10B, 10C toward the garage G (e.g., as long as the operator continues to press the "trolley in" button). The trolley 10, 10B, 10C will thus continue to move until it triggers and "end of track" sensors S15, which signal communicated to the controller EM will stop movement of the trolley 10, 10B, 10C. Additionally, the controller EM can prevent the closure of the garage door GD if an inside track sensor S10 (e.g., track sensor located inside the garage G) senses that the trolley 10, 10B, 10C is too close to the garage door GD). Once properly inside the garage G, the operator can press the "door close" button, causing the controller EM to activate the chain de-tensioner, which allows the chain to lose tension and rest in the grooves 23A, 23B discussed above, allowing the garage door GD to fully close. A garage door sensor S10 can be used to sense if there are obstacles in the closing plane of the garage door GD and if so can communicate a stop signal to the motor activating the movement of the garage door GD.

As discussed above, the actuation buttons for the various actions of the system (e.g., trolley in, trolley out, etc.) can be on a remote control R (e.g., a handheld remote control); in another embodiment, the user and use a mobile electronic device, such as a mobile phone or tablet (e.g., which has been paired with the controller EM and communicates wirelessly with the controller EM, such as via Bluetooth, Wi-Fi, RF), as the remote control R to actuate the controller EM (e.g., via a mobile app previously installed on the mobile electronic device, or via the internet without using a mobile app).

With reference to FIG. 27, operation of the trolley 10 embodiment is very similar to that of the trolley 10B, discussed above. The one or more sensors on the trolley 10 and/or one or more sensors on the track 20 can sense once the trolley 10 is clear of the boat garage G (e.g., more than a predetermined distance away from the entrance of the boat garage G) and the controller EM can actuate the garage door GD to close, and the one or more sensors can sense the position of the garage door GD. If said sensors sense that the trolley 10 is not clear of the boat garage G, the controller EM can inhibit (e.g., prevent) the garage door GD from closing to prevent the garage door from striking the boat B.

Once clear of the boat garage G, the controller EM can operate the motor M (e.g., via a Deadman button pressed by the operator) to move the trolley 10 toward the dock channel D. One or more of the sensors can sense when the trolley 10 is adjacent the opening of the dock channel D. At this point, the user can decouple the slings 34 from the posts 32, and the sensors can communicate said decoupling to the controller EM, which can then actuate the motor M to move the trolley 10 over the opening in the dock channel D. The user can then position the slings 34 under the boat B and recouple the ends of the slings 34 to the posts 32. The sensors can communicate the recoupling of the slings 34 to the posts 32, and the controller EM can operate the lift mechanism LM to lift the boat B off the trolley 10 frame 14. Once the boat B is off the trolley 10 (e.g., as sensed by one or more sensors, such as weight sensors on the trolley 10 or sensors on the lift mechanism LM), the controller EM can move the trolley 10 from below the boat B and out of the opening in the dock channel D, and can then operate the lift mechanism LM to lower the boat into the dock channel D and onto the water surface. The user can then operate the boat B.

Once done operating the boat B, the boat B can be moved from the dock channel D to back to the boat garage G by operating the control system 500 and boat lift and trolley assembly 100, 200 in the reverse order. First the user can move the boat B back into position in the dock channel and confirm the slings 34 are disposed under the hull of the boat B. The controller EM can operate the lift mechanism LM to lift the boat B out of the dock channel D. One or more sensors can sense when the boat B has been lifted to a predetermined position out of the dock channel D; for example, sensors can sense a position of the boat B and/or the slings 34 to sense that the predetermined position has been reached and communicate this to the controller EM. The controller EM can operate the motor M to move the trolley 10 into position under the boat B, and one or more sensors, can inform the controller EM when the trolley 10 is under the boat B, at which point the controller EM can operate the lift mechanism LM to lower the boat B onto the trolley 10 frame. If the trolley 10 frame is not completely under the boat B, as sensed by one or more of the sensors, the controller EM can prevent the lift mechanism LM from lowering the boat B. One or more sensors (e.g., weight sensors) can sense when the boat B has been placed on the trolley 10 frame, and a user can decouple the slings 34 from the posts 32 and remove the slings from under the boat B, at which point the controller EM can operate the motor M to move the trolley 10 away from the dock channel D and toward the boat garage G. The user can the recouple the slings 34 to the posts 32.

One or more sensors can sense when the trolley 10 is proximate the garage G, and the controller EM can operate the garage door GD to open. Sensors on the garage door GD can indicate the position of the garage door GD, and the controller EM can operate the motor M to move the trolley 10 into the garage G based on an indication that the garage door GD is fully open. One or more sensors can inform the controller EM when the trolley 10 frame 14, with the boat B thereon, is fully inside the boat garage G, and the controller EM can operate the garage door GD to close.

In addition to the indications provided to the controller EM by the one or more sensors on the track 20 or on the trolley 10, as discussed above, the sensors S2 can inform the controller EM if there are any obstructions on the track 20, and the controller EM can prevent movement of the trolley 10 based on said sensed information until such an obstruction is no longer sensed.

As noted above, optionally a remote control device (e.g., such as remote control R) may be configured to control the operation of the mechanisms discussed herein. For example, the remote control may be in the form of a portable wireless device, such as a smartphone, a tablet computer, a laptop computer, a wearable (e.g., a smart watch), and/or the like. The remote control device may also be a wired controller removably attached to a structure (e.g., attached to the garage, a post, or elsewhere). Optionally, the remote control functionality may be provided via an application (an "app") downloaded onto the remote control device (e.g., via an app store) or preinstalled on the remote control device. The app may be installed in non-volatile remote control device memory and may be executed by a processing device to perform operations described herein. In addition to providing an interface for controlling the mechanisms described herein, the remote control device may report status data received from sensors described herein, errors, camera views, messages, and/or other data.

Figure 28A:
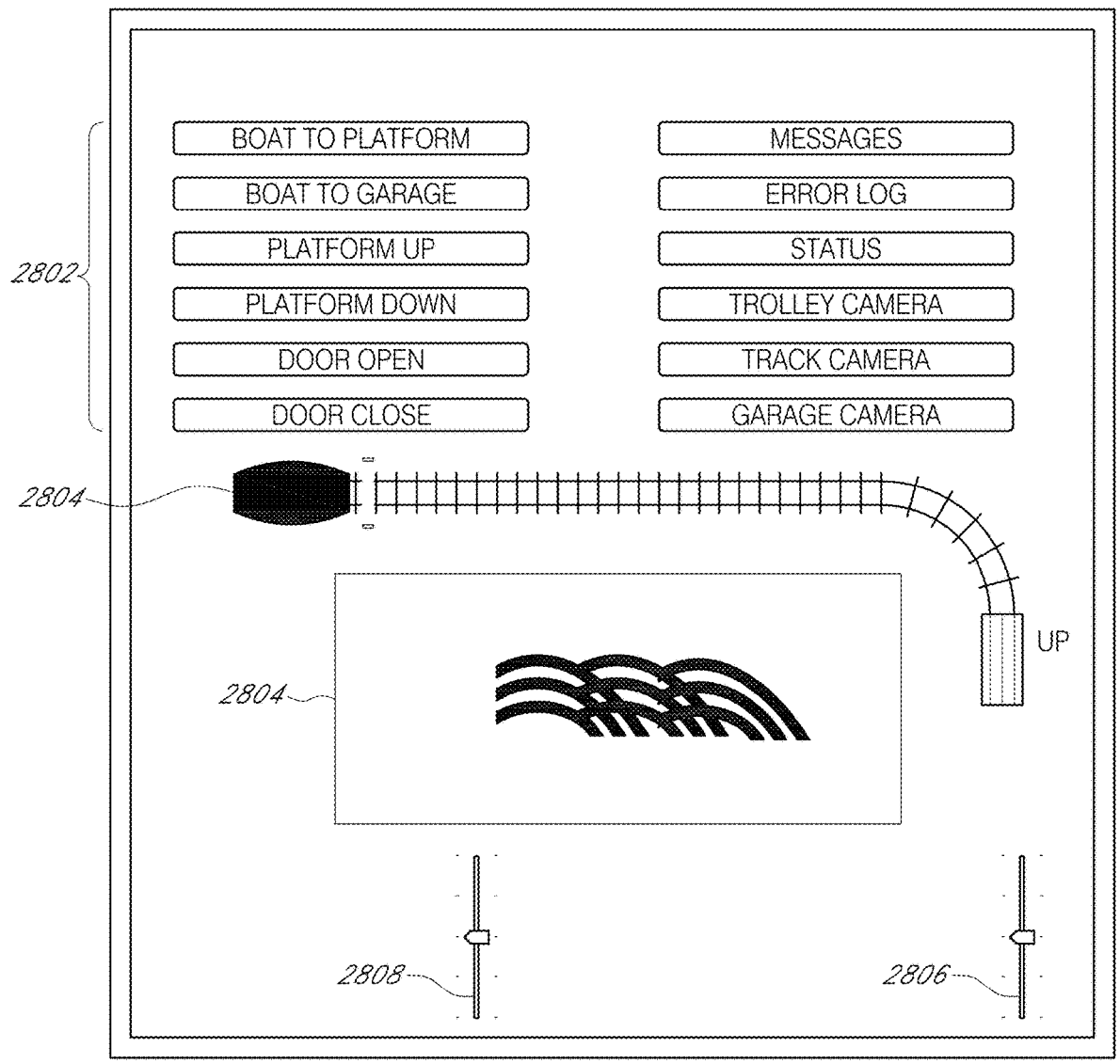
FIG. 28A is a schematic view of an example remote control device and interface.

Referring to FIG. 28A, an example remote control device and interface is displayed. Optionally, the illustrated remote control device may include a touch display, a soft or hard keyboard, microphones, cameras, and/or speakers. In this example, the remote control device is a wireless device that includes one or more wireless interfaces (e.g., a cell phone modem, a Wi-Fi interface, a Bluetooth interface, a ZigBee interface, a proprietary wireless interface, and/or other interface). The wireless interfaces may be used to send commands to the motors and other devices/components described herein and to request/receive data from the sensors disclosed herein. Some or all of the received sensor data may then be processed and displayed to the user via one or more user interfaces.

For example, the sensors may include position sensors (e.g., contact sensors, magnetic sensors, ultrasonic sensors, photoelectric sensors, pressure sensors, load sensors, float sensors, capacitive sensors, cameras, and/or other sensor types). By way of example, the sensors may be positioned and configured to detect the position of the boat trolley, the position of the lift assembly, the position of the garage door, the position of the mule 50, 50', the alignment of the rails 20A, 20A', 20B, 20B', and/or whether the pin(s) 42 have been fully extended to confirm the platform is engaged with the track. The sensors may include one or more wired or wireless cameras configured to stream images (e.g., still images and/or video images) to the remote control device. For example, one or more cameras may be positioned within the garage, on the trolley, on the mule, on the platform, on the tracks, and/or elsewhere to provide views of the boat, trolley, mule, track, platform, garage, garage door, and/or surrounding environment. The cameras may include wide angle lenses, fish eye lenses, rectilinear lenses, and/or macro lenses. The cameras may be positioned to be upward facing, downward facing, or level facing. The cameras may be motorized so that the pointing angle of the camera is controllable via the remote control device. Each camera may transmit images in association with a camera identifier (which may indicate the location of the camera).

Additionally, as discussed elsewhere herein, sensors may be configured to indicate that the lift cables/slings are in a stowed position. Sensors may be configured to measure the charge level of the batteries discussed herein, and to detect whether the batteries are currently being charged. Sensors may be configured to determine sling connection status. Some or all of the motors discussed herein may be equipped with some or all of the following sensors: overcurrent sensors (to detect overcurrent conditions), vibration sensors (to detect potentially damaging vibration), speed/rotation sensors, and/or temperature. The foregoing sensors may be used to detect a motor failure or potential failure, and to identify the cause of such failure or potential failure.

Certain sensors may be discrete in nature. For example, the mule position sensors may be spaced apart on the track(s) (e.g., every foot, every three feet, or other spacing) so as to provide a corresponding position detection resolution. Certain sensors may be continuous in nature (e.g., range finder sensors) so as to provide continuous or almost continuous position detection with high resolution (e.g., 0.1 inch, 0.5 inch, 1 inch).

The sensors may be water resistant, and in particular seawater/saltwater compatible. For example, sensors may optionally have housings of saltwater resistant materials, such as titanium, ceramic, plastic, and/or marine bronze.

Referring again to FIG. 28A, the example user interface may be organized into multiple areas to provide a logical, easy to learn arrangement. Further, such an arrangement may provide the most or more commonly used and/or critical control and status in a single display to thereby reduce the need to navigate through many screens. In the illustrated example, a control area 2802 provides controls to cause the foregoing mechanisms to transport the boat to the platform, to transport the boat to the garage, to move the platform up, to move the platform down, to open the garage door, and close the garage door.

Optionally, certain controls may be selectively configured as dead man controls that the user must continuously press for the corresponding operation to be performed to completion, wherein if the user releases the control, the app (which may continuously monitor the user's touch of the control) commands the corresponding component to stop a corresponding operation (or ceases commanding the component to perform the corresponding operation). Optionally, the app may be configured to respond to voice commands to execute the operations described herein. For example, the voice commands may be received via the remote control device microphone, and the voice commands may be translated to text (e.g., using a natural language processing engine). The text may be compared to tags associated with available operations, a match may be identified, and the matching operation may be caused to be performed.

Figure 28B:
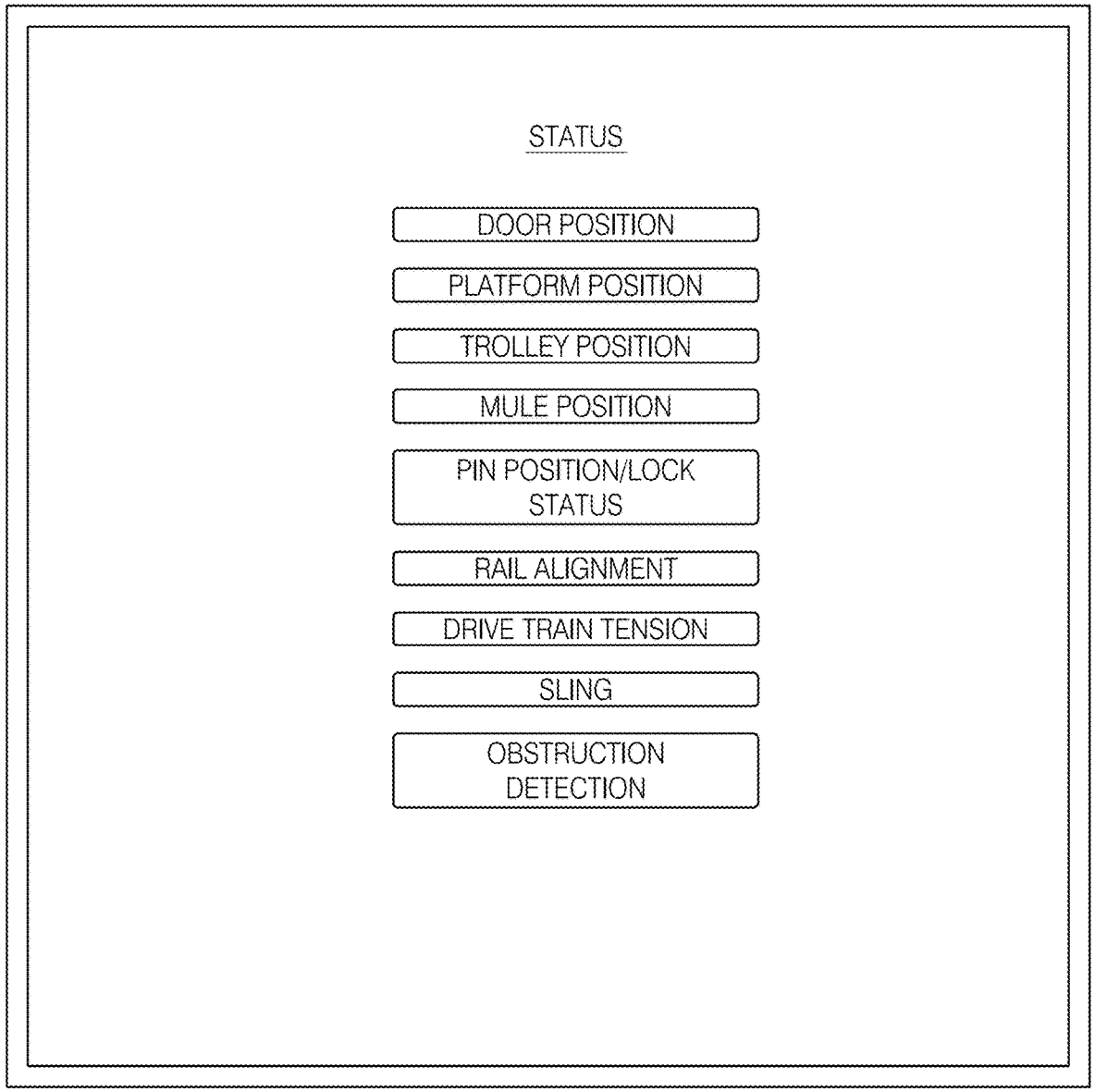
FIG. 28B is a schematic view of an example screen on an interface of the remote control device.
Figure 28C:
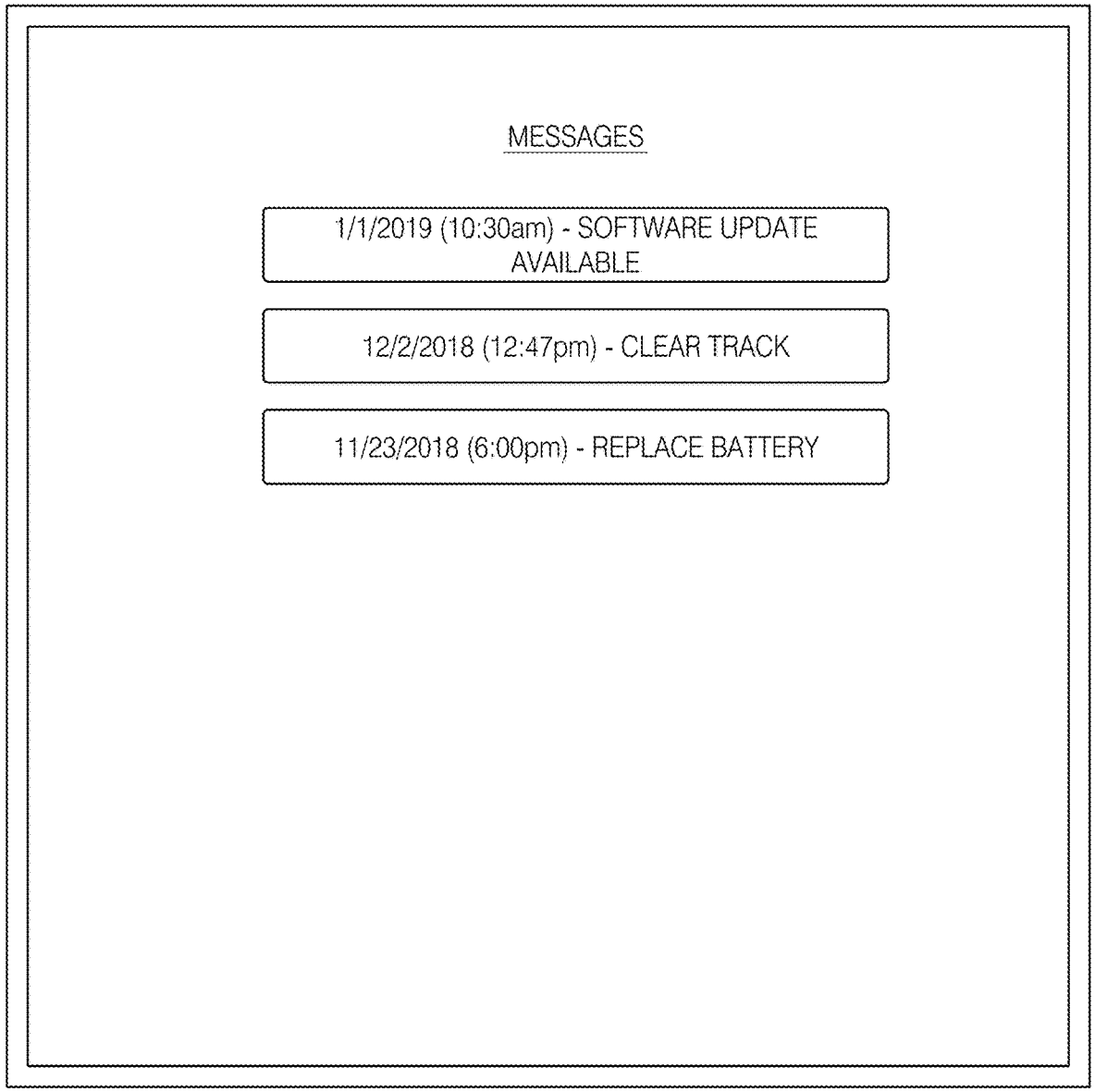
FIG. 28C is a schematic view of an example screen on an interface of the remote control device.

In addition, controls are provided which may cause the application to access and/or display certain information. For example, activation of a message control may cause messages generated by the app or received by the app from a remote system to be presented (see, e.g., FIG. 28C). Example messages may include an indication that there is a software update for the app, that remedial action needs to be taken (e.g., removal of debris on the track, replacement of rechargeable battery, etc.), current weather and/or ocean conditions, and/or other message types. Activation of the error log control may cause an error log to be accessed and presented, where the error log includes detected errors and the respective date/time of the detected errors. For example, the error log may include a history of detected obstructions, such as the object and/or location of the obstructions (e.g., stern, bow, mule, trolley, etc.). By way of further example, the error log may include motor overcurrent detections, battery charge failures, sensor failures, etc. The error log may include errors detected since inception of the error log and/or may be limited to a user specified date range.

Activation of the status control may cause the current operational and/or location status of various components (see, e.g., FIG. 28B), such as the garage door, the platform, the trolley, the mule, the pin(s), the rail alignment, the drive train tension, the sling status, the presence/location of obstructions, and/or the like. For example, the status may indicate "Trolley moving," "Trolley stopped," "Obstruction stern," "Obstruction bow," "Obstruction Mule," "Latch/lock error," "mule battery at 75% charge," "Garage door open," "Garage door closed," "Platform up," "Platform down," "Pins locked," "Rails aligned," "Drive train slack," "Boat parked," and/or the like. Errors displayed via the status user interface may also be included in the error log, however the error log may exclude non-error related status.

Various camera controls may be provided. When a given camera control is activated, the corresponding camera feed may be used by the remote control device and displayed via the camera feed display area 2804. In this example, trolley camera, track camera, and garage camera controls are provided, however additional, fewer and/or different camera controls may be provided. In addition, controls may be provided that enable the user to point the cameras to a desired pointing angle.

In addition, an animated, graphic representation of various components may be displayed in animated status area 2804. By way of illustration, sensor position data received by the app may be analyzed and the sensor data may be reflected via the animated status area 2804. For example, animated status area 2804 may indicate the position of the galley as the galley is being moved down the track. By way of further example, the animated status area 2804 may indicate the current position of the mule(s), garage door, and/or platform (e.g., up, down, moving upwards, moving downwards). In addition, the gauge 2806 may indicate the vertical position of the platform. By way of illustration, the app may store a mapping of various sensors to the illustrated tracks, track positions, and related components. When a sensor reports a position of a given component (e.g., the location of the trolley on the tracks) the representation of the trolley and/or boat may be redrawn or moved to correspond to the reported position.

The gauge 2808 may indicate the battery charge level of a mule battery, and may indicate whether or not the battery is currently being charged. Optionally, a battery charge level gauge or other indicator may be provided for each mule and/or other battery-powered devices.

Figure 29A:
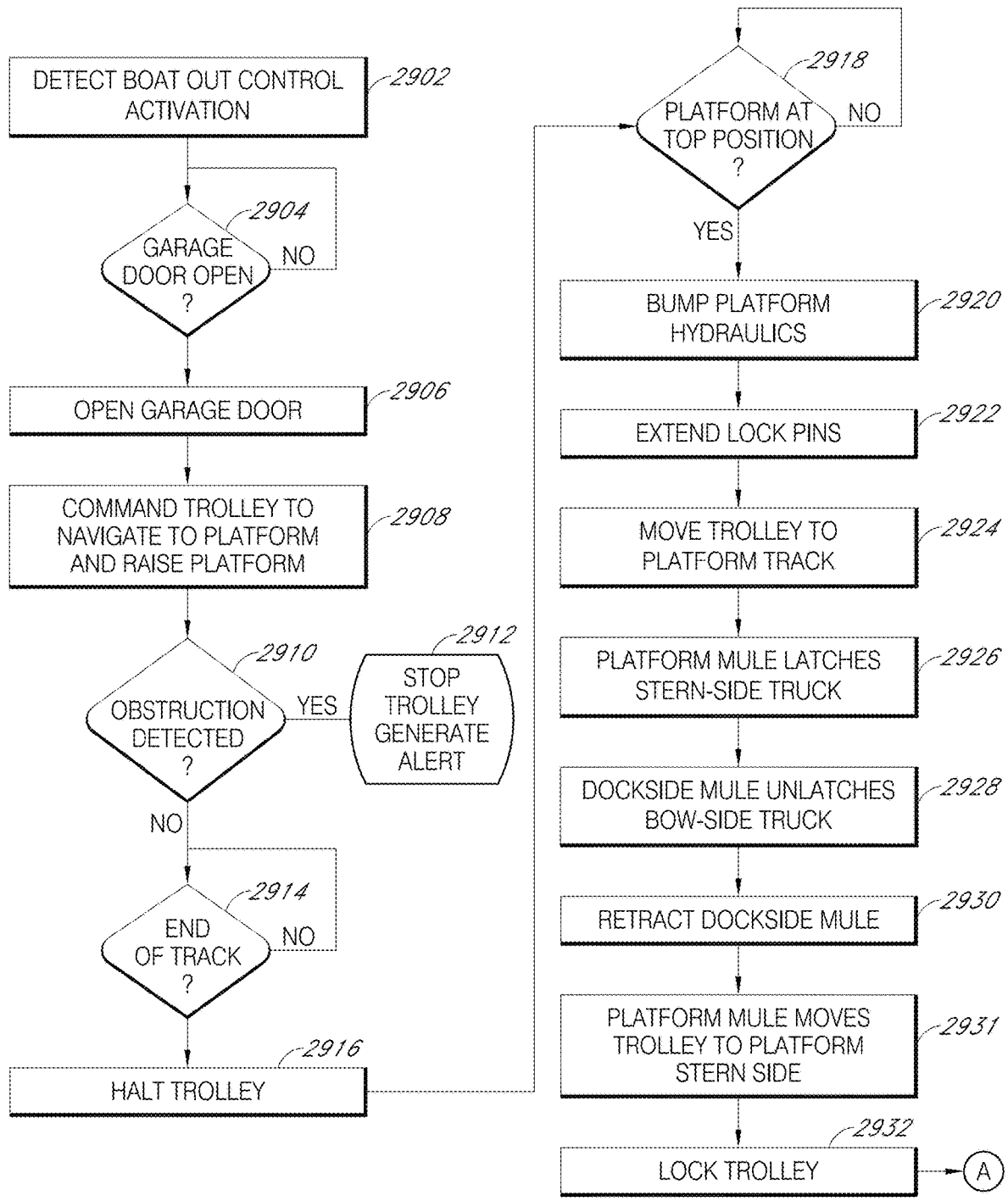
FIGS. 29A and 29B illustrate an example process for deploying boat from the garage.
Figure 29B:
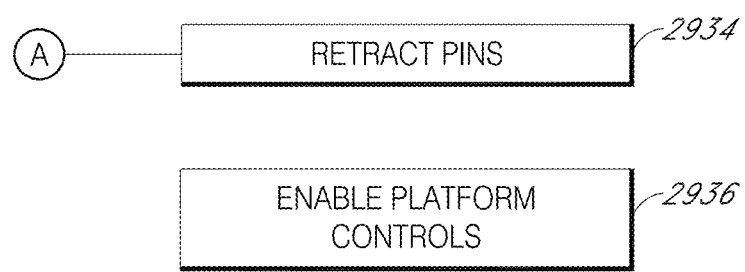

FIG. 29 (FIGS. 29A-29B illustrate an example process for deploying a boat from the garage (which may be executed by the apparatus described herein), as similarly discussed above. At block 2902, the process detects a user activation of a "boat out" control. Optionally, the process operates on a dead man basis, where the process continuously monitors the user activation of the "boat out" control, and if the user releases the control, the process stops certain operations.

At block 2904, a determination is made from the garage door sensor readings as to whether the garage door is open. If the garage door is not open, at block 2906, the garage door is commanded to open. The process may wait until the garage door sensors indicate that the garage door is fully open. At block 2908, the transport mechanism (e.g., the dockside mule and trolley) is commanded to transport the boat to the platform at the end of the track. The platform motors/pneumatics are commanded to raise the platform.

As the boat is being navigated on the track, the various sensors (e.g., proximity sensors) monitor for obstructions (e.g., branches, rocks, seaweed, etc. on the track). At block 2910, a determination is made as to whether the sensors detected an obstruction. If an obstruction is detected that appears to be a potential hindrance to the safe transport of the boat, at block 2912, the process commands the transport mechanism to stop movement (e.g., to stop movement of the dockside mule and trolley). Otherwise, at block 2914, sensors are monitored to detect if the transport mechanism has reached the end of the track ending at the gap between the track and the platform. In response to detecting that the transport mechanism has reached the end of the track, the transport mechanism is commanded to halt.

At block 2918, a determination is made from corresponding sensor readings as to whether the platform is fully raised to the top position. At block 2920, the platform hydraulics are bumped in the up mode to ensure the platform is fully trapped in an XY retainer (which reduces or eliminates the likelihood of minor leaks).

At block 2922, the lock pins are extended from the dockside tracks to the platform tracks to align the dockside tracks with the platform tracks. In response to the process sensing that the lock pins are fully extended and locked (via corresponding sensors) to the platform tracks, at block 2924 the transport mechanism is commanded to be moved to the platform track until the stern side of the trolley contacts the platform mule. At block 2926, the platform mule clamps are commanded to latch the trolley truck (e.g., on the stern side). At block 2930, the dockside mule clamps are commanded to unlatch from the bow-side trolley truck. At block 2931, the platform mule is commanded to transport the trolley onto the platform and park the trolley in the appropriate location (e.g., the stern side of the platform). At block 2932, the dockside mule is commanded to move backwards (e.g., 2-4 feet) from the platform gap. At block 2932, a platform-based hydraulic mechanism is commanded to push a locking tab up to lock the platform mule or the trolley to prevent trolley movement At block 2934, the pins are commanded to retract from the platform rails. At block 2936, in response to sensors detecting that the pins have been successfully retracted, the platform controls are enabled so that the user can utilize the platform control to provide desired commands.

Figure 30:
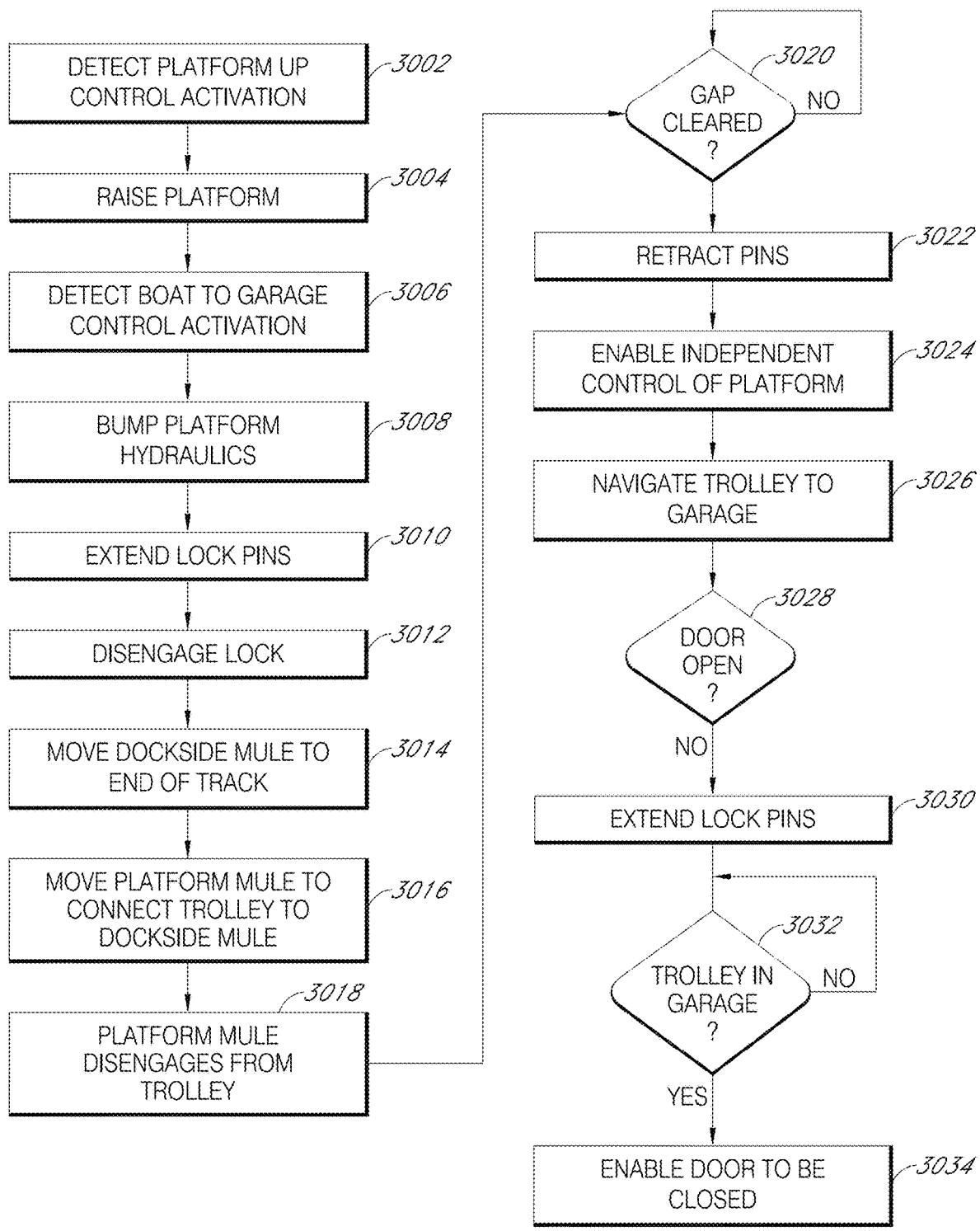
FIG. 30 illustrates an example process for returning a boat to the garage.

FIG. 30 illustrates an example process for returning the boat and trolley to the garage, as similarly discussed above. The boat is docked onto the lowered platform (where the platform is lowered beneath the surface of the water) and onto the trolley support bunkers. At block 3002, the process detects a user activation of a "Platform up" control, indicating that the platform and bunkered boat are to be raised. Optionally, the process operates on a dead man basis, where the process continuously monitors the user activation of the "Platform up" control, and if the user releases the control, the process stops certain operations (e.g., the movement of the platform).

At block 3004, in response to the detected activation of the "Platform up" command, the platform is commanded to be raised. When the platform is fully raised, the platform movement stops. At block 3006, the process detects a user activation of a "Boat to garage" control, indicating that boat and trolley are to be returned to the garage. At block 3008, in response to detecting the "Boat to garage" command, the user-accessible platform controls (e.g., provided via the remote control device) are optionally disabled to prevent the user from commanding the platform to perform an action that may be unsafe or that may damage the boat, rails, or other components. In addition, the controller is commanded to bump the up platform hydraulics to ensure that the platform cylinder is in the full up position. At block 3010, the pins are commanded to extend from the track end to engage the platform rails, and to thereby align the platform tracks with the tracks going to the garage. At block 3012, in response to sensing via sensors that the pins are fully extended and locked to the platform rails, the trolley hydraulic lock tabs on the platform are caused to disengage.

At block 3014, the dockside mule is commanded to move to the most forward position on the track, to a point just before the gap between the dockside track and the platform, and stop. At block 3016, the platform mule, on the stern side of the boat, is commanded to transport the trolley towards the dockside mule, until the dockside mule clamps engage the trolley. At block 3018, the platform mule is commanded to release its clamps so as to disengage from the trolley. At block 3020, position sensors are monitored to determine if the trolley has cleared the gap between the platform and the tracks. In response to detecting that the trolley has cleared the gap between the platform and the tracks, the process proceeds to block 3022, and the pins are retracted from the platform rails. At block 3024, in response to detecting that the pins have been retracted from the platform rails (so that the platform tracks are no longer mechanically coupled to the dockside tracks), the platform controls (e.g., on the remote control device) are enabled so that the user can independently control the platform now that it is safe to do so.

At block 3026, the dockside mule is commanded to transport the trolley to the garage. At block 3028, the process detects, via corresponding door sensors, whether the garage door is open. In response to detecting the garage door is not open, at block 3030, the garage door is commanded to open. At block the 3032, a determination is made as to whether the trolley is at a parked position in the garage (e.g., by monitoring a sensor at or near the end of the track that indicates whether the trolley is at a designated end point). At block 3034, the garage door is commanded to close automatically, or a user can manually activate a door close control so as to close the door.

FIGS. 31-34C schematically illustrate a boat lift and trolley system 600 (hereinafter "the system"). The system 600 is similar to the system 300 in FIGS. 17-26B, except as described below. Therefore, reference numerals used to designate the various components of the system 600 are identical to those used for identifying the corresponding components of the system 300 in FIGS. 17-26B. Thus, the structure and description for the various features or components of the system 300 in FIGS. 17-26B are understood to also apply to the corresponding features or components of the system 600 in FIGS. 31-34C, except as described below.

Figure 31:
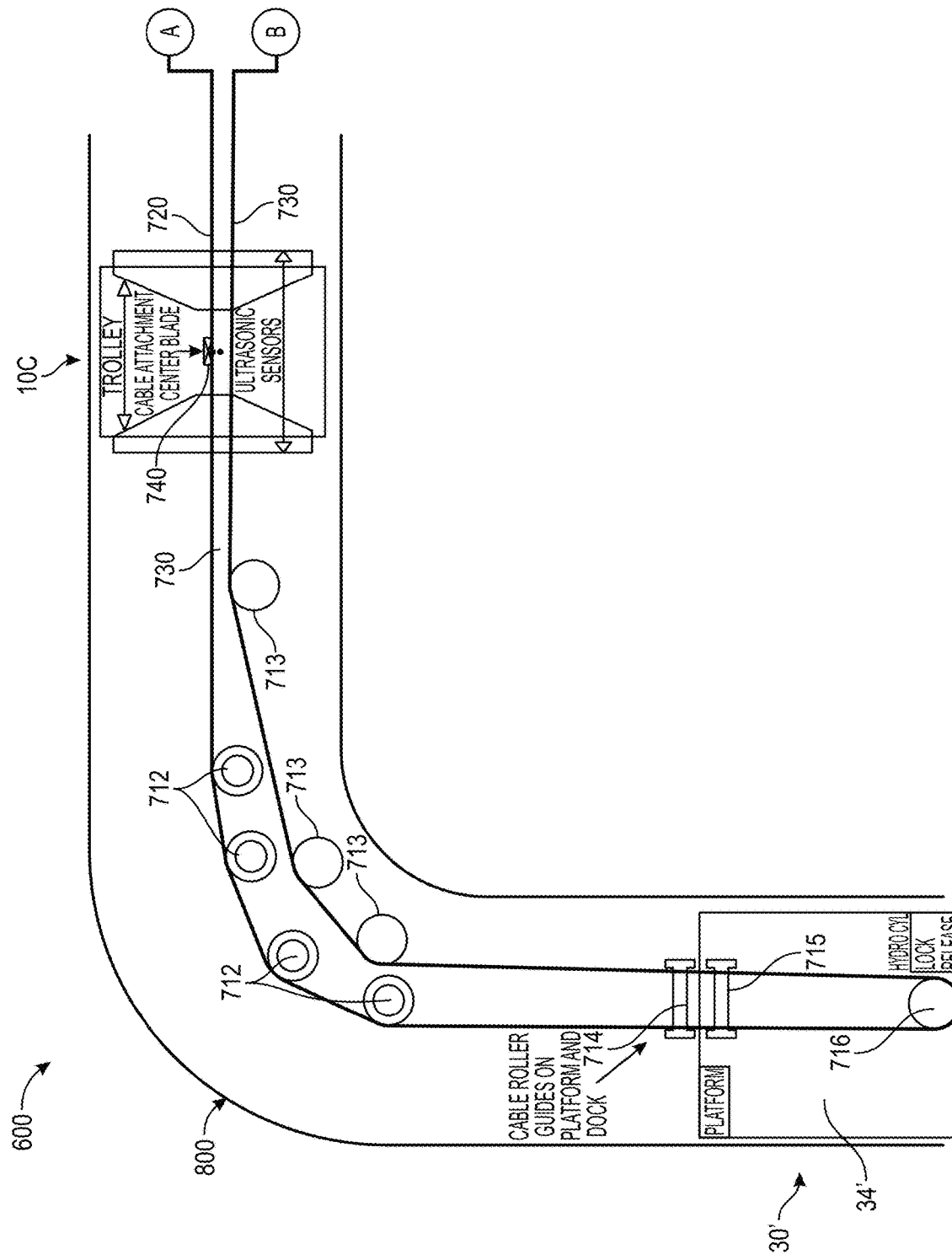
FIG. 31 is a schematic view of an automated boat lift and trolley that travels between a boat garage and a platform lift, showing the boat outside of the boat garage.
Figure 31:
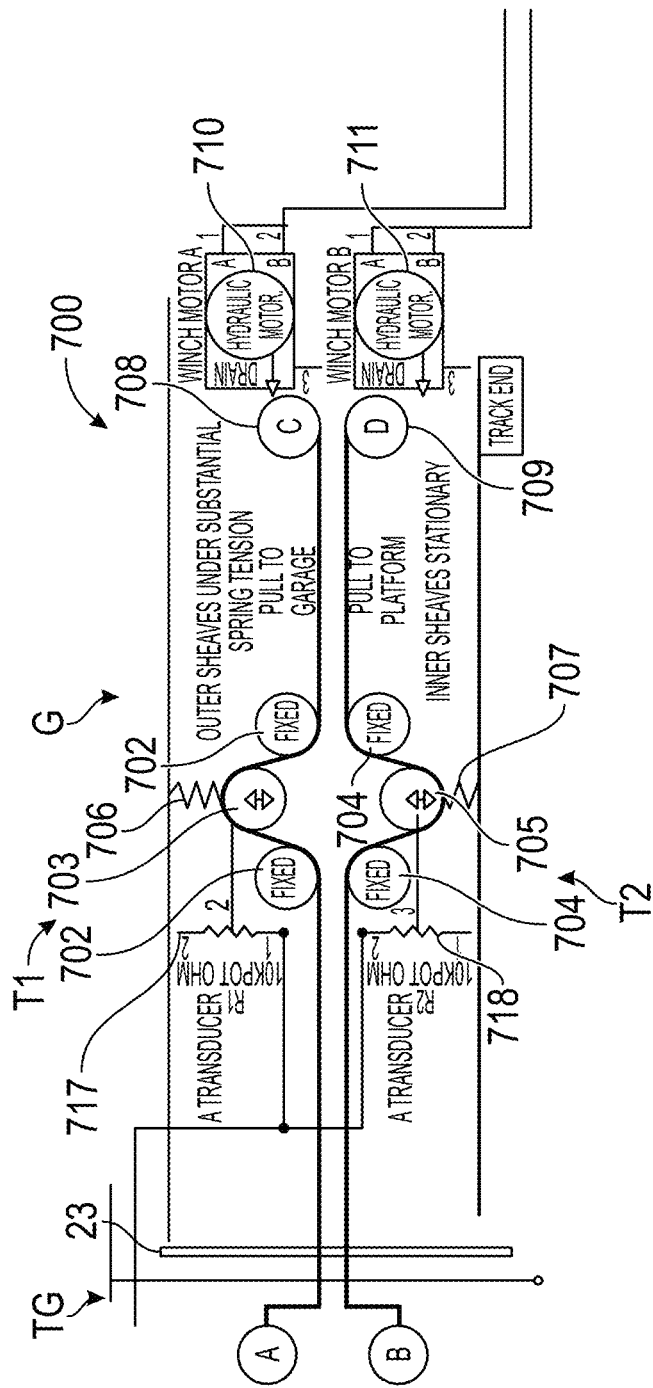
Figure 31A:
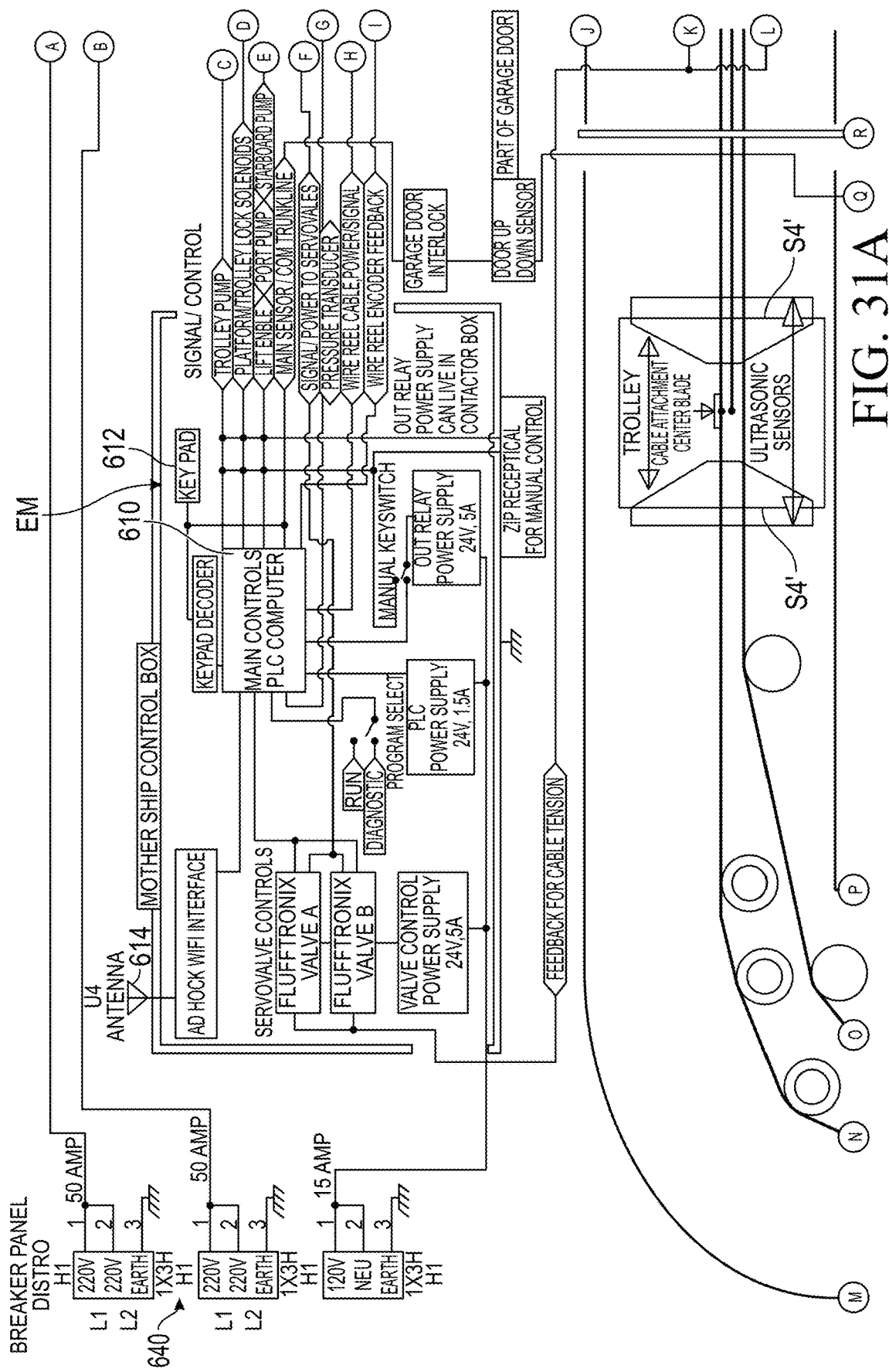
FIG. 31A is a schematic view of the control electronics for the automated boat lift and trolley of FIG. 31.
Figure 31A:
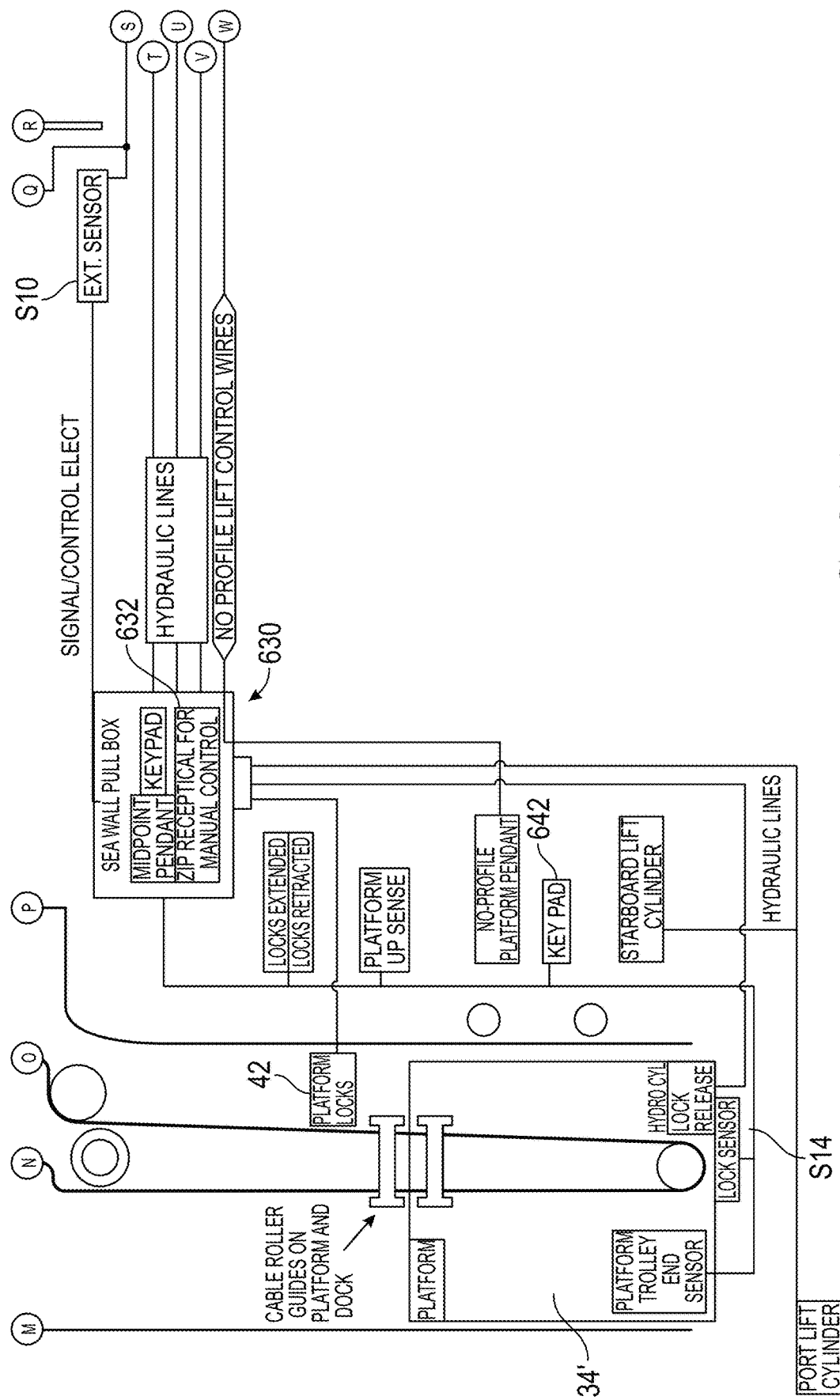
Figure 31A:
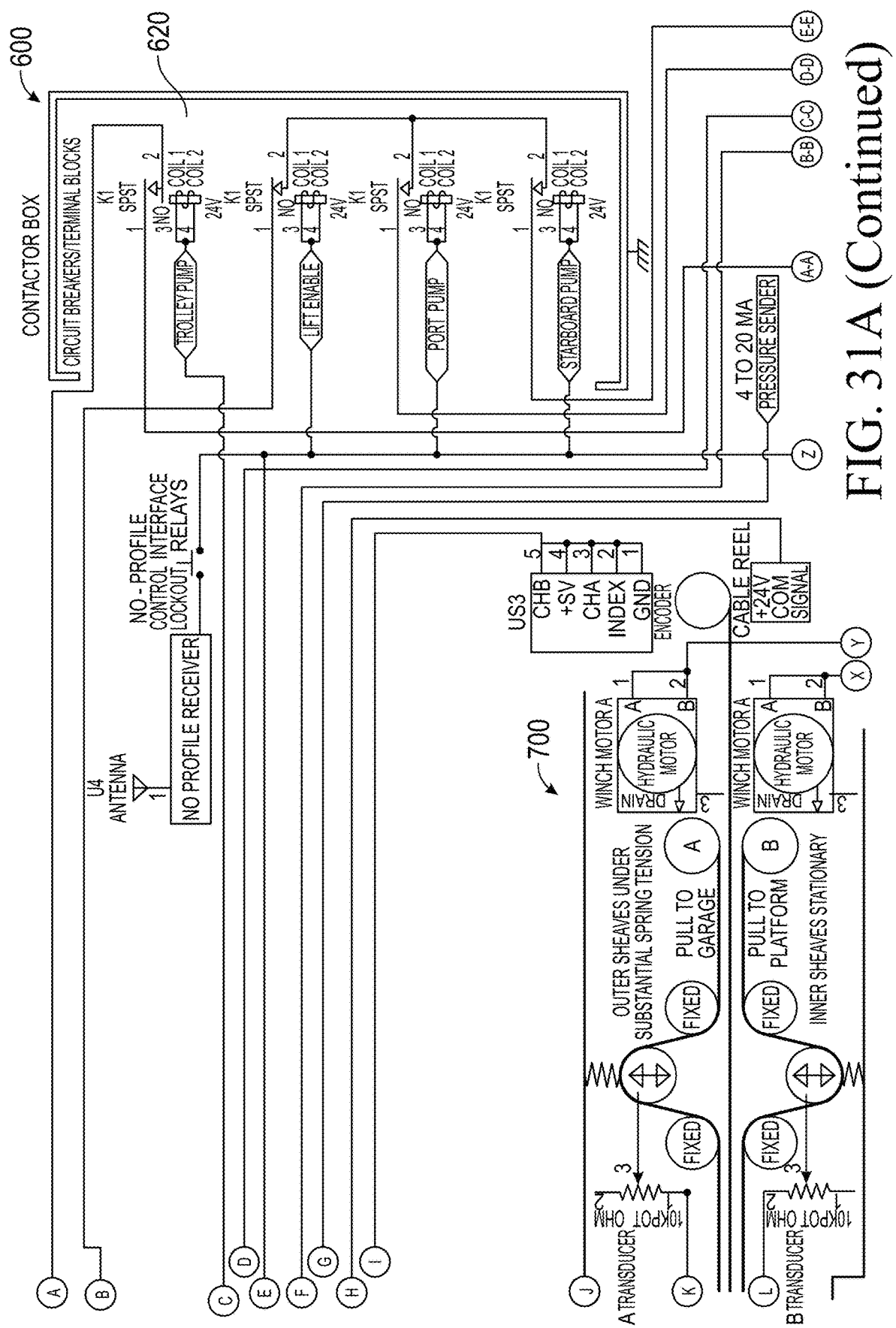
Figure 31A:
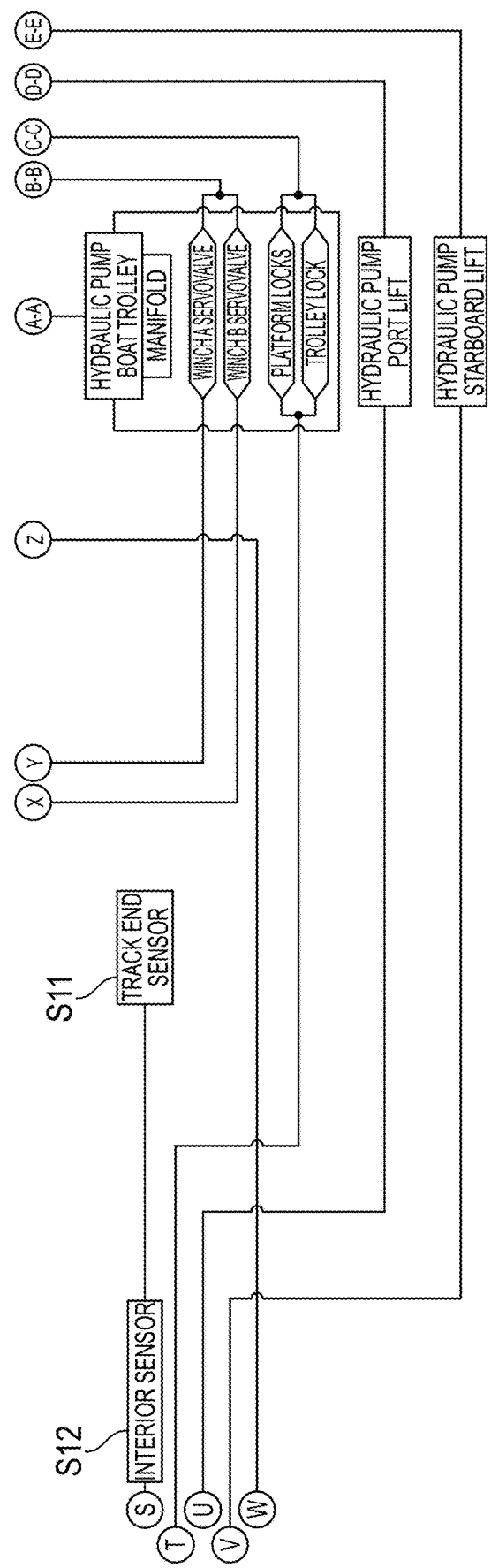

In the drawing sheets, FIG. 31 is shown on two sheets with elements "A" and "B" on sheets 1 and 2 showing where the image in FIG. 31 continues from one sheet to the other. In the drawing sheets, FIG. 31A is shown on four sheets with elements "A" to "L" (i.e., A, B, C, D, E, F, G, H, I, J, K, L) on sheet one of FIG. 31A continuing onto the same elements on sheet three of FIG. 31A, elements "M" to "R" (i.e., M, N, O, P, Q, R) on sheet one of FIG. 31A continuing onto the same elements on sheet two of FIG. 31A, elements "S" to "W" (i.e., S, T, U, V, W) on sheet two of FIG. 31A continuing onto the same elements on sheet 4 of FIG. 31A, and elements "X" to "Z" (i.e., X, Y, Z) and "A-A" to "E-E" (i.e., A-A, B-B, C-C, D-D, E-E) on sheet three of FIG. 31A continuing onto the same elements on sheet 4 of FIG. 31A. Accordingly, for the image in FIG. 31A, sheet two is below sheet one, sheet three is to the right of sheet one, and sheet four is below sheet three and to the right of sheet two.

The system 600 differs from the system 300 in that it includes a different drive system 700 for moving (e.g., in an automated manner) the trolley 10C from the garage G to the platform 34', which can then be lowered into the water to withdraw the boat B from on top of the trolley 10C, and from the platform 34' to the garage G for storage (e.g., after the boat B has been moved onto the trolley 10C on the lowered platform 34' in the water and the platform 34' lifted to a position aligned with the track 20). Instead of the mules 50, 50', the drive system 700 includes a dual winch mechanism, further described below, that wind and/or pay out cables that attach to the trolley 10C. Operation of the dual winch mechanism to wind and/or pay out cables drive the motion of the trolley 10C toward the platform 34', toward the garage G, or maintains the trolley 10C in a stopped position. Advantageously, the two winches in the dual winch mechanism work together using a dual tensioner that provides feedback on tension on the cables that are wound on the drums of the dual winch mechanism. At least a portion of the drive system 700 (such as the dual winch mechanism, dual tensioner and controls EM) can be housed in the garage G.

With reference to FIG. 31, the drive system 700 of the boat lift and trolley system 600 has a first pair of fixed pulleys 702 and second pair of fixed pulleys 704 opposite to each other between the rails 20A, 20B of the track 20. A first variable position pulley 703 is arranged at least partially between the first pair of fixed pulleys 702, and a second variable position pulley 705 is arranged at least partially between the second pair of fixed pulleys 704. The first and second variable position pulleys 703, 705 are connected to first and second springs 706, 707, respectively, such that the first and second variable position pulleys 703, 705 are spring loaded. The first and second variable position pulleys 703, 705 are connected to first and second transducers 717, 718, respectively. The position of the first and second variable position pulleys 703, 705 is adjusted (e.g., independently for each variable position pulley 703, 705) based on sensed tension on the cable that winds around the pulleys 703, 705 as provided by the transducers 717, 718. Therefore, the first variable position pulley 703, first spring 706 and first transducer 717 are part of a first tensioner T1 and the second variable position pulley 705, second spring 707 and second transducer 718 are part of a second tensioner T2, where the first and second tensioners T1, T2 provide the dual tensioner system.

With continued reference to FIG. 31, the drive system 700 includes a first winch drum 708 driven by a first winch motor 710 and a second winch drum 709 driven by a second winch motor 711. The winch motors 710, 711, winch drums 708, 709, variable position pulleys 703, 705, fixed pulleys 702, 704 and transducers 717, 718 can be disposed (e.g., housed) inside the garage G.

A first cable 720 can have one end wound around the first winch drum 708, and extend therefrom and wind at least partially around the first pair of fixed pulleys 702 and first variable position pulley 703 and extend to and couple with a cable attachment block or blade 740 on the trolley 10C (e.g., attach to one side of the block or blade 740 on an underside of the trolley 10C). Optionally, the cable attachment block or blade 740 can be arranged along a center axis of the trolley 10C (e.g., arranged at a longitudinal and transverse center of the trolley 10C). The first cable 720 can extend generally along a centerline between the tracks 20A, 20B toward the first winch drum 708.

A second cable 730 can have one end wound around the second winch drum 709, and extend therefrom and wind at least partially around the second pair of fixed pulleys 704 and the second variable position pulley 705 end extend toward the platform 34' of the platform lift mechanism 30'. The second cable 730 can optionally (and sequentially) wind at least partially around a third set of fixed pulleys 713 disposed between the rails 20A, 20B of the track 20 at it extends toward the platform 34', pass over a first roller 714 proximate an end of the track 20, pass under a second roller 715 proximate an end of the platform 34' that faces the end of the track 20, wrap around an end cylinder or sheave 716 (e.g., turn around sheave) proximate a distal end of the platform 34'. From the end cylinder or sheave 716, the second cable 730 continues (e.g., sequentially) back toward the trolley 10C and passes under the second roller 715, passes over the first roller 714, optionally winds at least partially around a fourth set of fixed pulleys 712 and extends to and couples to the cable attachment block or blade 740 on the trolley 10C (e.g., attaches to an opposite side of the block or blade 740 on the underside of the trolley 10C from where the first cable 720 attaches). The first and second cables 720, 730 are optionally fixed to the trolley 10C (e.g., to the cable attachment block or blade 740 of the trolley 10C). The first and second cables 720, 730 an in one implementation be synthetic rope. In another implementation, the first and second cables 720, 730 can be metal cables.

In operation, the drive system 700, via the controller EM, operates the winch drums 708, 709 and winch motors 710, 711 to move the trolley 10C toward the platform 34', toward the garage G, or stay in place. FIG. 31A shows a schematic control block diagram for the controller EM of the system 600, including the drive system 700. The controller EM include a computer 610. The computer 610 can be a programmable logic controller (PLC) computer (e.g., with one or more processors). The controller EM can include a keypad 612 (e.g., via which the user can provide input to the controller EM, as further discussed below). The controller EM can include an antenna 614 (e.g., via which the a user can provide input to the controller EM in a wireless manner with a wireless device, such as a smartphone, as further discussed below). The controller EM is in electrical communication with other electronics of the system 600, which can include a contactor box 620, a Seawall Pull Box 630 having a keypad 632, and a breaker panel 640. The seawall pull box 630 can communicate with a keypad 642 proximate the platform 34'.

With reference to FIG. 31, to move the trolley 10C toward the garage G, the first winch motor 710 operates to rotate the first winch drum 708 in a first direction to wind the cable 720 onto the first drum 708, thereby pulling the trolley 10C in the direction of the garage G. The second winch motor 711 operates (e.g., simultaneously to the rotation of the winch drum 708) to rotate the second winch drum 709 in a second direction opposite to the first direction to unwind or pay out the cable 730 from the second winch drum 709. The first and second transducers 717, 718 sense (or measure) a tension of the cables 720, 730, respectively, and adjust the position of the first and second variable position pulleys 703, 705 to maintain the tension of the cables 720, 730 within a desired range (e.g., at approximately a desired tension value) as the trolley 10C moves.

The tension of the cables 720, 730 effected by the first and second tensioners T1, T2 vary depending on the direction of movement of the trolley 10C and controlled, via the winch motors 710, 711, by the computer 610. For example, on a scale of 1 to 10, low or minimum tension can be for example between 1 and 3, such as 1.5, high tension can be for example between 8 and 10, and medium tension can be in between, for example between 5 and 6. High or maximum tension on the cables 720, 730 can also depend on whether the trolley 10C is loaded (with a boat B) or not, for example having a lower value, such as 6 in a 1 to 10 scale, if the trolley 10C is unloaded. Based on the springs 706, 707, the tension provided by the first and second tensioners T1, T2 can in one example be in the range of 25 lbs. to 30 lbs. on the low end (e.g., low or minimum tension setting of 0 to 1.5 on a 1-10 scale), 50 lbs. to 65 lbs. for medium tension (e.g., medium tension setting of 5-6 on a 1-10 scale), and 175 lbs. to 3600 lbs. for high or maximum tension (e.g., high or maximum tension setting of 8-10 on a 1-10 scale), for example on a logarithmic scale.

If the drive system 700 is operated to pull the trolley 10 toward the garage G, the tension of the cable 720 will be relatively higher (e.g., set to "high"), with a top speed of the first winch motor 710 limited to a value provided by the computer 610. The tension of the cable 730 will be set to a relatively lower level and the second winch motor 711 operated to pay out the cable 730 to maintain a minimum tension as commanded by the computer 610 (e.g., a tension level that allows the cable 730 to remain reliably coupled around the pulleys and sheaves 712, 713, 716, such as without slack). Both the first and second winch motors 710, 711 can be controlled by independent servo loops. When the platform 34' is lowered, with the trolley 10C on the platform 34', both winch assemblies 761, 763 would be set to low tension and the servo loops would control the first and second winch motors 710, 711 to maintain a minimum tension on the cables 720, 730 as the first and second winch motors 710, 711 rotated the first and second winch drums 708, 709 to pay out the cables 720, 730 if the platform 34' is being lowered, or take up or wind the cables 720, 730 if the platform 34' is being raised. If the boat trolley 10C is not on the platform 34' as the platform 34' is raised or lowered, the first winch motor 710 would remain locked (e.g., the first winch drum 708 would not rotate) and the second winch motor 711 would be operated at low tension (by its servo control loop) to pay out the cable 730 if the platform 34' is being lowered, or take up or wind the cable 730 if the platform 34' is being raised. The first and second tensioners T1, T2 provide feedback for the servo control loops using the transducers 717, 718.

With reference to FIG. 31, to move the trolley 10C toward the platform 34', the winch motor 710 operates to rotate the winch drum 708 in the second direction to unwind or pay out the cable 720 from the winch drum 708. The winch motor 711 operates (e.g., simultaneously to the rotation of the winch drum 708) to rotate the winch drum 709 in the first direction opposite to the second direction to wind the cable 730 onto the winch drum 709, thereby pulling the trolley 10C in the direction of the platform 34'. The first and second transducers 717, 718 sense (or measure) a tension of the cables 720, 730, respectively, and adjust the position of the first and second variable position pulleys 703, 705 to maintain the tension of the cables 720, 730 within a desired range (e.g., at approximately a desired tension value) as the trolley 10C moves.

With reference to FIG. 31, to maintain the trolley 10C in a stopped position, neither of the winch motors 710, 711 operates to rotate their respective winch drums 708, 709. The first and second transducers 717, 718 sense (or measure) a tension of the cables 720, 730, respectively, and adjust the position of the first and second variable position pulleys 703, 705 to maintain the tension of the cables 720, 730 within a desired range (e.g., at approximately a desired tension value) as the trolley 10C is in the stopped position (e.g., on the track 20, wholly within the garage G, wholly on the platform 34').

With reference to FIG. 31, once the trolley 10C is on the platform 34' and the platform lift mechanism 30' is operated to lower the platform 34' (with the trolley 10C on it, and boat B on the trolley 10C) into the water, both of the winch motors 710, 711 operate to rotate (e.g., simultaneously) their respective winch drums 708, 709 in the second direction to unwind or pay out the cables 720, 730 from the winch drums 708, 709, respectively. The first and second transducers 717, 718 sense (or measure) a tension of the cables 720, 730, respectively, and adjust the position of the first and second variable position pulleys 703, 705 to maintain the tension of the cables 720, 730 within a desired range (e.g., at approximately a desired tension value) as the trolley 10C is lowered with the platform 34' into the water, after which the boat B can be removed from the trolley 10C for use in the water. Once the boat B is back on the trolley 10C and the platform lift mechanism 30' is operated to raise the platform 34' (with the trolley 10C on it, and the boat B on the trolley 10C), both of the winch motors 710, 711 operate to rotate (e.g., simultaneously) their respective winch drums 708, 709 in the first direction to wind the cables 720, 730 onto the winch drums 708, 709, respectively. The first and second transducers 717, 718 sense (or measure) a tension of the cables 720, 730, respectively, and adjust the position of the first and second variable position pulleys 703, 705 to maintain the tension of the cables 720, 730 within a desired range (e.g., at approximately a desired tension value) as the trolley 10C is raised with the platform 34'. As discussed previously, once the platform 34' is aligned with the track 20, the platform 34' can be locked (e.g., automatically locked) to the track 20 before the trolley 10C (with the boat B thereon) is moved from the platform 34' onto the track 20 (e.g., to move the trolley 10C to the garage G for storage).

Figure 32:
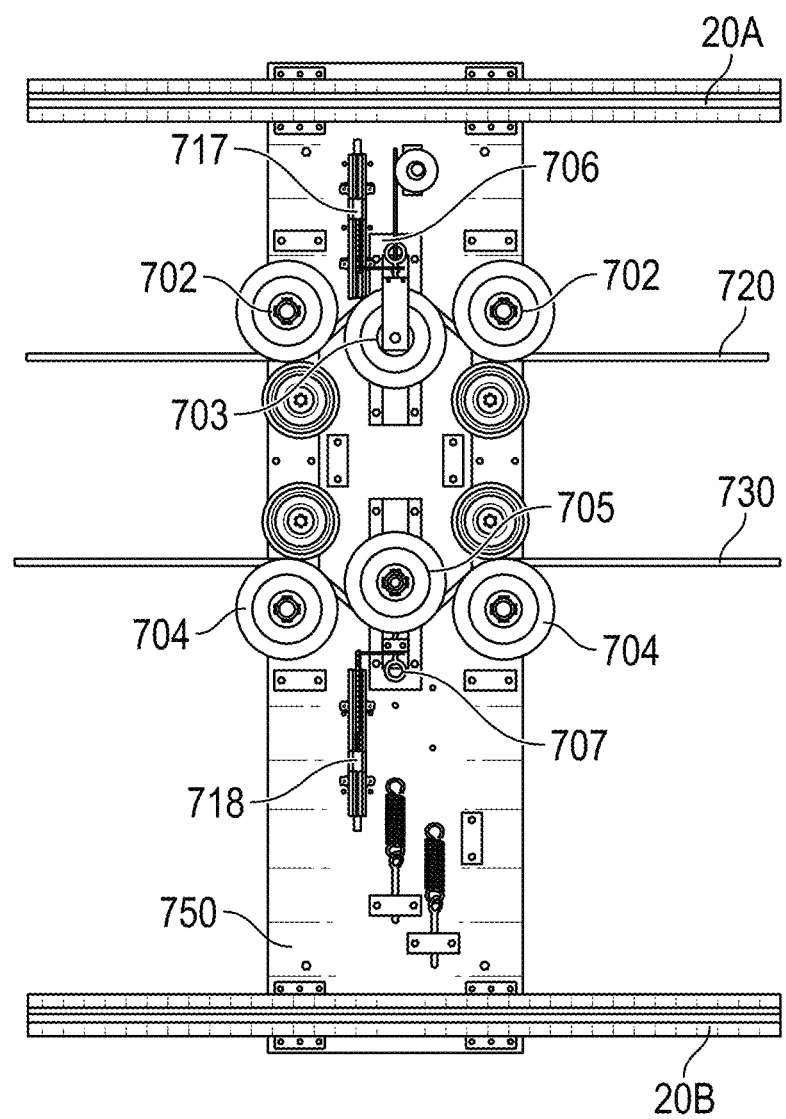
FIG. 32 is a schematic top view of a pulley and dual tensioner system of the automated boat lift and trolley of FIG. 31.

With continued reference to FIG. 31, the cables 720, 730, sets of pulleys 712, 713 and first roller 713 can be disposed between the rails 20A, 20B of the track 20. Optionally, the cables 720, 730, sets of pulleys 712, 713 and first roller 713 can be disposed vertically lower than the rails 20A, 20B of the track 20. For example, they can be disposed under floor boards, such as of a deck 800, between the rails 20A, 20B, to avoid exposure to the weather and inhibit users tripping on them while walking on the deck 800 on which the track 20 is disposed. Advantageously, the track 20 is disposed in a no-profile manner on the deck 800 to minimize the track 20 (e.g., rails 20A, 20B) being a tripping hazard to users waking on the deck 800. For example, the rails 20A, 20B of the track 20 can be generally aligned with (e.g., not protrude relative to) portions of the deck 800 adjacent the rails 20A, 20B. The cable attachment block or blade 740 can optionally extend through a slot in the floor boards between the rails 20A, 20B and couple to the cables 720, 730 beneath the floor boards. Similarly, the first and second pair of fixed pulleys 702, 704, first and second variable position pulleys 703, 705 and transducers 717, 718 can optionally be disposed vertically lower than the rails 20A, 20B within the garage G, such as under floor boards between the rails 20A, 20B in the garage G. Optionally, the first and second pair of fixed pulleys 702, 704, first and second variable position pulleys 703, 705 and transducers 717, 718 can be mounted on a platform 750 disposed below the rails 20A, 20B, as shown in FIGS. 32-33, thereby having a compact and low profile.

Figure 34A:
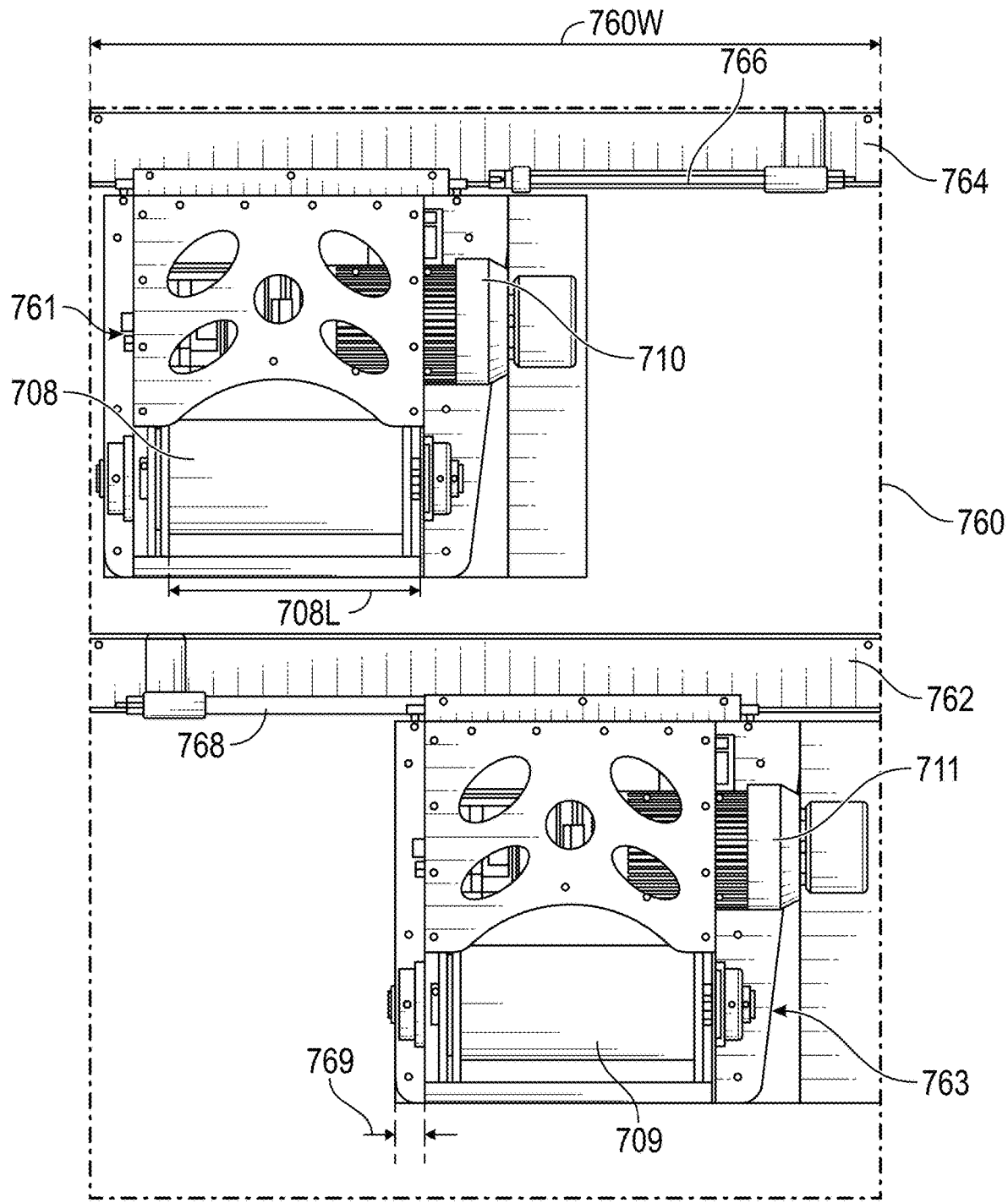
FIG. 34A is a schematic front view of a dual winch assembly for the automated boat lift and trolley system of FIG. 31.
Figure 34B:
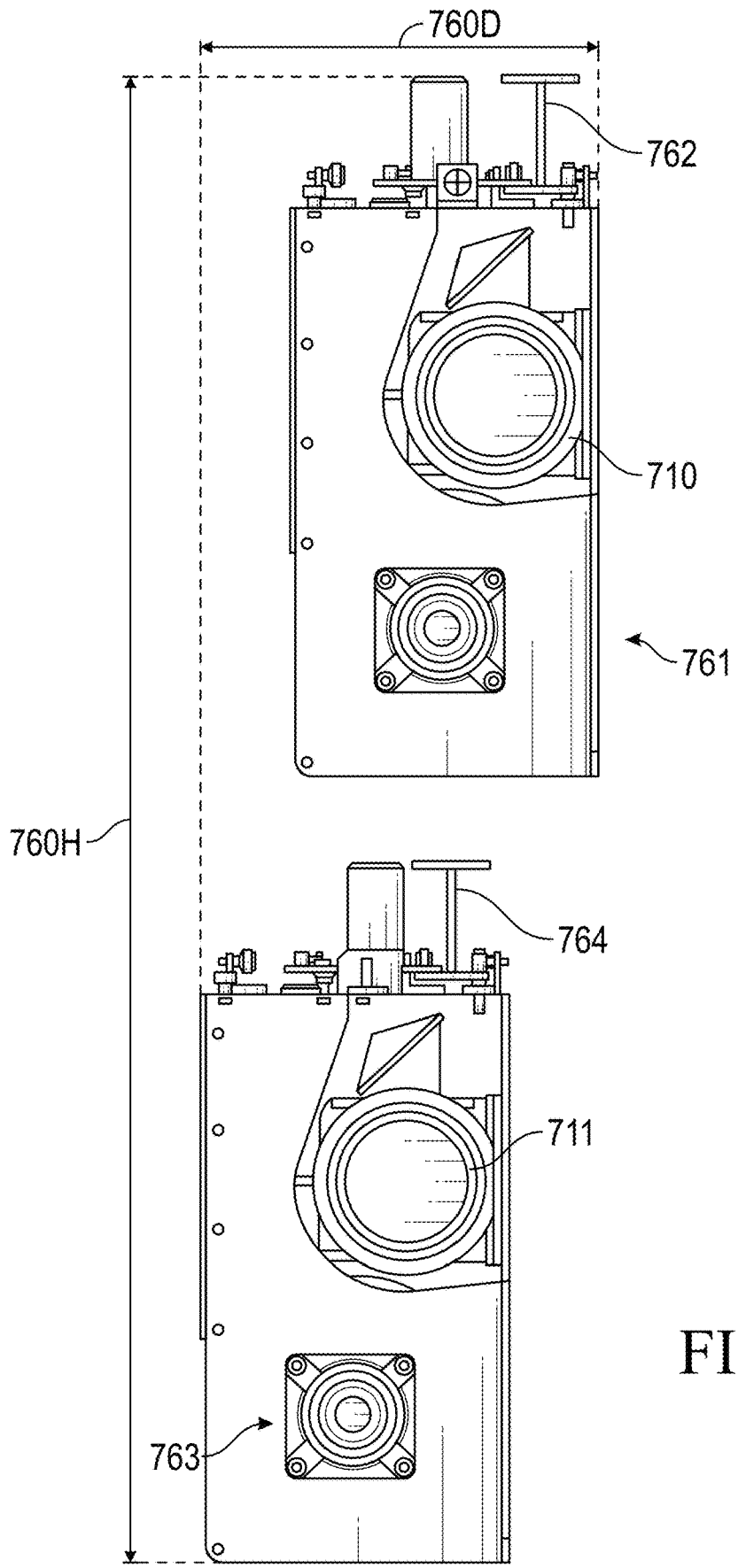
FIG. 34B is a schematic side view of the dual winch assembly of FIG. 34A.
Figure 34C:
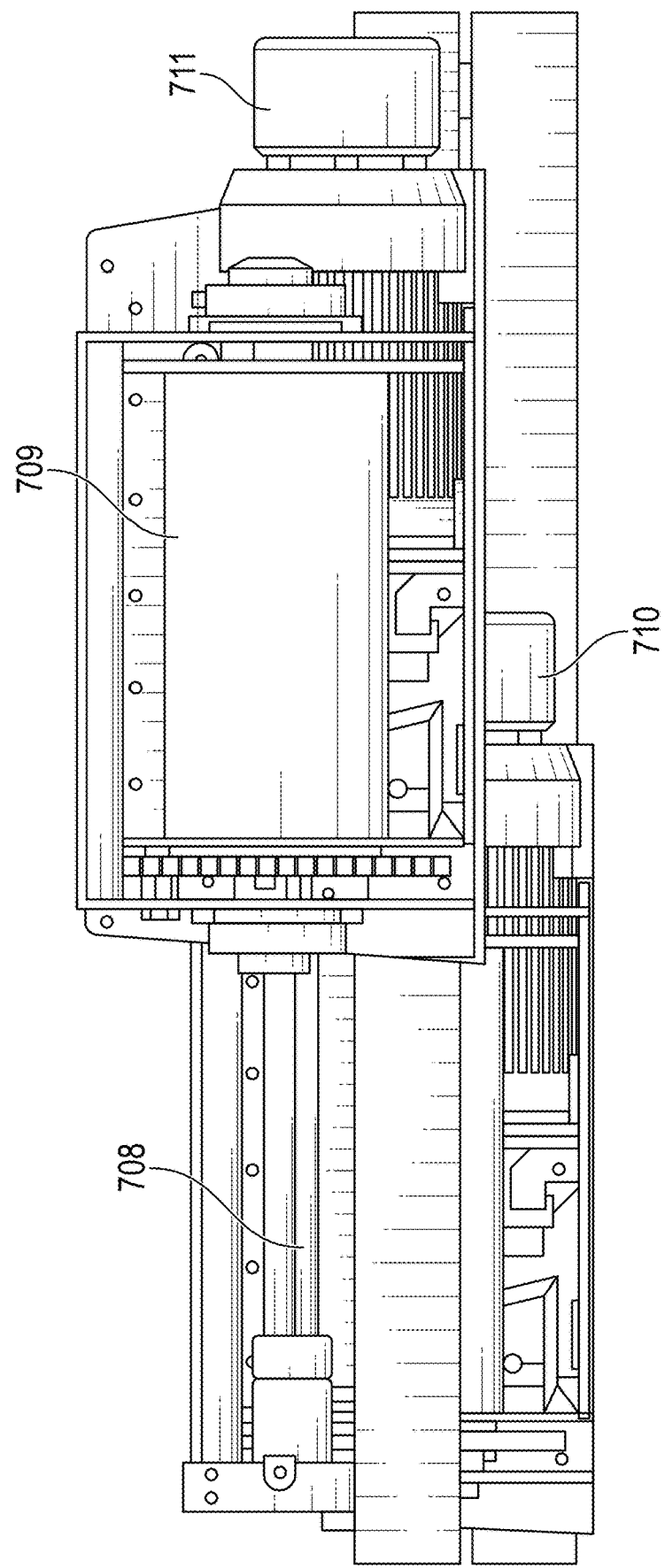
FIG. 34C is a schematic bottom view of the dual winch assembly of FIG. 34A.

FIGS. 34A, 34B and 34C show schematic front, side and bottom views of one arrangement of the winch drums 708, 709 and their respective winch motors 710, 711. The first winch drum 708 and first winch motor 710 can be part of a first winch assembly 761 and the second winch drum 709 and second winch motor 711 can be part of a second winch assembly 763. The first winch drum 708 can have a length 708L. In one example, the length 708L can be between 1 foot and 2 feet (e.g., approximately 1½ feet). The second winch drum 709 can optionally have the same length as the first winch drum 708. In one implementation, the first and second winch assemblies 761, 763 can me mounted vertically and housed in a cabinet 760 having a height 760H, a width 760W and depth 760D. Though not shown, the cables 720, 730 extend horizontally from the track and wrap at least partially about a pair of right angle sheaves to then extend vertically to the first and second winch assemblies 761, 762 in the vertical cabinet 760. In one example, the height 760H of the cabinet can be between 5 feet and 7 feet (e.g., approximately 6 feet). In one example, the width 760W can be between 4 feet and 6 feet (e.g., approximately 5 feet). In one example, the depth 760D can be between 1 foot and 3 feet (e.g., approximately 2 feet). The cabinet 760 can provide a low profile enclosure for the first and second winch assemblies 761, 763 and be disposed in the garage G (e.g., near the end of the track 20).

The first winch assembly 761 can be mounted (e.g., movably mounted, slidably mounted) to a first support beam 764, and the second winch assembly 763 can be mounted (e.g., movably mounted, slidably mounted) to a second support beam 762. A first linear actuator 766 is coupled to the first winch assembly 761 and a second linear actuator 768 is coupled to the second winch assembly 763. The first and second linear actuators 766, 768 move the first and second winch assemblies 761, 763 laterally (e.g., in a horizontal direction) in a reciprocating matter to facilitate the even distribution of the cables 720, 730 on the first and second winch drums 708, 709. The first and second linear actuators 766, 768 can operate independently of each other and have sensors that sense the position of the winch assemblies 761, 763.

The first and second winch assemblies 761, 763 are laterally offset from each other along the width of the cabinet 760 so that the cables 720, 730 that wind thereon, respectively, are spaced apart by a distance 769. In one example, the distance 769 is between 3 inches and 6 inches (e.g., approximately 4½ inches). In one example, to keep the spacing between the cables 720, 730 on the winch drums 708, 709 the same as the cable spacing on the tensioners T1, T2, the cable spacing 769 can be approximately 16 inches, which can advantageously simplify rigging and installation of the first and second winch assemblies 761, 763. The first and second winch assemblies 761, 763 are also offset from each other along the depth 760D of the cabinet 760. The first and second winch assemblies 761, 763 are also offset from each other in the vertical direction along the height 760H of the cabinet.

One or both of the winch drums 708, 709 can have an encoder sensing drum position and speed. The winch assemblies 761, 763 have a failsafe brake (e.g., electric failsafe brake) to lock the drums 708, 709 (e.g., prevent the drums 708, 709 from rotating).

As discussed previously, the track 20 has multiple sensors (e.g., S12, S10, S13) that sense a position of the trolley 10C and communicate with the controller EM, and sensors (e.g., S8) that sense a position of the platform 34'. The sensors S4, S4' on the trolley 10C can be ultrasonic sensors that can sense obstructions in the path of the trolley 10C. The sensors S4, S4' on the trolley 10C can communicate (e.g., wirelessly) with the controller EM, and can be powered by a rechargeable power source (e.g., rechargeable batteries) on the trolley 10C. The rechargeable power source (e.g., rechargeable batteries) can be charged (e.g., inductively) when the trolley 10C is in the garage G (e.g., when the power source 18C of the trolley 10C is proximate the inductive power transmitter G1 in the garage G). In one example, the power source (e.g., rechargeable batteries) on the trolley 10C and additionally or alternatively be powered via one or more solar panels on the trolley 10C that are electrically connected to the power source.

Once the trolley 10C is on the platform 34', a mechanical locking device, such as the stop tab 36' described above, can lock the position of the trolley 10C on the platform 34' and a sensor S14 can sense the locking of the trolley 10C. In one example, the mechanical locking device is controlled by back tension applied by the second winch drum 709 while the first winch drum 708 pulls the trolley 10C past the locking location to thereby release the trolley 10C to travel (e.g., once the platform 34' is raised and locked to the track 20).

Following is one example of a method of operating the system 600. With the trolley 10C in the garage G, a user can use one of the keypads (e.g., in the garage G that is hardwired to or communicates wirelessly with the controller EM, on a wireless device such as a smartphone in wireless communication with the controller EM), such as keypads 612, 632, 642, to enter a security code (e.g., a 6 digit security code) to wake up and enable the system 600. The system 600 can optionally remain active for a predetermined period of time (e.g., 3 minutes), or the user can press a key (e.g., a specified key, such as a number key) to immediately lock and disable the system 600. Upon said actuation, the system 600, via the controller EM, will automatically open the garage door GD if it is closed. Once the garage door GD is sensed open, the winch motors 710, 711 come on line, and automatically set themselves for minimum tension and hold at said tension. If the platform 34' is not in the fully raised position, the system 600 can optionally provide an alert (e.g., visual, audio warning) and not move the trolley 10C. However, the first and second winch assemblies 761, 763 will activate to allow for the platform 34' to be positioned in the fully raised position.

If the platform 34' is in the fully raised position, triggering the "platform up" indication from the sensor S8, and indication from sensors S7, S9 confirming alignment between the rails 20A', 20B' of the platform 34' and rails 20A, 20B of the track 20 and/or sensors confirming the locking pins 42 have been actuated to lockingly couple the track 20 to the platform 34', then the "Trolley Out" key on keypad (e.g., in the garage G or on wireless device, such as smartphone), such as keypads 612, 632, 642, that is pressed by the user will activate the second winch motor 711 to rotate the second winch drum 709 to wind the cable 730 and begin to pull the trolley 10C (with the boat B thereon) out towards the platform 34'. The first winch drum 708 is operated by the first winch motor 710 to pay out the cable 720 to maintain the low tension value on the tensioner sensor 717. As discussed above, in one example, such control of the movement of the trolley 10C is a Deadman style control, where the user or operator must keep the actuation key depressed on the keypad, such as keypads 612, 632, 642, to activate motion of the trolley 10C. If the operator releases the key, the winch assemblies 761, 763 both go to low tension, stopping the trolley 10C. If the actuation key stays pressed, and there are no obstructions sensed by the sensors S4, S4' (e.g., ultra-sonic safety sensors) on the trolley 10C, then the second winch motor 711 will continue to rotate the second winch drum 709 to wind the second cable 730 and pull the trolley 10C (with the boat B thereon) out to the platform 34'. As the trolley 10C travels along the track 20, the various track sensors keep track of the position of the trolley 10C on the track 20.

When the trolley 10C reaches the end of the rails 20A', 20B' on the platform 34', an end of track sensor will initiate the second winch assembly 763 (with the second winch motor 711 and second winch drum 709) to go to low tension mode, which will activate the trolley platform lock 36'. The "trolley locked" sensor (e.g., sensor S14) will tell the controller EM that the controls of the platform lift mechanism 30' can now be enabled to control the platform 34'. The boat owner can then lower the trolley 10C (with the boat B thereon) into the water using the platform lift controls to lower the platform 34' into the water. Alternatively, the boat owner can continue to press the "trolley out" key on the keypad (e.g., in the garage G) or app (e.g., on the wireless device, such as a smartphone), such as keypads 612, 632, 642, to activate the lowering of the platform 34' automatically. The winch motors 710, 711 remain active to pay out the cables 720, 730 as the platform 34' drops into the water. Optionally, the system 600 uses lockout that activates after a predetermined time period (e.g., three minutes), and that is programmable. If the keypad (e.g., in the garage G control or app, such as on the wireless device, such as a smartphone), such as keypad 612, 632, 642, times out, the system 600 locks (e.g., locks the movement of the trolley 10C, such as by stopping the operation of the winch motors 710, 711; locks the movement of the platform 34'). Once the boat B is in the water, platform 34' can optionally be raised using a "trolley in" key (on the keypad in the garage G or app on wireless device, such as smartphone) or via platform controls (e.g., located at or near the end of the track 20 proximate the platform 34'), such as keypads 612, 632, 642, and the system 600 is optionally locked (e.g., by pressing a key on the keypad in the garage G or wireless device, such as smartphone, or allowing the operation of the system 600 to time out), such as via keypads 612, 632, 642.

In order to move the trolley 10C (with the boat B thereon) from the water back to the garage G, if the platform 34' is raised, and the trolley 10C locked at end of the platform rails 20A', 20B', the user can, for example, enter the security code using the keypad (e.g., in the garage or on the wireless device, such as an app on a smartphone), such as keypads 612, 632, 642, so that the system 600 will unlock. If the garage door is closed, entering the security code will cause the garage door of the garage G to open (e.g., automatically). The first and second winch assemblies 761, 763 will come on line at minimum tension to allow for movement of the platform 34'. Platform controls will now be active and the platform 34' can be lowered to retrieve boat B by actuating (e.g., pressing) a "trolley out" key (e.g., on the keypad at the garage G or keypad on a smartphone app, or a keypad of the platform controls, such as via keypads 612, 632, 642, which can be located near the end of the track 20 adjacent the platform lift mechanism 30'. Once the platform 34' has been lowered into the water, the boat B can be loaded onto the trolley 10C and the platform 34' can be raised with the trolley 10C therein (and the boat B on the trolley 10C).

Once platform 34' is raised back up, using the "trolley in" key (e.g., on the keypad at the garage G or keypad on a smartphone app, or a keypad of the platform controls), such as keypads 612, 632, 642, the "platform up" sensor S8 will now allow the "trolley in" button on the keypad (e.g., on the keypad at the garage G or keypad on a smartphone app, or a keypad of the platform controls), such as keypads 612, 632, 642, to activate the first winch motor 710 of the first winch assembly 761 to rotate the first winch drum 708 to wind the cable 720 and start pulling the trolley 10C (with the boat B thereon) in towards the garage G or boat house. In one example, the second winch motor 711 of the second winch assembly 763 will first go to a medium tension setting (e.g., a tension setting of 3 on a scale of 1 to 10, by increasing tension in steps until the tension level is reached to open the mechanical latch) to open the platform trolley lock 36'. Once the "Trolley lock" sensor S14 shows the lock released, the first winch motor 710 of the first winch assembly 761 can transition to operate at high tension (e.g., a high or maximum tension setting of 10 on a scale of 1 to 10) to pull the trolley 10C away from the lock 36'. Once the trolley 10C passes the lock 36', the system 600 sets the second winch motor 711 of the second winch assembly 763 to low tension (e.g., a tension setting of 1.5 on a scale of 1 to 10) to pay out the second cable 730 as the trolley 10C moves towards the garage G. There is a "Transition" sensor S7, S9 at the track 20 at the platform to land track junction. If the operator stops the trolley 10C before it activates this sensor S7, S9, it keeps the platform 34' locked out (e.g., with the pins 42) until it does. This sensor S7, S9 works both ways to keep the platform 34' from moving unless the trolley 10C is inside the transition sensor S7, S9, or locked at the end of the platform 34'.

Once the operator holds down the "trolley in" key continuously (e.g., "trolley in" key is Deadman-type key), the trolley 10C will reach the garage track sensor S11. Both winch motors 710, 711 go to low tension mode once the garage track sensor S11 senses the trolley 10C to stop the trolley 10C. The inductive power transfer device G1 can now charge the ultrasonic sensor(s) S4, S4' on the trolley 10C. Optionally, the ultrasonic sensor(s) S4, S4' can be polled by the controller EM. If the sensor S4, S4' is not functioning, the system 600 will throw an error and not move.

Further to the description above on the operation of the system 600, the system 600 must be unlocked for the platform 34' to be raised or lowered by the platform lift mechanism 30'. Also, the winch motors 710, 711 of the winch assemblies 761, 763 need to be active to manage the tension of the cables 720, 730, and the garage door must be open to allow movement of the cables 720, 730 by the first and second winch assemblies 761, 763.

Figure 35:
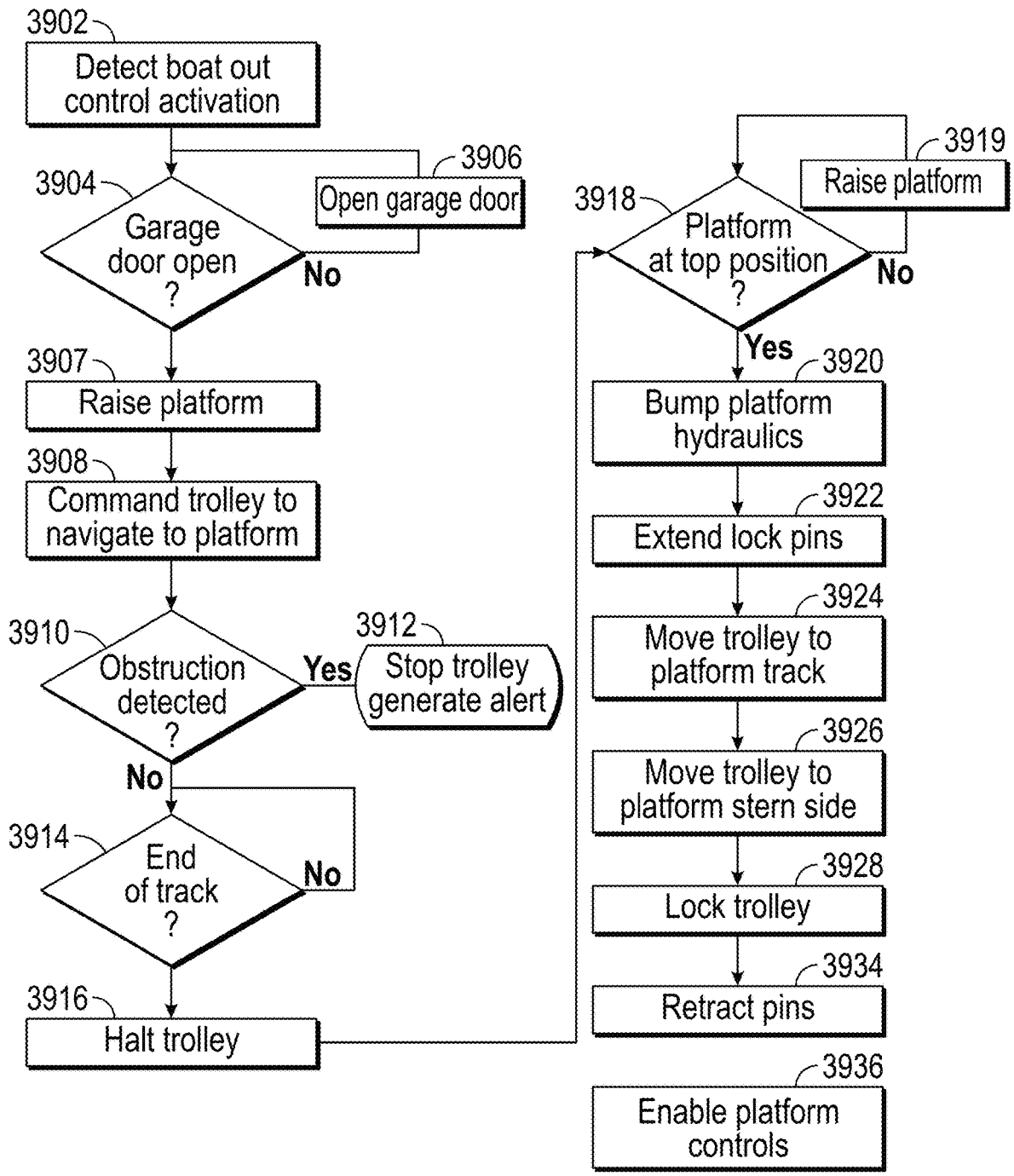
FIG. 35 illustrates an example process for deploying boat from the garage.

FIG. 35 illustrates an example process for deploying a boat B from the garage G (which may be executed by the apparatus described herein), as similarly discussed above. At block 3902, the process detects a user activation of a "boat out" control. Optionally, the process operates on a dead man basis, where the process continuously monitors the user activation of the "boat out" control, and if the user releases the control, the process stops certain operations.

At block 3904, a determination is made from the garage door sensor readings as to whether the garage door is open. If the garage door is not open, at block 3906, the garage door is commanded to open. The process may wait until the garage door sensors indicate that the garage door is fully open. At block 3907, the transport mechanism (e.g., the drive system 700) is commanded (e.g., by the computer 610) to raise the platform (e.g., the platform motors/pneumatics are commanded to raise the platform). At block 3908, the transport mechanism (e.g., the drive system 700) is commanded to transport the boat to the platform at the end of the track.

As the boat is being navigated on the track, the various sensors (e.g., proximity sensors) monitor for obstructions (e.g., branches, rocks, seaweed, etc. on the track). At block 3910, a determination is made as to whether the sensors detected an obstruction. If an obstruction is detected that appears to be a potential hindrance to the safe transport of the boat, at block 3912, the process commands the transport mechanism to stop movement (e.g., to stop movement of the trolley). Otherwise, at block 3914, sensors are monitored to detect if the transport mechanism has reached the end of the track ending at the gap between the track and the platform. In response to detecting that the transport mechanism has reached the end of the track, the transport mechanism is commanded to halt.

At block 3918, a determination is made from corresponding sensor readings as to whether the platform is fully raised to the top position. If the platform has not been fully raised to the top position, at block 3919, the platform is raised. At block 3920, the platform hydraulics are bumped in the up mode to ensure the platform is fully trapped in an XY retainer (which reduces or eliminates the likelihood of minor leaks).

At block 3922, the lock pins are extended from the dockside tracks to the platform tracks to align the dockside tracks with the platform tracks. In response to the process sensing that the lock pins are fully extended and locked (via corresponding sensors) to the platform tracks, at block 3924 the transport mechanism is commanded to move the trolley (with the boat thereon) onto the platform track. At block 3926, the transport mechanism is commanded to transport the trolley along the platform and park the trolley in the appropriate location (e.g., the stern side of the platform). At block 3928, a platform-based hydraulic mechanism is commanded to push a locking tab up to lock the trolley to prevent trolley movement At block 3934, the pins are commanded to retract from the platform rails. At block 3936, in response to sensors detecting that the pins have been successfully retracted, the platform controls are enabled so that the user can utilize the platform control to provide desired commands.

Figure 36:
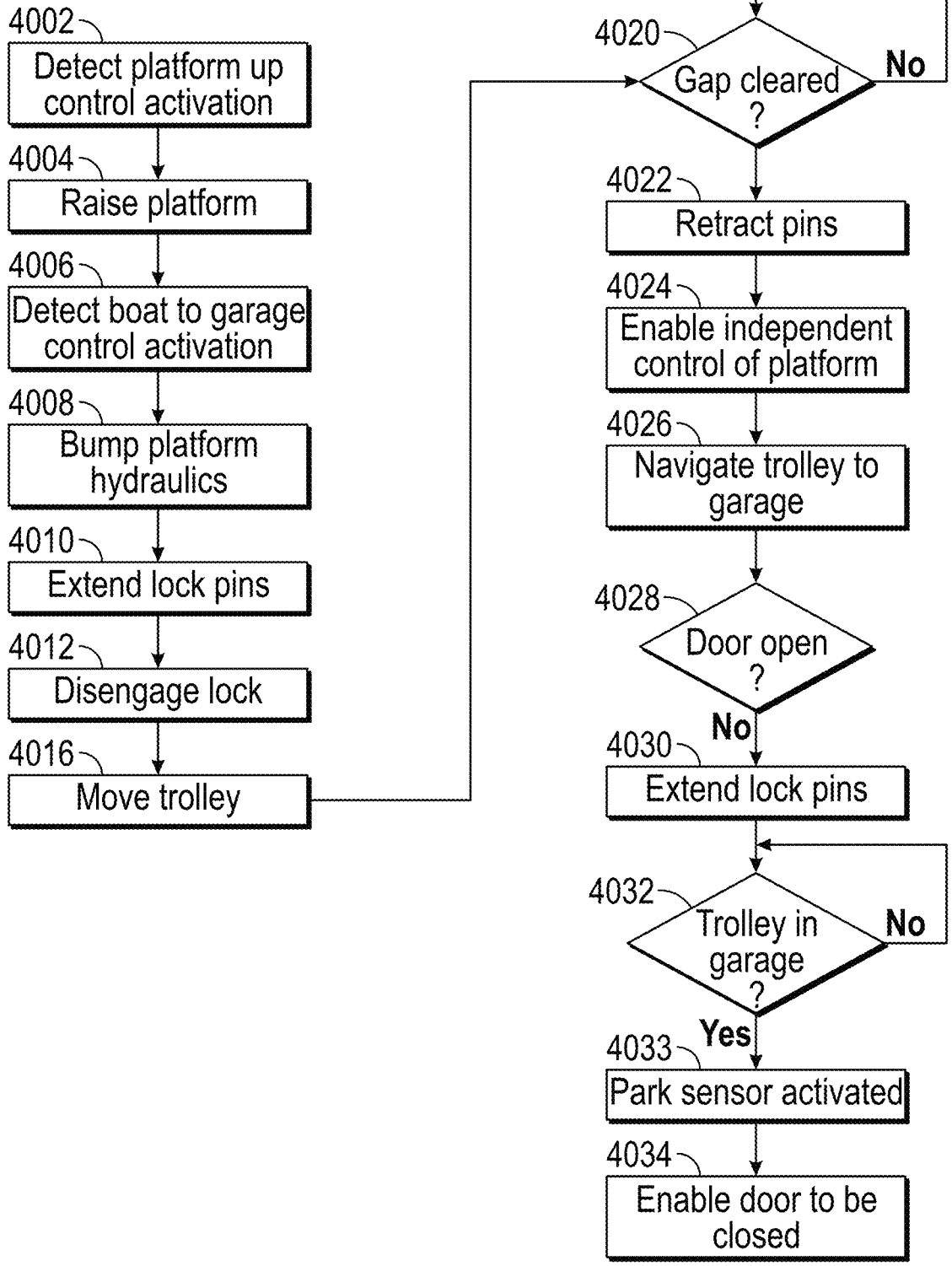
FIG. 36 illustrates an example process for returning a boat to the garage.

FIG. 36 illustrates an example process for returning the boat and trolley to the garage, as similarly discussed above. The boat is docked onto the lowered platform (where the platform is lowered beneath the surface of the water) and onto the trolley support bunkers. At block 4002, the process detects a user activation of a "Platform up" control, indicating that the platform and bunkered boat are to be raised. Optionally, the process operates on a dead man basis, where the process continuously monitors the user activation of the "Platform up" control, and if the user releases the control, the process stops certain operations (e.g., the movement of the platform).

At block 4004, in response to the detected activation of the "Platform up" command, the platform is commanded to be raised. When the platform is fully raised, the platform movement stops. At block 4006, the process detects a user activation of a "Boat to garage" control, indicating that boat and trolley are to be returned to the garage. At block 4008, in response to detecting the "Boat to garage" command, the user-accessible platform controls (e.g., provided via the remote control device) are optionally disabled to prevent the user from commanding the platform to perform an action that may be unsafe or that may damage the boat, rails, or other components. In addition, the controller is commanded to bump the up platform hydraulics to ensure that the platform cylinder is in the full up position. At block 4010, the pins are commanded to extend from the track end to engage the platform rails, and to thereby align the platform tracks with the tracks going to the garage. At block 4012, in response to sensing via sensors that the pins are fully extended and locked to the platform rails, the trolley hydraulic lock tabs on the platform are caused to disengage.

At block 4016, the transport mechanism (e.g., drive mechanism 700) is commanded to move the trolley (with the boat thereon) from the platform onto the track across the gap between the dockside track and the platform, and (optionally) stop. At block 4020, position sensors are monitored to determine if the trolley has cleared the gap between the platform and the tracks. In response to detecting that the trolley has cleared the gap between the platform and the tracks, the process proceeds to block 4022, and the pins are retracted from the platform rails. At block 4024, in response to detecting that the pins have been retracted from the platform rails (so that the platform tracks are no longer mechanically coupled to the dockside tracks), the platform controls (e.g., on the remote control device) are enabled so that the user can independently control the platform now that it is safe to do so.

At block 4026, the transport mechanism (e.g., drive mechanism 700) is commanded to transport the trolley to the garage. At block 4028, the process detects, via corresponding door sensors, whether the garage door is open. In response to detecting the garage door is not open, at block 4030, the garage door is commanded to open. At block the 4032, a determination is made as to whether the trolley is at a parked position in the garage (e.g., by monitoring a park sensor at or near the end of the track that is actuated, at block 4033, to indicate that the trolley is at a designated end point of the track within the garage). At block 4034, the garage door is commanded to close automatically, or a user can manually activate a door close control so as to close the door.

Additional Embodiments

In embodiments of the present invention, an automated boat lift and trolley system may be in accordance with any of the following clauses:

Clause 1: An automated boat lift and trolley system for moving a boat from a boat garage and a dock, comprising:
- a track comprising a pair of track rails, the track configured to run from a proximal end within a boat garage and a distal end proximate a dock;
- a boat trolley configured to support a boat thereon, the boat trolley having a set of wheels that movably couple the trolley to the pair of rails of the track;
- a lift assembly disposed at the dock, the lift assembly comprising a platform spaced from the distal end of the track, the platform having a pair of platform rails onto which the boat trolley is moved from the track, the lift assembly operable to lower the platform with the boat trolley and boat thereon into water to facilitate removal of the boat from the boat trolley for use, the lift assembly operable to raise the platform with the boat trolley and boat thereon such that the pair of platform rails are substantially aligned with the pair of track rails to facilitate movement of the boat trolley from the platform onto the track;
- a drive assembly as least partially disposed in the garage and configured to drive the movement of the boat trolley along the track and from the track onto the platform; and
- a controller at least partially disposed in the garage, the controller configured to automatically control operation of the boat trolley to move along the track, between the track and the platform, and to control the lift assembly to lower the boat into the water based at least in part on the sensed information communicated by one or more sensors to the controller.

Clause 2: The system of any preceding clause, wherein the drive assembly comprises a motor disposed in the garage, the motor operatively coupled to a track chain drive having a drive sprocket in or proximate the garage, a driven sprocket at or proximate an end of the track, and a chain coupled to the drive sprocket and the driven sprocket, the chain operatively coupled to the boat trolley, wherein operation of the motor to rotate an output shaft thereof in one direction causes the drive and driven sprockets to rotate in a first direction and the chain to move in a second direction thereby causing the boat trolley to move in the second direction, and wherein operation of the motor to rotate the output shaft in an opposite direction causes the drive and driven sprockets to rotates in a third direction opposite the first direction and the chain to move in a fourth direction opposite the second direction thereby causing the boat trolley to move in the fourth direction.

Clause 3: The system of any preceding clause, wherein the chain of the track chain drive operatively couples to the boat trolley via a mule coupled to the chain, the mule being movably coupled to one of the pair of track rails and configured to move between a first end position in the garage and an opposite end position proximate an end of the track, the mule comprising a grabber armlet actuatable between an engaged position and a disengaged position, wherein in the engaged position the grabber armlet is configured to couple with the boat trolley so that the mule can exert a force on the boat trolley to move the boat trolley in the second or fourth directions, and wherein in the disengaged position the grabber armlet is configured to decouple from the boat trolley to allow the mule to move independently of the boat trolley.

Clause 4: The system of any preceding clause, wherein the mule further comprises one or more rechargeable batteries, a wireless transmitter, an electronic actuator configured to operate the grabber armlet and one or more proximity sensors configured to communicate with the controller, the controller configured to operate the drive system to stop movement of the boat trolley when the proximity sensors sense an obstruction on the track.

Clause 5: The system of any preceding clause, further comprising an inductive power transmitter disposed in or near the garage, the inductive power transmitter configured to charge the one or more rechargeable batteries on the mule when the mule is at or near the first end position in the garage.

Clause 6: The system of any preceding clause, wherein the mule further comprises one or more rechargeable batteries, a wireless transmitter, an electronic actuator configured to operate the grabber armlet, and the boat trolley comprises one or more proximity sensors configured to receive power from the one or more rechargeable batteries when the mule is coupled to the boat trolley, the one or more proximity sensors configured to communicate with the controller, the controller configured to operate the drive system to stop movement of the boat trolley when the proximity sensors sense an obstruction on the track.

Clause 7: The system of any preceding clause, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

Clause 8: The system of any preceding clause, wherein the lift assembly comprises a platform drive assembly comprising a motor operatively coupled to a platform chain drive having a drive sprocket proximate a first location on the platform track, a driven sprocket proximate a second location on the platform track spaced from the first location, and a chain coupled to the drive sprocket and the driven sprocket, the chain operatively coupleable to the boat trolley when at least a portion of the boat trolley is on the platform and configured to move the boat trolley along the platform rails.

Clause 9: The system of any preceding clause, wherein the chain of the platform chain drive operatively couples to the boat trolley via a platform mule coupled to the chain, the platform mule being movably coupled to one of the pair of platform rails and configured to move between the first location and the second location on the platform track, the platform mule comprising a grabber armlet actuatable between an engaged position and a disengaged position, wherein in the engaged position the grabber armlet is configured to couple with the boat trolley so that the platform mule can exert a force on the boat trolley to move the boat trolley, and wherein in the disengaged position the grabber armlet is configured to decouple from the boat trolley to allow the platform mule to move independently of the boat trolley.

Clause 10: The system of any preceding clause, wherein the platform mule further comprises a wireless transmitter, an electronic actuator configured to operate the grabber armlet and one or more proximity sensors configured to communicate with the controller, the controller configured to operate the platform drive assembly to stop movement of the boat trolley when the proximity sensors sense an obstruction on the platform track.

Clause 11: The system of any preceding clause, wherein the controller comprises a wireless transceiver, the controller configured to communicate wirelessly with a remote control to operate one or both of the motion of the boat trolley and a garage door of the boat garage.

Clause 12: The system of any preceding clause, wherein the remote control device is a mobile electronic device.

Clause 13: An automated boat lift and trolley system for moving a boat between a boat garage and a dock, comprising:
- a track comprising a pair of track rails, the track configured to run from a proximal end within a boat garage and a distal end proximate a dock;
- a boat trolley configured to support a boat thereon, the boat trolley having a set of wheels that movably couple the trolley to the pair of track rails;
- a lift assembly disposed at the dock, the lift assembly comprising a platform spaced from the distal end of the track, the platform having a pair of platform rails onto which the boat trolley is moved from the track rails, the lift assembly operable to lower the platform with the boat trolley and boat thereon to a lowered position to facilitate removal of the boat from the boat trolley for use, the lift assembly operable to raise the platform with the boat trolley and boat thereon to a raised position, the pair of platform rails being substantially aligned with the pair of track rails when the platform is in the raised position to facilitate movement of the boat trolley between the platform and the track;
- a drive assembly as least partially disposed in the garage and configured to drive the movement of the boat trolley along the track and between the track and the platform; and
- a controller at least partially disposed in the garage, the controller configured to automatically control operation of the drive assembly to move the boat trolley along the track between the track and the platform, and to control the lift assembly to lower the boat trolley with the boat thereon to the lowered position based at least in part on the sensed information communicated by one or more sensors to the controller.

Clause 14: The system of any preceding clause, wherein the drive assembly comprises a motor disposed in the garage, the motor operatively coupled to a track chain drive having a drive sprocket in or proximate the garage, a driven sprocket at or proximate a distal end of the track, and a chain coupled to the drive sprocket and the driven sprocket, the chain operatively coupled to the boat trolley, wherein operation of the motor to rotate an output shaft thereof in one direction causes the drive and driven sprockets to rotate in a first direction and the chain to move in a second direction thereby causing the boat trolley to move in the second direction, and wherein operation of the motor to rotate the output shaft in an opposite direction causes the drive and driven sprockets to rotate in a third direction opposite the first direction and the chain to move in a fourth direction opposite the second direction thereby causing the boat trolley to move in the fourth direction.

Clause 15: The system of any preceding clause, wherein the chain of the track chain drive operatively couples to the boat trolley via a mule coupled to the chain, the mule being movably coupled to one of the pair of track rails and configured to move between a first end position in the garage and an opposite end position proximate the distal end of the track, the mule comprising a grabber armlet actuatable between an engaged position and a disengaged position, wherein in the engaged position the grabber armlet is configured to couple with the boat trolley so that the mule can exert a force on the boat trolley to move the boat trolley in the second or fourth directions, and wherein in the disengaged position the grabber armlet is configured to decouple from the boat trolley to allow the mule to move independently of the boat trolley.

Clause 16: The system of any preceding clause, wherein the mule further comprises one or more rechargeable batteries, a wireless transmitter, an electronic actuator configured to operate the grabber armlet and one or more proximity sensors configured to communicate with the controller, the controller configured to operate the drive system to stop movement of the boat trolley when the proximity sensors sense an obstruction on the track.

Clause 17: The system of any preceding clause, further comprising an inductive power transmitter disposed in or near the garage, the inductive power transmitter configured to charge the one or more rechargeable batteries of the mule when the mule is at or near the first end position in the garage.

Clause 18: The system of any preceding clause, wherein the mule further comprises one or more rechargeable batteries, a wireless transmitter, an electronic actuator configured to operate the grabber armlet, and the boat trolley comprises one or more proximity sensors configured to receive power from the one or more rechargeable batteries when the mule is coupled to the boat trolley, the one or more proximity sensors configured to communicate with the controller, the controller configured to operate the drive system to stop movement of the boat trolley when the proximity sensors sense an obstruction on the track.

Clause 19: The system of any preceding clause, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

Clause 20: The system of any preceding clause, wherein the lift assembly comprises a platform drive assembly comprising a motor operatively coupled to a platform chain drive having a drive sprocket proximate a first location on the platform track, a driven sprocket proximate a second location on the platform track spaced from the first location, and a chain coupled to the drive sprocket and the driven sprocket, the chain operatively coupleable to the boat trolley when at least a portion of the boat trolley is on the platform and configured to move the boat trolley along the platform rails.

Clause 21: The system of any preceding clause, wherein the chain of the platform chain drive operatively couples to the boat trolley via a platform mule coupled to the chain, the platform mule being movably coupled to one of the pair of platform rails and configured to move between the first location and the second location on the platform track, the platform mule comprising a grabber armlet actuatable between an engaged position and a disengaged position, wherein in the engaged position the grabber armlet is configured to couple with the boat trolley so that the platform mule can exert a force on the boat trolley to move the boat trolley, and wherein in the disengaged position the grabber armlet is configured to decouple from the boat trolley to allow the platform mule to move independently of the boat trolley.

Clause 22: The system of any preceding clause, wherein the platform mule further comprises a wireless transmitter, an electronic actuator configured to operate the grabber armlet and one or more proximity sensors configured to communicate with the controller, the controller configured to operate the platform drive assembly to stop movement of the boat trolley when the proximity sensors sense an obstruction on the platform track.

Clause 23: The system of any preceding clause, wherein the controller comprises a wireless transceiver, the controller configured to communicate wirelessly with a remote control to operate one or both of the motion of the boat trolley and a garage door of the boat garage.

Clause 24: The system of any preceding clause, wherein the remote control is a mobile electronic device.

Clause 25: An automated boat lift and trolley system for moving a boat between a boat garage and a dock, comprising:
- a track comprising a pair of track rails, the track configured to run from a proximal end within a boat garage and a distal end proximate a dock;
- a boat trolley configured to support a boat thereon, the boat trolley having a set of wheels that movably couple the trolley to the pair of track rails;
- a drive assembly as least partially disposed in the garage and configured to drive the movement of the boat trolley along the track and between the track and a dock; and
- a controller at least partially disposed in the garage, the controller configured to automatically control operation of the drive assembly to move the boat trolley along the track between the track and the dock.

Clause 26: The system of any preceding clause, further comprising a lift assembly disposed at the dock, the lift assembly comprising a platform spaced from the distal end of the track, the platform having a pair of platform rails onto which the boat trolley is moved from the track rails, the platform movable between a raised position where the platform rails are substantially aligned with the track rails and a lowered position to facilitate movement of the boat trolley between the track rails and platform rails, the lift assembly being operable to lower the platform with the boat trolley and boat thereon to the lowered position to facilitate removal of the boat from the boat trolley for use, the controller configured to control the movement of the platform between the lowered position and the raised position.

Clause 27: The system of any preceding clause, wherein the drive assembly comprises a motor disposed in the garage, the motor operatively coupled to a track chain drive having a drive sprocket in or proximate the garage, a driven sprocket at or proximate a distal end of the track, and a chain coupled to the drive sprocket and the driven sprocket, the chain operatively coupled to the boat trolley, wherein operation of the motor to rotate an output shaft thereof in one direction causes the drive and driven sprockets to rotate in a first direction and the chain to move in a second direction thereby causing the boat trolley to move in the second direction, and wherein operation of the motor to rotate the output shaft in an opposite direction causes the drive and driven sprockets to rotate in a third direction opposite the first direction and the chain to move in a fourth direction opposite the second direction thereby causing the boat trolley to move in the fourth direction.

Clause 28: The system of any preceding clause, wherein the chain of the track chain drive operatively couples to the boat trolley via a mule coupled to the chain, the mule being movably coupled to one of the pair of track rails and configured to move between a first end position in the garage and an opposite end position proximate the distal end of the track, the mule comprising a grabber armlet actuatable between an engaged position and a disengaged position, wherein in the engaged position the grabber armlet is configured to couple with the boat trolley so that the mule can exert a force on the boat trolley to move the boat trolley in the second or fourth directions, and wherein in the disengaged position the grabber armlet is configured to decouple from the boat trolley to allow the mule to move independently of the boat trolley.

Clause 29: The system of any preceding clause, wherein the mule further comprises one or more rechargeable batteries, a wireless transmitter, an electronic actuator configured to operate the grabber armlet and one or more proximity sensors configured to communicate with the controller, the controller configured to operate the drive system to stop movement of the boat trolley when the proximity sensors sense an obstruction on the track.

Clause 30: The system of any preceding clause, further comprising an inductive power transmitter disposed in or near the garage, the inductive power transmitter configured to charge the one or more rechargeable batteries of the mule when the mule is at or near the first end position in the garage.

Clause 31: The system of any preceding clause, wherein the mule further comprises one or more rechargeable batteries, a wireless transmitter, an electronic actuator configured to operate the grabber armlet, and the boat trolley comprises one or more proximity sensors configured to receive power from the one or more rechargeable batteries when the mule is coupled to the boat trolley, the one or more proximity sensors configured to communicate with the controller, the controller configured to operate the drive system to stop movement of the boat trolley when the proximity sensors sense an obstruction on the track.

Clause 32: The system of any preceding clause, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

Clause 33: The system of any preceding clause, wherein the lift assembly comprises a platform drive assembly comprising a motor operatively coupled to a platform chain drive having a drive sprocket proximate a first location on the platform track, a driven sprocket proximate a second location on the platform track spaced from the first location, and a chain coupled to the drive sprocket and the driven sprocket, the chain operatively coupleable to the boat trolley when at least a portion of the boat trolley is on the platform and configured to move the boat trolley along the platform rails.

Clause 34: The system of any preceding clause, wherein the chain of the platform chain drive operatively couples to the boat trolley via a platform mule coupled to the chain, the platform mule being movably coupled to one of the pair of platform rails and configured to move between the first location and the second location on the platform track, the platform mule comprising a grabber armlet actuatable between an engaged position and a disengaged position, wherein in the engaged position the grabber armlet is configured to couple with the boat trolley so that the platform mule can exert a force on the boat trolley to move the boat trolley, and wherein in the disengaged position the grabber armlet is configured to decouple from the boat trolley to allow the platform mule to move independently of the boat trolley.

Clause 35: The system of any preceding clause, wherein the platform mule further comprises a wireless transmitter, an electronic actuator configured to operate the grabber armlet and one or more proximity sensors configured to communicate with the controller, the controller configured to operate the platform drive assembly to stop movement of the boat trolley when the proximity sensors sense an obstruction on the platform track.

Clause 36: The system of any preceding clause, wherein the controller comprises a wireless transceiver, the controller configured to communicate wirelessly with a remote control to operate one or both of the motion of the boat trolley and a garage door of the boat garage.

Clause 37: The system of any preceding clause, wherein the remote control is a mobile electronic device.

Clause 38: An automated boat lift and trolley system for moving a boat between a boat garage and a dock, comprising:
- a track comprising a pair of track rails, the track configured to run from a proximal end within a boat garage and a distal end proximate a dock;
- a boat trolley configured to support a boat thereon, the boat trolley having a set of wheels that movably couple the trolley to the pair of track rails;
- a lift assembly disposed at the dock, the lift assembly comprising a platform spaced from the distal end of the track, the platform having a pair of platform rails onto which the boat trolley is moved from the track rails, the lift assembly operable to lower the platform with the boat trolley and boat thereon to a lowered position to facilitate removal of the boat from the boat trolley for use, the lift assembly operable to raise the platform with the boat trolley and boat thereon to a raised position, the pair of platform rails being substantially aligned with the pair of track rails when the platform is in the raised position to facilitate movement of the boat trolley between the platform and the track;
- a drive assembly as least partially disposed in the garage and configured to drive the movement of the boat trolley along the track and between the track and the platform; and
- a controller at least partially disposed in the garage, the controller configured to automatically control operation of the drive assembly to move the boat trolley along the track between the track and the platform, and to control the lift assembly to lower the boat trolley with the boat thereon to the lowered position based at least in part on the sensed information communicated by one or more sensors to the controller.

Clause 39: The system of any preceding clause, wherein the drive assembly comprises a pair of winch motors disposed in the garage, the pair of winch motors operable to rotate a corresponding pair of winch drums to one wind or pay out a cable on each of the winch drums to drive the movement of the boat trolley along the track and between a first position in the garage and a second position on the platform.

Clause 40: The system of any preceding clause, further comprising a dual tensioner assembly comprising a first variable position pulley at least partially coupled to a first cable coupled to a first winch drum of the pair of winch drums and a second variable position pulley at least partially coupled to a second cable coupled to a second winch drum of the pair of winch drums, the dual tensioner assembly configured to independently adjust the position of the first and second variable position pulleys to increase or decrease or maintain a tension of one or both of the first and second cables.

Clause 41: The system of any preceding clause, wherein rotation of the first winch drum to wind the first cable and rotation of the second winch drum to pay out the second cable drives the movement of the boat trolley toward the garage, wherein rotation of the first winch drum to pay out the first cable and rotation of the second winch drum to wind the second cable drives the movement of the boat trolley toward the platform, and rotation of the first and second winch drums to pay out the first and second cables allow the trolley to be lowered with the platform into the water.

Clause 42: The system of any preceding clause, further comprising an inductive power transmitter disposed in or near the garage, the inductive power transmitter configured to charge one or more rechargeable batteries on the trolley that power one or more sensors on the trolley when the trolley is at or near the first end position in the garage.

Clause 43: The system of any preceding clause, wherein the one or more sensors comprise one or more proximity sensors configured to communicate with the controller, the controller configured to operate the drive system to stop movement of the boat trolley when the proximity sensors sense an obstruction on the track.

Clause 44: The system of any preceding clause, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

Clause 45: The system of any preceding clause, wherein the lift assembly comprises one or more rollers that at least partially engage the first and second cables and an end sheave around which the first and second cables attach to each other.

Clause 46: The system of any preceding clause, wherein the controller comprises a wireless transceiver, the controller configured to communicate wirelessly with a remote control to operate one or both of the motion of the boat trolley and a garage door of the boat garage.

Clause 47: The system of any preceding clause, wherein the remote control is a mobile electronic device.

Clause 48: An automated boat lift and trolley system for moving a boat between a boat garage and a dock, comprising:
- a track comprising a pair of track rails, the track configured to run from a proximal end within a boat garage and a distal end proximate a dock;
- a boat trolley configured to support a boat thereon, the boat trolley having a set of wheels that movably couple the trolley to the pair of track rails;
- a drive assembly as least partially disposed in the garage and configured to drive the movement of the boat trolley along the track and between the track and a dock; and
- a controller at least partially disposed in the garage, the controller configured to automatically control operation of the drive assembly to move the boat trolley along the track between the track and the dock.

Clause 49: The system of any preceding clause, further comprising a lift assembly disposed at the dock, the lift assembly comprising a platform spaced from the distal end of the track, the platform having a pair of platform rails onto which the boat trolley is moved from the track rails, the platform movable between a raised position where the platform rails are substantially aligned with the track rails and a lowered position to facilitate movement of the boat trolley between the track rails and platform rails, the lift assembly being operable to lower the platform with the boat trolley and boat thereon to the lowered position to facilitate removal of the boat from the boat trolley for use, the controller configured to control the movement of the platform between the lowered position and the raised position.

Clause 50: The system of any preceding clause, wherein the drive assembly comprises a pair of winch motors disposed in the garage, the pair of winch motors operable to rotate a corresponding pair of winch drums to one wind or pay out a cable on each of the winch drums to drive the movement of the boat trolley along the track and between a first position in the garage and a second position on the platform.

Clause 51: The system of any preceding clause, further comprising a dual tensioner assembly comprising a first variable position pulley at least partially coupled to a first cable coupled to a first winch drum of the pair of winch drums and a second variable position pulley at least partially coupled to a second cable coupled to a second winch drum of the pair of winch drums, the dual tensioner assembly configured to independently adjust the position of the first and second variable position pulleys to increase or decrease or maintain a tension of one or both of the first and second cables.

Clause 52: The system of any preceding clause, wherein rotation of the first winch drum to wind the first cable and rotation of the second winch drum to pay out the second cable drives the movement of the boat trolley toward the garage, wherein rotation of the first winch drum to pay out the first cable and rotation of the second winch drum to wind the second cable drives the movement of the boat trolley toward the platform, and rotation of the first and second winch drums to pay out the first and second cables allow the trolley to be lowered with the platform into the water.

Clause 53: The system of any preceding clause, further comprising an inductive power transmitter disposed in or near the garage, the inductive power transmitter configured to charge one or more rechargeable batteries on the trolley when the trolley is at or near the first end position in the garage.

Clause 54: The system of any preceding clause, wherein the trolley comprises one or more proximity sensors configured to receive power from the one or more rechargeable batteries, the one or more proximity sensors configured to communicate with the controller, the controller configured to operate the drive system to stop movement of the boat trolley when the proximity sensors sense an obstruction on the track.

Clause 55: The system of any preceding clause, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

Clause 56: The system of any preceding clause, wherein the lift assembly comprises one or more rollers that at least partially engage the first and second cables and an end sheave around which the first and second cables attach to each other.

Clause 57: The system of any preceding clause, wherein the controller comprises a wireless transceiver, the controller configured to communicate wirelessly with a remote control to operate one or both of the motion of the boat trolley and a garage door of the boat garage.

Clause 58: The system of any preceding clause, wherein the set of wheels of the boat trolley are configured to span a gap in the track at an entrance to the boat garage, the gap allowing a garage door to fully close the garage and extend at least partially into the gap.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal. The computer devices discussed herein may optionally include displays, user input devices (e.g., touchscreen, keyboard, mouse, voice recognition, etc.), network interfaces, cameras, microphones, and/or the like.

While the phrase "click" or similar phrases may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated mobile device (e.g., phone application), computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An automated boat lift and trolley system for moving a boat between a boat garage and a dock, comprising:
   a track comprising a pair of track rails, the track configured to run from a proximal end within a boat garage and a distal end proximate a dock;
   a boat trolley configured to support a boat thereon, the boat trolley having a set of wheels that movably couple the boat trolley to the pair of track rails;
   a lift assembly disposed at the dock, the lift assembly comprising a platform spaced from the distal end of the track, the platform having a pair of platform rails onto which the boat trolley is moved from the track rails, the lift assembly operable to lower the platform with the boat trolley and boat thereon to a lowered position to facilitate removal of the boat from the boat trolley for use, the lift assembly operable to raise the platform with the boat trolley and boat thereon to a raised position, the pair of platform rails being substantially aligned with the pair of track rails when the platform is in the raised position to facilitate movement of the boat trolley between the platform and the track;
   a drive assembly as least partially disposed in the garage and configured to drive the movement of the boat trolley along the track and between the track and the platform, the drive assembly comprising a pair of winch motors disposed in the garage, the pair of winch motors operable to rotate a corresponding pair of winch drums to wind or pay out a first cable attached to a first winch drum of the pair of winch drums and a second cable attached to a second winch drum of the pair of winch drums to drive the movement of the boat trolley along the track and between a first position in the garage and a second position on the platform; and
   a controller at least partially disposed in the garage, the controller configured to automatically control operation of the drive assembly to move the boat trolley along the track between the track and the platform, and to control the lift assembly to lower the boat trolley with the boat thereon to the lowered position based at least in part on a sensed information communicated by one or more sensors to the controller.

2. The system of claim 1, further comprising a dual tensioner assembly comprising a first variable position pulley at least partially coupled to the first cable coupled to the first winch drum of the pair of winch drums and a second variable position pulley at least partially coupled to the second cable coupled to the second winch drum of the pair of winch drums, the dual tensioner assembly configured to independently adjust the position of the first and second variable position pulleys to increase or decrease or maintain a tension of one or both of the first cable and the second cable.

3. The system of claim 2, wherein rotation of the first winch drum to wind the first cable and rotation of the second winch drum to pay out the second cable drives the movement of the boat trolley toward the garage, wherein rotation of the first winch drum to pay out the first cable and rotation of the second winch drum to wind the second cable drives the movement of the boat trolley toward the platform, and rotation of the first and second winch drums to pay out the first and second cables allow the boat trolley to be lowered with the platform into the water.

4. The system of claim 2, wherein the lift assembly comprises one or more rollers that at least partially engage the first and second cables and an end sheave around which the first and second cables attach to each other.

5. The system of claim 1, further comprising an inductive power transmitter disposed in or near the garage, the inductive power transmitter configured to charge one or more rechargeable batteries on the boat trolley that power one or more sensors on the boat trolley when the boat trolley is at or near a first end position in the garage.

6. The system of claim 5, wherein the one or more sensors comprise one or more proximity sensors configured to communicate with the controller, the controller configured to operate the drive system to stop movement of the boat trolley when the one or more proximity sensors sense an obstruction on the track.

7. The system of claim 1, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

8. The system of claim 1, wherein the controller comprises a wireless transceiver, the controller configured to communicate wirelessly with a remote control to operate one or both of the motion of the boat trolley and a garage door of the boat garage.

9. The system of claim 8, wherein the remote control is a mobile electronic device.

10. An automated boat lift and trolley system for moving a boat between a boat garage and a dock, comprising:
    a track comprising a pair of track rails, the track configured to run from a proximal end within a boat garage and a distal end proximate a dock;
    a boat trolley configured to support a boat thereon, the boat trolley having a set of wheels that movably couple the boat trolley to the pair of track rails;
    a drive assembly as least partially disposed in the garage and configured to drive the movement of the boat trolley along the track and between the track and the dock, the drive assembly comprises a pair of winch motors disposed in the garage, the pair of winch motors operable to rotate a corresponding pair of winch drums to wind or pay out a first cable attached to a first winch drum of the pair of winch drums and a second cable attached to a second winch drum of the pair of winch drums to drive the movement of the boat trolley along the track and between a first position in the garage and a second position on the dock; and a controller at least partially disposed in the garage, the controller configured to automatically control operation of the drive assembly to move the boat trolley along the track between the track and the dock.

11. The system of claim 10, further comprising a lift assembly disposed at the dock, the lift assembly comprising a platform spaced from the distal end of the track, the platform having a pair of platform rails onto which the boat trolley is moved from the track rails, the platform movable between a raised position where the platform rails are substantially aligned with the track rails and a lowered position to facilitate movement of the boat trolley between the track rails and platform rails, the lift assembly being operable to lower the platform with the boat trolley and boat thereon to the lowered position to facilitate removal of the boat from the boat trolley for use, the controller configured to control the movement of the platform between the lowered position and the raised position.

12. The system of claim 11, further comprising a locking mechanism configured to selectively lock the track to the platform when the track rails are substantially aligned with the platform rails to facilitate movement of the boat trolley between the track and the platform, the locking mechanism comprising one or more pins actuatable between a retracted position in which the platform is decoupled from the track and an extended position in which the platform is coupled to the track.

13. The system of claim 11, wherein the lift assembly comprises one or more rollers that at least partially engage a first cable and a second cable and an end sheave around which the first cable and the second cable attach to each other.

14. The system of claim 10, further comprising a dual tensioner assembly comprising a first variable position pulley at least partially coupled to the first cable coupled to the first winch drum of the pair of winch drums and a second variable position pulley at least partially coupled to the second cable coupled to the second winch drum of the pair of winch drums, the dual tensioner assembly configured to independently adjust the position of the first and second variable position pulleys to increase or decrease or maintain a tension of one or both of the first and second cables.

15. The system of claim 14, wherein rotation of the first winch drum to wind the first cable and rotation of the second winch drum to pay out the second cable drives the movement of the boat trolley toward the garage, wherein rotation of the first winch drum to pay out the first cable and rotation of the second winch drum to wind the second cable drives the movement of the boat trolley toward the platform, and rotation of the first and second winch drums to pay out the first and second cables allow the trolley to be lowered with the platform into the water.

16. The system of claim 10, wherein the controller comprises a wireless transceiver, the controller configured to communicate wirelessly with a remote control to operate one or both of the motion of the boat trolley and a garage door of the boat garage.

17. The system of claim 10, wherein the set of wheels of the boat trolley are configured to span a gap in the track at an entrance to the boat garage, the gap allowing a garage door to fully close the garage and extend at least partially into the gap.

18. An automated boat lift and trolley system for moving a boat between a boat garage and a dock, comprising:
a track comprising a pair of track rails, the track configured to run from a proximal end within a boat garage and a distal end proximate a dock;
a boat trolley configured to support a boat thereon, the boat trolley having a set of wheels that movably couple the boat trolley to the pair of track rails;
a drive assembly as least partially disposed in the garage and configured to drive the movement of the boat trolley along the track and between the track and the dock;
a controller at least partially disposed in the garage, the controller configured to automatically control operation of the drive assembly to move the boat trolley along the track between the track and the dock; and
an inductive power transmitter disposed in or near the garage, the inductive power transmitter configured to charge one or more rechargeable batteries on the boat trolley when the boat trolley is at or near a first end position in the garage.

19. The system of claim 18, wherein the boat trolley comprises one or more proximity sensors configured to receive power from the one or more rechargeable batteries, the one or more proximity sensors configured to communicate with the controller, the controller configured to operate the drive system to stop movement of the boat trolley when the one or more proximity sensors sense an obstruction on the track.

* * * * *